(12) United States Patent
Hinckley et al.

(10) Patent No.: US 7,454,717 B2
(45) Date of Patent: Nov. 18, 2008

(54) DELIMITERS FOR SELECTION-ACTION PEN GESTURE PHRASES

(75) Inventors: Kenneth P Hinckley, Redmond, WA (US); Patrick M Baudisch, Seattle, WA (US); Gonzalo A Ramos, Toronto (CA); Francois V Guimbretiere, Baltimore, MD (US)

(73) Assignee: Microsoft Corporation, Redmond, WA (US)

( * ) Notice: Subject to any disclaimer, the term of this patent is extended or adjusted under 35 U.S.C. 154(b) by 510 days.

(21) Appl. No.: 10/970,742

(22) Filed: Oct. 20, 2004

(65) Prior Publication Data
US 2006/0085767 A1    Apr. 20, 2006

(51) Int. Cl.
*G06F 3/033*    (2006.01)
(52) U.S. Cl. .................................................. 715/863
(58) Field of Classification Search .................. 715/863
See application file for complete search history.

(56) References Cited

U.S. PATENT DOCUMENTS

| | | | |
|---|---|---|---|
| 5,252,951 A | | 10/1993 | Tannenbaum et al. |
| 5,347,295 A | * | 9/1994 | Agulnick et al. ............. 345/156 |
| 5,390,281 A | * | 2/1995 | Luciw et al. .................... 706/11 |
| 5,453,761 A | * | 9/1995 | Tanaka ........................ 345/179 |
| 5,500,935 A | | 3/1996 | Moran et al. |
| 5,502,803 A | | 3/1996 | Yoshida et al. |
| 5,523,775 A | | 6/1996 | Capps |
| 5,570,113 A | | 10/1996 | Zetts |
| 5,802,388 A | | 9/1998 | Zetts et al. |
| 7,017,124 B2 | | 3/2006 | Jaeger |
| 7,055,110 B2 | | 5/2006 | Kupka |
| 2004/0155870 A1 | * | 8/2004 | Middleton ................... 345/173 |
| 2005/0146508 A1 | * | 7/2005 | Kirkland et al. ............. 345/169 |
| 2005/0198593 A1 | | 9/2005 | Keely et al. |
| 2006/0026535 A1 | | 2/2006 | Hotelling et al. |

OTHER PUBLICATIONS

Jacko, et al. "Hierarchical menu design: Breadth, depth, and task complexity." (1996) Perceptual and Motor Skills, 82, pp. 1187-1201.
Kiger. "The depth/breadth tradeoff in the design of menu-driven interfaces." (1984) International Journal of Man-Machine Studies, 20, pp. 201-213.
Raskin. "The Humane Interface: New Directions for Designing Interactive Systems." (2000) ACM Press.
Johnny Accot and Shumin Zhai, More Than Dotting the i's—Foundations for Cross-Based Interfaces, CHI, 2002, pp. 73-80.

(Continued)

*Primary Examiner*—William L. Bashore
*Assistant Examiner*—Stephen Alvesteffer
(74) *Attorney, Agent, or Firm*—Amin, Turocy & Calvin, LLP

(57) ABSTRACT

A pen-based user interface (PBUI) that facilitates input of a delimiter to a scope in a substantially uninterrupted stroke for generating a selection-action gesture phrase. Four delimiter techniques are provided, which include a Multi-stroke delimiter, a button delimiter, timeout delimiter and pigtail delimiter. The Pigtail delimiter uses a small loop to delimit the gesture. The delimiter techniques support integrated scope selection, command activation, and direct manipulation all in a single fluid pen gesture. The delimiter techniques can also be employed to terminate a complex scope consisting of a sequence of multiple pen strokes.

37 Claims, 41 Drawing Sheets

OTHER PUBLICATIONS

George Apitz and Francois Guimbretiere, CrossY: A Crossing-Based Drawing Application, UIST, 2004, pp. 3-12.

William Buxton, Lexical and Pragmatic Considerations of Input Structures, Computer Graphics, 1983, pp. 31-37, vol. 17, No. 1.

William Buxton, Chunking and Phrasing and the Design of Human-Computer Dialogues, Proceedings of the IFIP World Computer Congress, 1986, pp. 475-480, Dublin, Ireland.

William A.S. Buxton, A Three-State Model of Graphical Input, Human-Computer Interaction—Interact '90, 1990, pp. 449-456, Elsevier Science Publishers B.V., Amsterdam.

William Buxton, Eugene Fiume, Ralph Hill, Alison Lee, and Carson Woo, Continuous Hand-Gesture Driven Input, Proceedings of Graphics Interface '83, 9th Conference of the Canadian Man-Computer Communications Society, Edmonton, May 1983, pp. 191-195.

George Fitzmaurice, Azam Khan, Robert Pieke, Bill Buxton, and Gordon Kurtenbach, Tracking Menus, UIST, 2003, pp. 71-79, Vancouver, BC, Canada.

Francois Guimbretiere, Fluid Interaction for High Resolution Wall-Size Displays, Ph.D. Thesis, Jan. 2002, Stanford University, 140 pages.

Francois Guimbretiere, Maureen Stone, and Terry Winograd, Fluid Interactions with High-Resolution Wall-Size Displays, Proceedings of UIST, 2001, pp. 21-30.

Francois Guimbretiere and Terry Winograd, FlowMenu: Combining Command, Text, and Data Entry, UIST, 2000, pp. 213-216.

Ken Hinckley, Gonzalo Ramos, Francois Guimbretiere, Patrick Baudisch, and Marc Smith, Stitching: Pen Gestures That Span Multiple Displays, Advanced Visual Interfaces, May 25-28, 2004, pp. 23-31, Gallipoli, Italy.

Gordon Kurtenbach and William Buxton, Issues in Combining Marketing and Direct Manipulation Techniques, UIST, 1991, pp. 137-144.

Gordon Kurtenbach and William Buxton, The Limits of Expert Performance Using Hierarchic Marking Menus, Proceedings of InterCHI '93, 1993, pp. 482-487.

G. Kurtenbach, T. P. Morgan, and W. Buxton, Contextual Animation of Gestural Commands, Computer Graphics Forum, 1994, pp. 305-314, vol. 13, No. 5 Blackwell Publishers, Cambridge, MA, USA.

Gordon P. Kurtenbach, Abigail J. Sellen, and William A. S. Buxton, An Empirical Evaluation of Some Articulatory and Cognitive Aspects of Marking Menus, Human-Computer Interaction, 1993, pp. 1-23, vol. 8, Lawrence Erlbaum Associates, Inc.

Yang Li, Ken Hinckley, Zhiwei Guan, and James A. Landay, Experimental Analysis of Mode Switching Techniques in Pen-Based User Interfaces, CHI, Apr. 2-7, 2005, Portland, Oregon, USA, 10 pages.

Sachi Mizobuchi and Michiaki Yasumura, Tapping vs. Circling Selections on Pen-Based Devices: Evidence for Different Performance-Shaping Factors, CHI, Apr. 24-29, 2004, pp. 607-614, vol. 6, No. 1, Vienna, Austria.

Thomas P. Moran, Patrick Chiu, and William Van Melle, Pen-Based Interaction Techniques for Organizing Material on an Electronic Whiteboard, UIST, 1997, pp. 45-54.

Elizabeth Mynatt, Takeo Igarashi, W. Keith Edwards, and Anthony Lamarca, Flatland: New Dimensions in Office Whiteboards, CHI '99, 1999, pp. 346-353, Pittsburgh, PA, USA.

Stuart Pook, Eric Lecolinet, Guy Vaysseix, and Emmanuel Barillot, Control Menus: Execution and Control in a Single Interactor, CHI 2000 Extended Abstracts, Apr. 1-6, 2000, pp. 263-264, The Hague, The Netherlands.

Eric Saund and Edward Lank, Stylus Input and Editing Without Prior Selection of Mode, UIST, 2003, pp. 213-216.

Robert Zelenik, Timothy Miller, Loring Holden, Joseph J. LaViola, Jr., Fluid Inking: Using Punctuation to Allow Modeless Combination of Marking and Gesturing, TR CS-04-11, 2004, Brown University, Providence, Rhode Island, 10 pages.

Shengdong Zhao and Ravin Balakrishnan, Simple vs. Compound Mark Hierarchical Marking Menus, UIST, 2004, pp. 33-42.

* cited by examiner

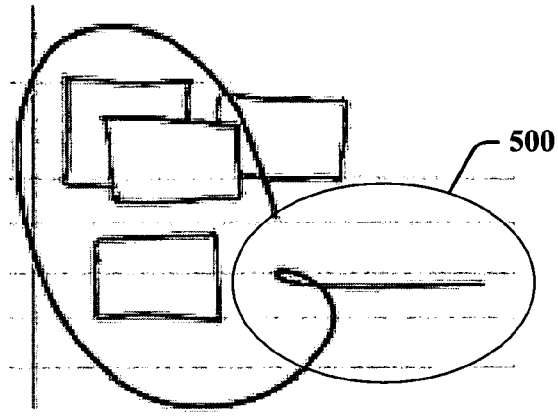
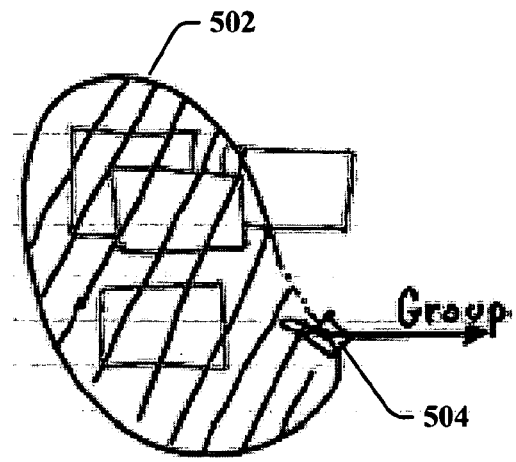
FIG. 5A                FIG. 5B
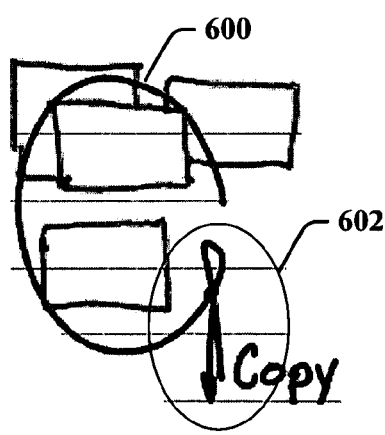
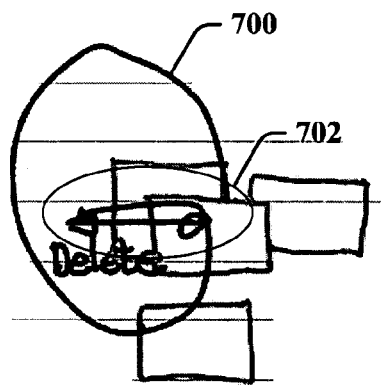
FIG. 6                 FIG. 7

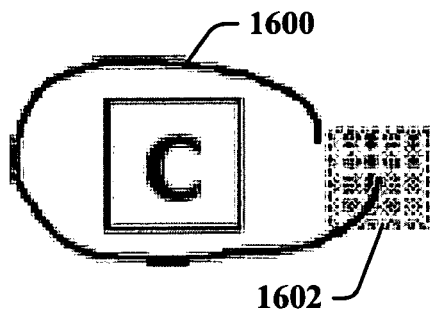
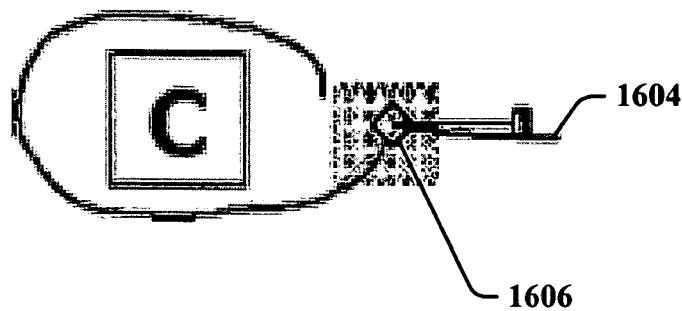
FIG. 16A        FIG. 16B
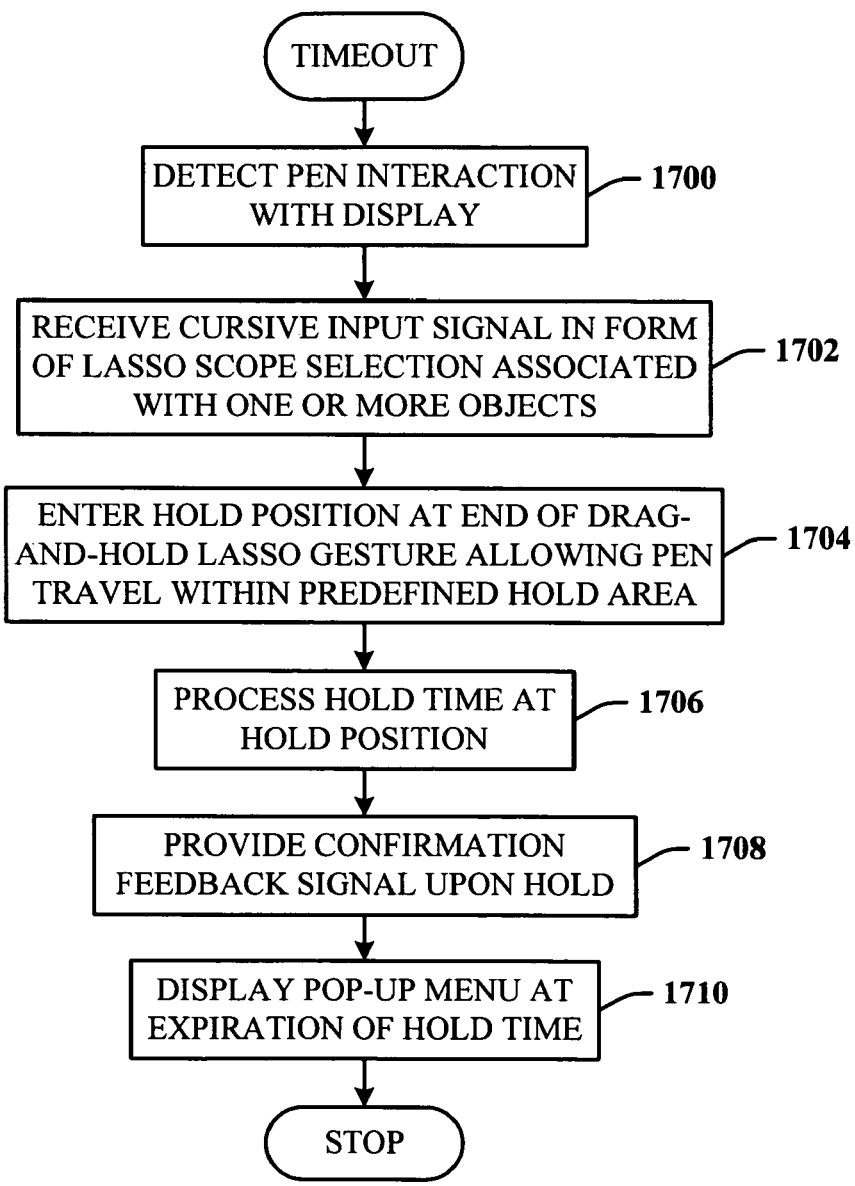
FIG. 17

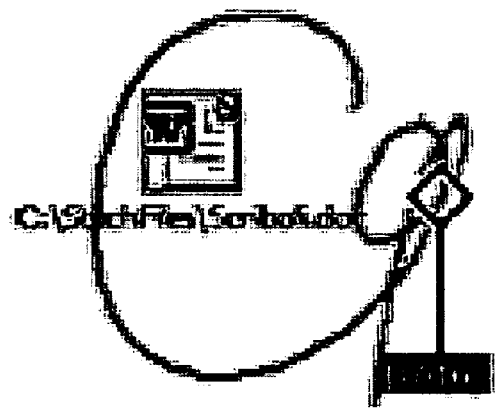
FIG. 21  FIG. 22
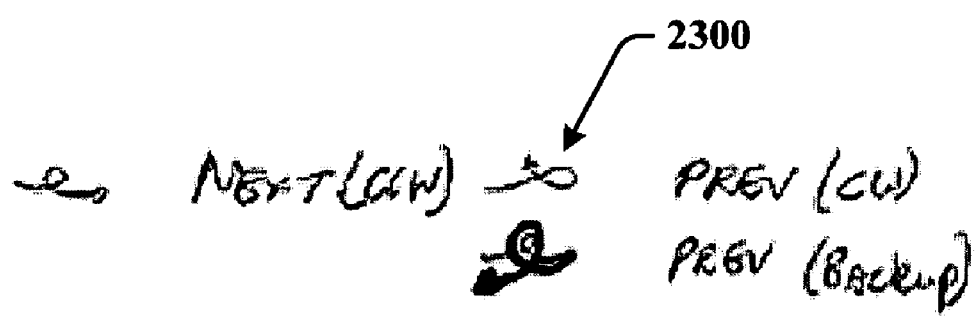
FIG. 23

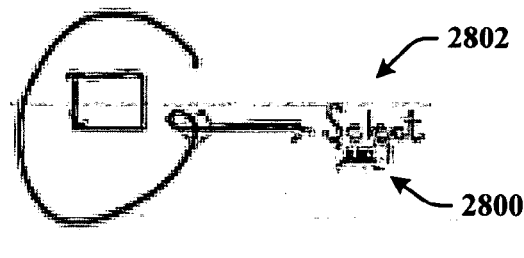
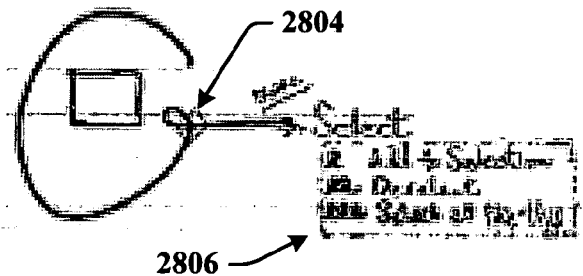
FIG. 28A  FIG. 28B
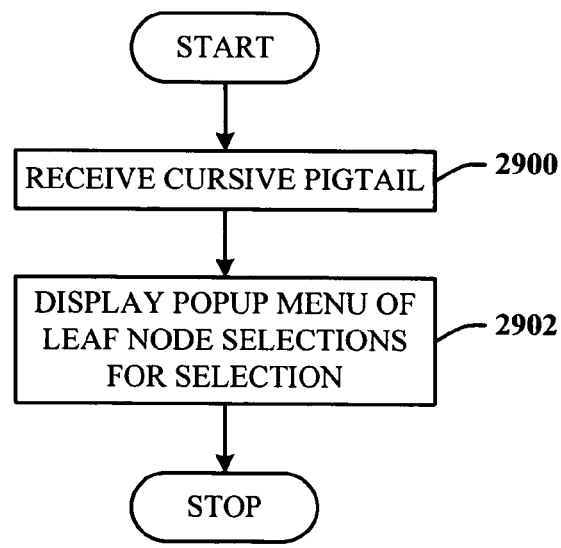
FIG. 29

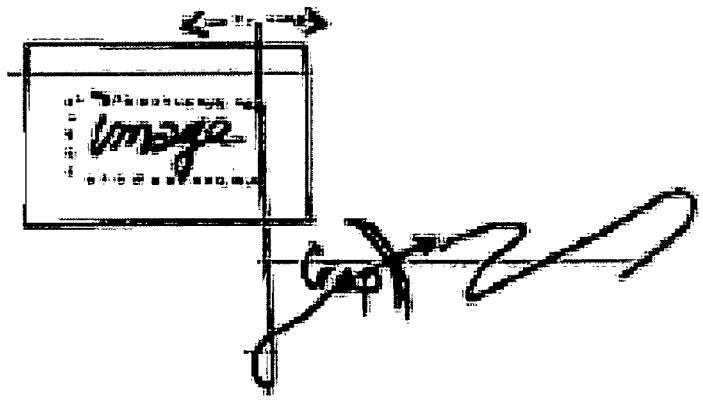
FIG. 52  FIG. 53
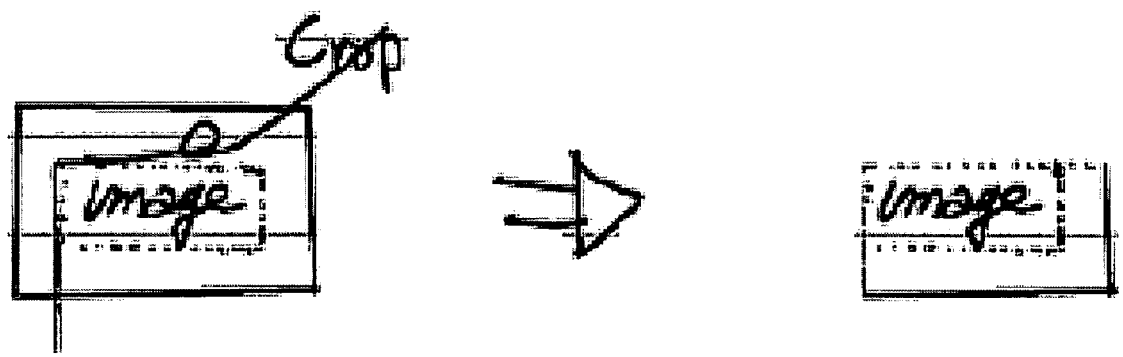
FIG. 54
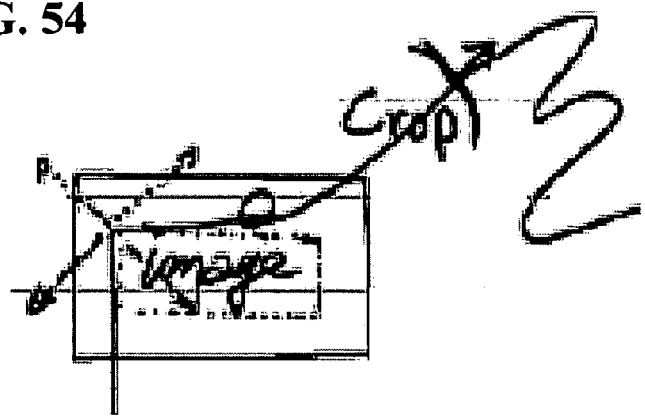
FIG. 55

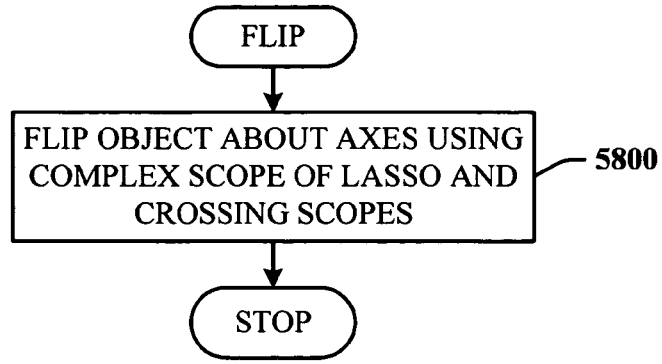
FIG. 58
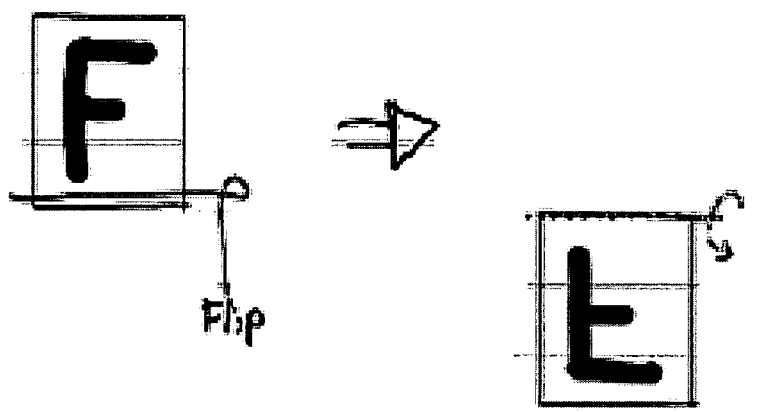
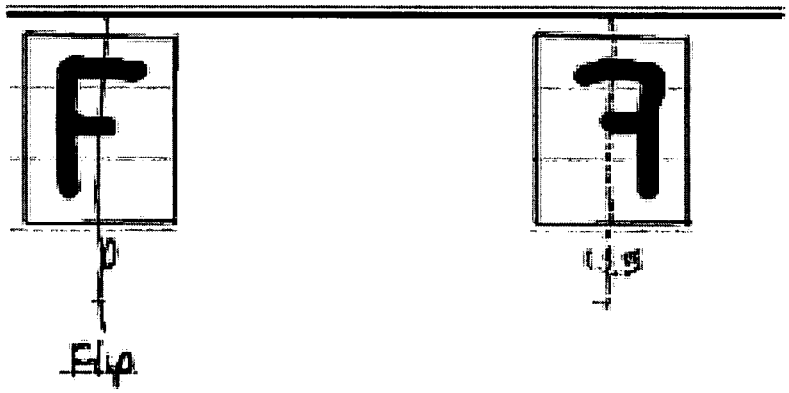
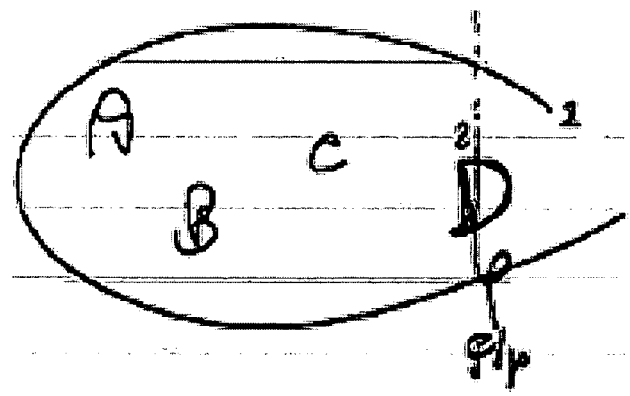
FIG. 59

DELIMITERS FOR SELECTION-ACTION PEN GESTURE PHRASES

TECHNICAL FIELD

This invention is related to pen-based input devices, and more specifically, to software that facilitates recognition and interaction with pen-based inputs.

BACKGROUND OF THE INVENTION

The current technology in commercial products such as pen-based graphical user interfaces (GUIs) is often derived from mouse-based interfaces. One goal of such pen-based systems is to mimic or at least take into consideration the mechanics of handwriting: fast, brief, and repetitive phasic muscle contractions that guide a process of rhythmically making small looping motions with a stylus or pen. However, pen-based GUI techniques in the prior art suffer from limitations and drawbacks that pose serious hurdles for users (e.g., the difficulty of learning a gesture set).

In order to facilitate the proliferation of such device interfaces, several factors need to be considered. Pen interfaces should seem fast and efficient to the user. Many conventional pen interfaces and techniques currently still build on familiar toolbars and pull-down menus, but these may require a round trip between the content area and the interaction area. Furthermore, because pens lack the state transitions offered by mouse interfaces, techniques often become burdened with timeouts or delays (e.g., tap-and-hold to bring up a menu) that the user must wait for every single time the corresponding action is invoked. Such delays are not only irritating to the user as proficiency increases with the device, but also prone to false activation, such as when the user unintentionally pauses with the pen during mental preparation (e.g., while thinking about what to do next).

Pen-based interfaces should be unambiguous. A pervasive theme in pen-based interfaces is the need for an Ink mode for leaving ink trails not subject to computer interpretation (intended for human interpretation), and a Gesture mode for indicating commands via pen input (intended for computer interpretation). Nearly all pen interaction papers in the prior art require, infer, or make a distinction between pen input that is Ink mode and pen input that is Gesture mode. Some systems infer the desired mode in some situations, such as combining inking and selection without prior selection of the mode. While this technique may be helpful for selection in some situations, the decision tree can get complex and only benefits the interface design with a single inferred mode (selection vs. ink). The approach is difficult to scale up to a system where the user may need a multiplicity of commands and gestural modes to use an application. With the latter approach it also may not be clear to the user what the interface will provide for each given stroke or input.

Sometimes special pen motions or gestures are used to switch to a temporary mode, such as dwelling with the pen (tap-and-hold or move-then-hold), making a dot (tap) with the pen after drawing an ink stroke to have it recognized, or interpreting a scrubbing gesture (scribbling back and forth to scratch out a previously drawn object) as a deletion command. The success of such mechanisms often depends on the user task, the specific application domain, as well as the details of exactly how an individual application interprets various pen events (tap, tap-and-hold, etc.). There also remains the possibility of false positive recognition (e.g., shading part of a drawing can be recognized as a scrubbing gesture, thus deleting it), since no gesture can be considered completely immune to potentially occurring in the course of freeform ink input.

The pen-based interface should be expressive. A fundamental problem with gestural interfaces in the prior art is that there is a delicate tradeoff in designing gesture sets that are learnable, memorable, and with gestures that are highly distinct from one another for the purposes of recognition. A few gestures can be recognized reliably, and recalled reliably by the user, but it becomes increasingly difficult to add more gestures and operations to an existing gesture set.

Selection-action command phrases represent a common pattern in user interfaces. The user first indicates a scope by selecting one or more objects, and then chooses a command that acts upon that scope. On the typical computer operating system desktop, the user can click and drag to sweep out a selection region, and then click on a tool palette or menu to choose a command. This typically requires a round trip between the work area and the tool palette or menu bar. Other means can be provided whereby round trips can be avoided by using right-click (e.g., on a mouse) to activate contextual menus or by learning and using keyboard shortcuts. However, this approach is less satisfactory for pens, as oftentimes no keyboard is available for shortcuts, and a button for right-click may be absent or awkward to use, making round trips unavoidable.

Accordingly, there is a substantial unmet need in the art for an improved pen-based user interface. Moreover, there is a further unmet need to provide rapid, unambiguous, and effective techniques for users of pen-operated devices to fluidly articulate selection-action command phrases.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention disclosed and claimed herein, in one aspect thereof, comprises a pen-based user interface (PBUI) that facilitates user interaction with a pen-based device. The PBUI is a fast and efficient, expressive, and unambiguous gestural interface. The PBUI interprets freehand cursive input streams to impose operations on one more selected objects. In one aspect, the cursive input stroke first provides spatial properties, passes through a pigtail, and then the remainder of the stroke becomes the command portion of the input.

In another aspect of the subject invention, the PBUI is an interface for a complex application that accommodates a large number of variations, options, and commands. Several different types of scopes are provided which support different sets of commands. Moreover, the scopes are sensitive to the types of objects on which they operate. Terminating the scopes with pigtail menus, which may be hierarchical (to at least two levels deep) and which contain extra commands per leaf node by repeated looping, allows many commands to be provided to the user via prompted selection, with a corresponding rapid gesture for expert use.

In yet another aspect thereof, delimiters for pen gestures are provided. A delimiter is "something different" in the input stream that a computer can use to determine the structure of input phrases. Four techniques for delimiting a selection-action gesture phrase are provided consisting of lasso selection plus marking-menu-based command activation. A conventional Multi-stroke delimiter is employed that uses one pen stroke for lasso selection, and a second stroke for marking. A Timeout delimiter uses dwelling with the pen to split a single pen gesture into a lasso plus a mark. A Button delimiter uses a button press to signal when to delimit the gesture. A Pigtail delimiter is a novel technique that uses a small loop to delimit the gesture. The Pigtail delimiter supports integrated scope selection, command activation, and direct manipulation all in a single fluid pen gesture.

The PBUI of the subject invention uses a pigtail gesture as a technique to integrate selection of the scope of an operation with command selection based on marking menus (called pigtail menus). The pigtail completes in any of the eight primary compass directions. This provides eight different "marking" directions just like a marking menu. The self-intersection of the pigtail forms a well-defined point that is used to segment the gesture, such that the initial part of the stroke defines the scope of the command, and the terminating portion of the stroke (from the intersection point onward) defines the mark. Pigtail menus can use prompted selection (a menu pops up if the user pauses with the pen in contact with the screen after drawing the pigtail) or "blind" selection by drawing the pigtail and rapidly completing the stroke without pausing.

In still another aspect of the invention, lasso selection is described as followed by marking-menu based command selection. Lasso selection is the act of circling one or more objects with the pen. Marking menus use a straight pen stroke (typically in one of the eight principle compass directions) to select a command.

In another aspect of the subject invention, the PBUI provides corner detection such that a right-angle scribe can be processed into a command. A backup operation can be accomplished by backwards looping. Multiple leaf nodes facilitate correspondingly multiple commands by making additional loops at the end of a gesture. Self revelation of the leaf nodes is provided in the form of pop-up menus and stroke extensions. Crossing strokes facilitate parameter specification.

In yet another aspect thereof, an artificial intelligence component is provided that employs a probabilistic and/or statistical-based analysis to prognose or infer an action that a user desires to be automatically performed.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 5A illustrates a looped (or lasso) scope selection gesture as drawn by a user around three hand drawn blocks.

FIG. 5B illustrates the self-intersection point of the ink trail segments that stroke into a scope and a mark.

FIG. 6 illustrates an exemplary Copy command using scope with command selection in accordance with the invention.

FIG. 7 illustrates an exemplary Delete command using scope with command selection in accordance with the invention.

FIG. 16A illustrates that a first stroke is the lasso scope selector.

FIG. 16B illustrates an areal handle that is generated when a subsequent disjoint second gesture stroke is initiated from the lasso.

FIG. 17 illustrates a methodology of employing the Timeout delimiter in accordance with the invention.

FIG. 21 illustrates that the use of a very small lasso scope selection utilizes a non-self-intersecting lasso.

FIG. 22 illustrates that users may draw a "pretzel" or a double-loop when reversing direction, which is recognizable under the pigtail technique, since additional loops are ignored.

FIG. 23 illustrates backwards looping to facilitate a backup command in accordance with the subject invention.

FIG. 28A illustrates leaf nodes with multiple options display small cursive loops below a command name can be provided as a cue of how many "extra loop" items.

FIG. 28B illustrates dwelling for a predetermined amount of time during presentation of a mark displays the extra loop menu items.

FIG. 29 illustrates a methodology for leaf node revelation in accordance with the invention.

FIG. 52 illustrates that direct manipulation for the Crop command allows fine adjustment of the crop line.

FIG. 53 illustrates that cropping ink objects is supported.

FIG. 54 illustrates use of a corner scope for the Crop command of the invention.

FIG. 55 illustrates a direct manipulation phase for a corner scope that allows 2D refinement of crop mark placement.

FIG. 58 illustrates a methodology of facilitating object flipping in the PBUI of the subject invention.

FIG. 59 illustrates examples of the Flip command in accordance with the invention.

DETAILED DESCRIPTION OF THE INVENTION

Figure 1:
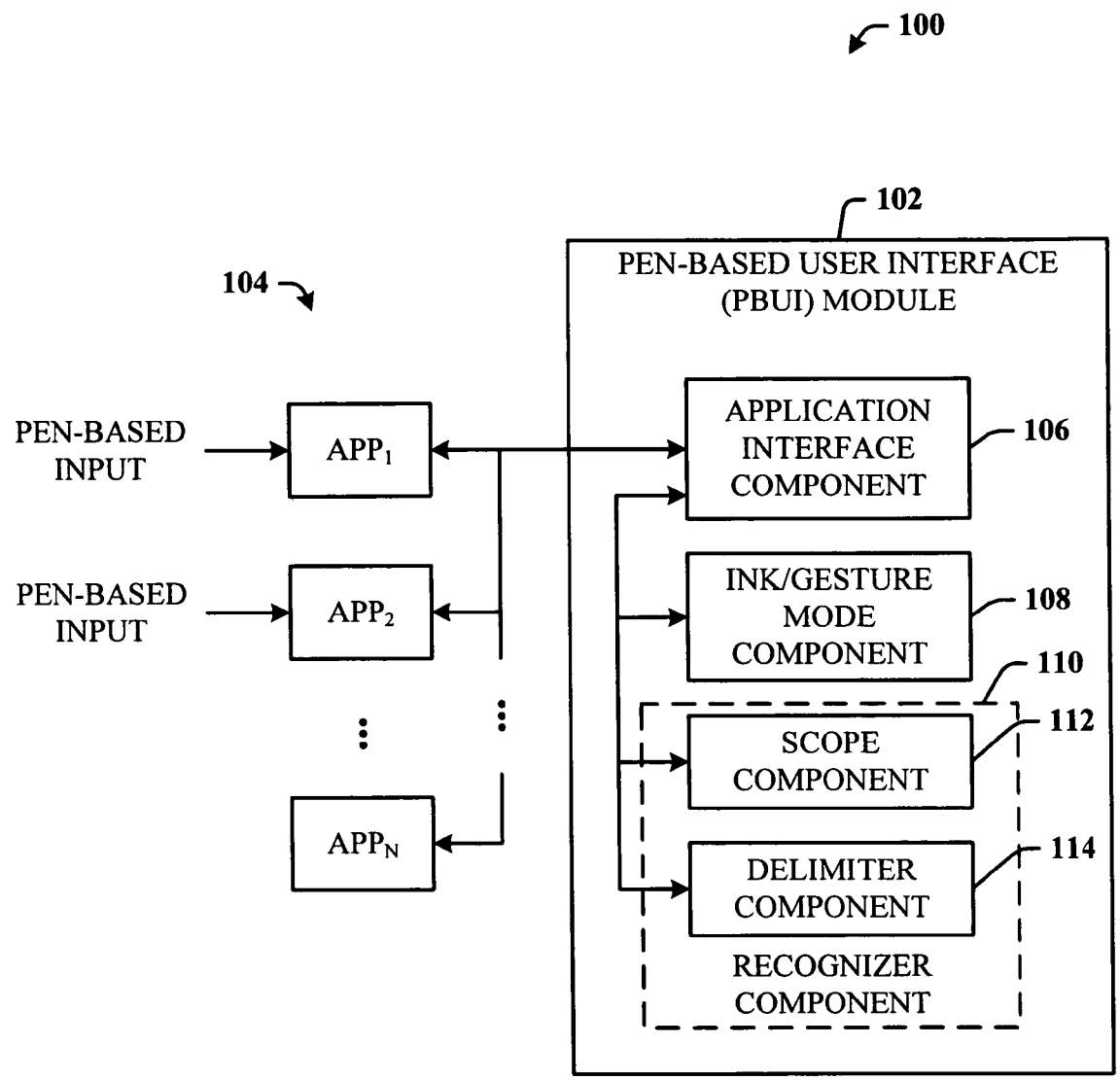
FIG. 1 illustrates a block diagram of a pen-based user interface (PBUI) system in accordance with the subject invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

While certain ways of displaying information to users are shown and described with respect to certain figures, those skilled in the relevant art will recognize that various other alternatives can be employed. The terms "screen," "screenshot," "window," "web page," and "page" are generally used interchangeably herein. The pages or screens are stored and/or transmitted as display descriptions, as graphical user interfaces, or by other methods of depicting information on a screen (whether personal computer, PDA-Personal Digital Assistant, mobile telephone, or other suitable device, for example) where the layout and information or content to be displayed on the page is stored in memory, database, or another storage facility.

Pen-Based User Interface Module

The disclosed and described pen-based user interface (PBUI) module (or component) provides rapid, unambiguous, and effective techniques for users of pen-operated devices to fluidly articulate selection-action command phrases. The design of the PBUI was inspired in part by considering the mechanics of handwriting which use fast, brief, and repetitive phasic muscle contractions that guide a process of rhythmically making small looping motions with the stylus. For example, children learning cursive handwriting often may practice making a series of cursive o's (or loops). As the individual becomes more proficient, the individual can vary the magnitude, direction, or eccentricity of these loops to produce different character forms. Dots and crosses, for example, can be employed to further accent these basic looping forms. The PBUI uses such rapid looping motions with modifiers as the basis for a pen interface. A few simple rules are provided to guide interpretation of such motions so that recognition is simple and deterministic without getting into the morass of difficult issues raised by natural handwriting recognition.

The PBUI contributes several techniques that together provide a fast, unambiguous, and expressive pen interface. One such technique is a pigtail gesture that integrates selection of a scope of an operation with command selection based on marking menus. These marking menus are called pigtail menus, and employ a straight pen stroke to select a command. In one implementation, a different command is associated with each of eight primary directions (e.g., N, S, E, W, NE, NW, SE, and SW). A pigtail is a small stroke resembling the cursive letter "e", such that the user's pen stroke crosses itself to form a small loop. Heretofore, a pigtail gesture has been used in other contexts, such as to indicate deletion of an object. However, the pigtail technique provided in the PBUI of the subject invention allows the pigtail gesture to complete in any of the eight primary compass directions. This provides eight different "marking" directions.

The self-intersection of the pigtail gesture forms a well-defined point that is used to segment the gesture, such that the initial part of the stroke defines the scope of the command, and the terminating portion of the stroke (from the intersection point onward) defines the mark. Like traditional marking menus, the pigtail menu can include a prompted selection whereby a menu pops up if the user pauses with the pen in contact with the screen after drawing the pigtail, or a "blind" selection by drawing the pigtail and rapidly completing the stroke without pausing. By integrating scope and command selection in a general way, pigtail menus offer an important innovation. Pigtail menus help by providing prompted marking as a possibility at the terminus of a pen stroke that indicates a spatial context, thus offering a pen interface with a small number of gestural forms that lead to self-revelation of a plurality of commands via pigtail menus.

Referring now to FIG. 1, there is illustrated a block diagram of a PBUI system 100 in accordance with the subject invention. The system 100 includes a PBUI module 102 that provides all of the capabilities described herein for pen-based processing. The module 102 facilitates interfacing with any or all of a plurality of applications 104 (denoted $APP_1$, $APP_2$, ..., $APP_N$) that can be hosted on a computing system (or device). Typically, each of the applications 104 is suitably designed to receive pen-based input. However, this is not a requirement of the system 100, as some of the applications 104 may not be suitable for pen-based input, and can instead employ the techniques of the present invention using other pointing devices, such as mice or touchpads.

The PBUI module 102 includes an application interface component 106 that provides interfacing to any of the applications 104 designed for pen-based input. For example, the application $APP_1$ can be an operating system of a pen-based device on which the PBUI module is installed. The PBUI module 102 also includes an Ink/Gesture mode component 108 that facilitates receiving input which alternates between Ink mode and Gesture mode. A recognizer component 110 provides the capability to recognize the pen-based input sketched by a user. In support thereof, the recognizer component 110 further comprises a scope component 112 that facilitates scope processing in accordance with simple and complex scopes described infra. As well, the recognizer component 110 includes a delimiter component 114 that processes delimiters, as described in detail herein.

Note that is it to be appreciated by one skilled in the art that the components (106, 108, 110, and 112) can be combined in any suitable manner, insofar as the capabilities of the novel PBUI are maintained. For example, the Ink/Gesture component 108 can be combined with the scope component 112. Similarly, the scope component 112 and the delimiter component 114 can be combined into a single component, and which single component is external to the PBUI module 102. It is further to be appreciated that although the description is focused on a pen-based architecture, such user interaction can be by different input devices, for example, a mouse, trackball with buttons, etc.

Figure 2:
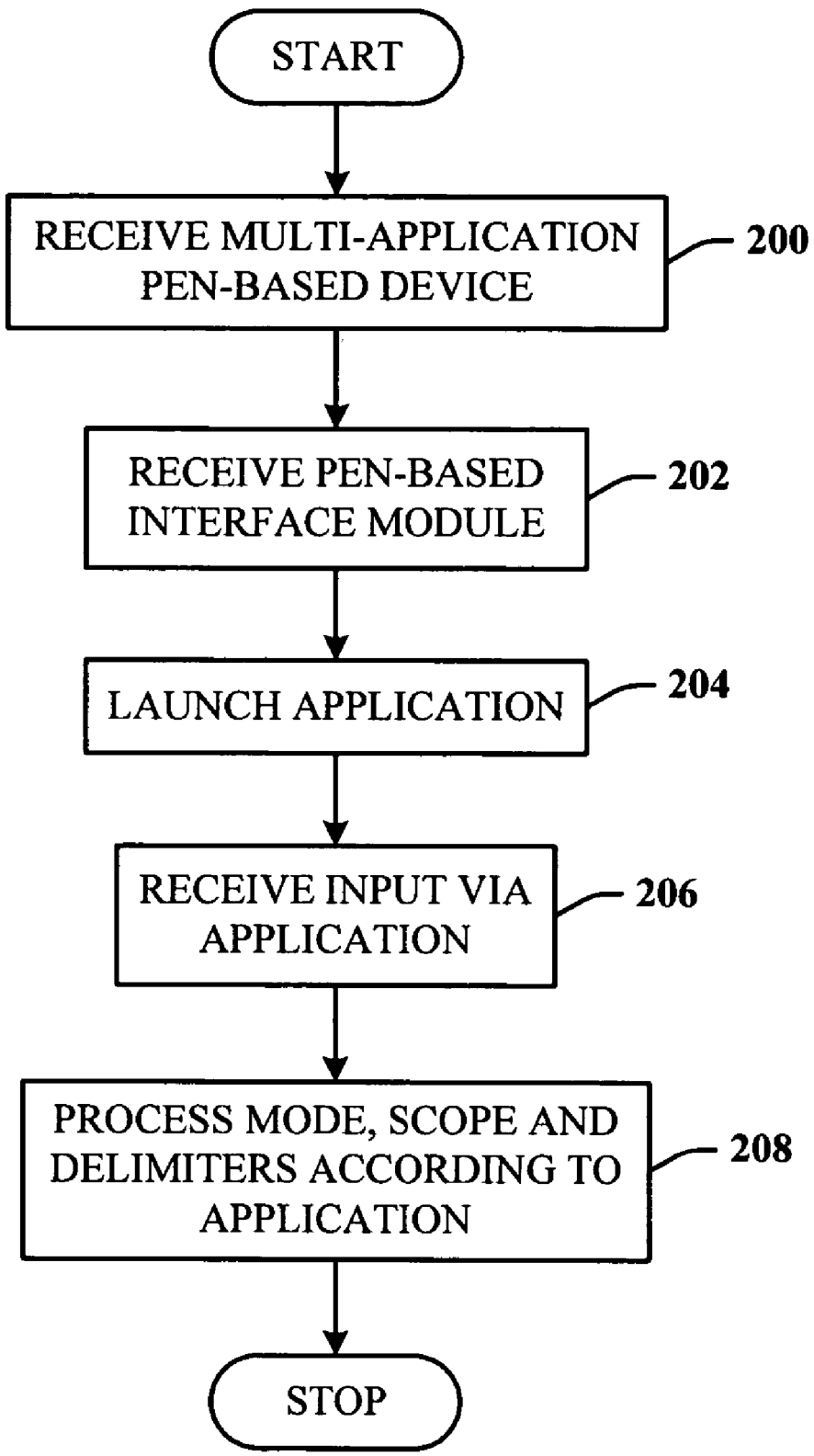
FIG. 2 illustrates a methodology of pen-based processing in accordance with the subject invention.

Referring now to FIG. 2, a methodology of pen-based processing is provided in accordance with the subject invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 200, a multi-application pen-based device is received. At 202, the novel PBUI module is installed on the device to process pen-based user input. At 204, one of the applications is launched. At 206, a user brings the pen in communication with a display of the device to initiate interaction with the device. At 208, mode information, scope information, and delimiter information are input and processed accordingly.

Figure 3:
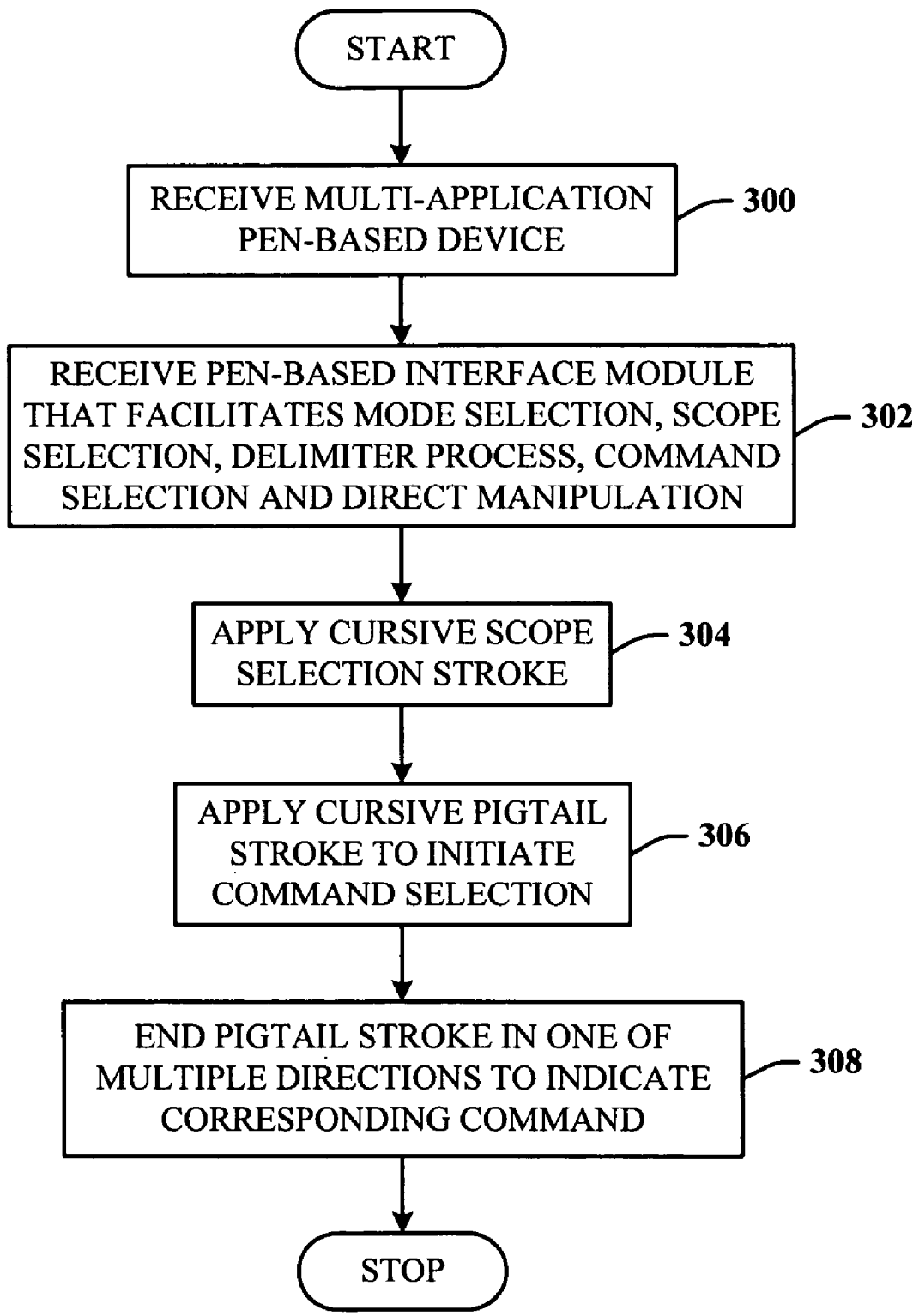
FIG. 3 illustrates a more detailed methodology of pen-based processing in accordance with the invention.

FIG. 3 illustrates a more detailed methodology of pen-based processing in accordance with the invention. At 300, a pen-based device is received. At 302, the PBUI module is installed, and facilitates at least simple and complex scope processing, delimiter processing, command selection, and direct manipulation, as described herein. At 304, the user interacts therewith via an application to input scope selection associated with one or more application objects. At 306, the user applies a cursive scope selection pen stroke. At 308, the user inputs a pigtail delimiter stroke to end scope selection and begin command processing. At 308, the user ends the pigtail stroke in one of multiple directions to indicate a corresponding command which is to be processed against the one or more objects selected during the scope input phase.

Figure 4:
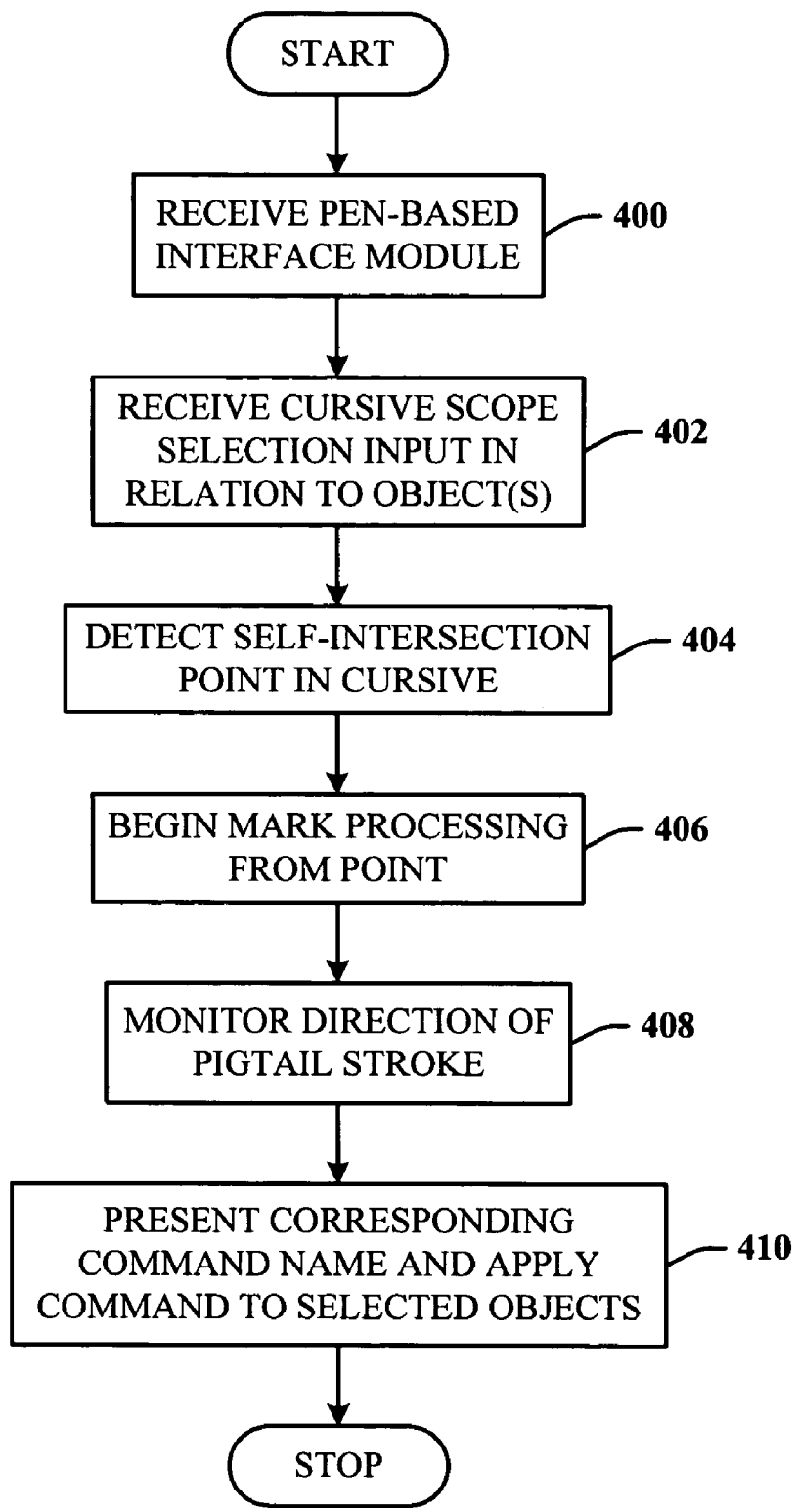
FIG. 4 illustrates a methodology of pen-based scope and mark processing in accordance with the invention.

FIG. 4 illustrates a methodology of pen-based scope and mark processing in accordance with the invention. Once the user completes input of a scope (e.g., a lasso scope used to encompass one or more objects), a delimiter is applied to signal the end of scope input and the beginning of command processing. Delimiter processing allows the pigtail delimiter to complete in any of a plurality of compass directions (e.g., the eight primary compass directions). This provides a corresponding plurality of different "marking" directions, similar to that provided by a marking menu. The self-intersection of the pigtail forms a well-defined point that is used to segment the gesture, such that the initial part of the stroke defines the scope of the command, and the terminating portion of the stroke (from the intersection point onward) defines the mark. Like traditional marking menus, pigtail menus may use prompted selection (a menu pops up if the user pauses with the pen in contact with the screen after drawing the pigtail) or "blind" selection by drawing the pigtail and rapidly completing the stroke without pausing.

In support thereof, at 400, the PBUI module is received. At 402, the user inputs a cursive scope selection stroke in relation to zero, one, or more objects. Selection of empty space can signify a meaningful scope. For example, this can signify a global menu which contains commands that do not pertain to any specific object(s). Hence, the user might start forming such gestures on an empty page containing zero objects. At 404, the PBUI module monitors the stroke to detect a self-intersection point. At 406, once self-intersection is detected, mark processing begins. The system then monitors the direction of the pigtail, as indicated at 408. At 410, the pigtail direction is processed, and the corresponding command displayed and applied to the selected object(s).

FIGS. 5A and 5B illustrate a pigtail menu that integrates selection of scope with command selection in accordance with the subject invention. FIG. 5A shows a looped (or lasso) scope selection gesture as drawn by a user around three hand drawn blocks. A pigtail 500 terminates in a horizontal and rightward direction. FIG. 5B depicts the self-intersection point of the ink trail and segments that stroke into a scope 502 and a mark 504. Here, the three blocks inside the scope 502 become selected, and the mark 504 chooses and displays a Group command. In this implementation, the horizontal stroke to the right of the pigtail 500 is interpreted as the Group command.

FIG. 6 shows an exemplary Copy command using scope with command selection in accordance with the invention. A scope loop 600 is drawn around two blocks that the user desires to copy. A pigtail 602 terminates the scope loop 600 with a vertical and downward stroke. Here, the two blocks inside the scope loop 600 become selected, and the mark 602 chooses and displays the Copy command.

FIG. 7 shows an exemplary Delete command using scope with command selection in accordance with the invention. A scope loop 700 is drawn around one block (in the background) that the user desires to delete. A pigtail 702 terminates the scope loop 700 with a horizontal and leftward stroke. Here, the one block inside the scope loop 700 becomes selected, and the mark 702 chooses and displays the Delete command.

The PBUI can be used across a wide variety of pen applications. Thus, a mechanical signal can be employed to avoid errors in interpretation. For example, in one implementation, a wireless foot pedal can be used for Ink and Gesture mode selection in pen interfaces. It is to be appreciated, however, that instead of or in combination therewith the foot pedal, or for purposes unrelated to changing modes, voice signals can be presented to the device such that voice recognition processes the voice signals to control one or more features thereof. By default, all pen strokes can be treated as Ink mode strokes that are not subject to interpretation by the computer. When the user depresses the foot pedal, the current stroke (or subsequent stroke if the pen is not currently in contact with the screen) is interpreted as a gesture. Note that user may depress the foot pedal in mid-stroke to retroactively interpret the entire stroke as a gesture. This eases the burden on the user to have to remember to hit the foot pedal before starting a gesture. A foot pedal is just one of many types of mechanistic approaches that can be employed. Other mechanisms include but are not limited to using on-screen buttons, a barrel button on the pen, a wired or wireless button held in the non-preferred hand, or using the non-preferred hand to activate a button, a touch-sensitive area, or pressure sensitive area on the bezel of the screen.

Figure 8:
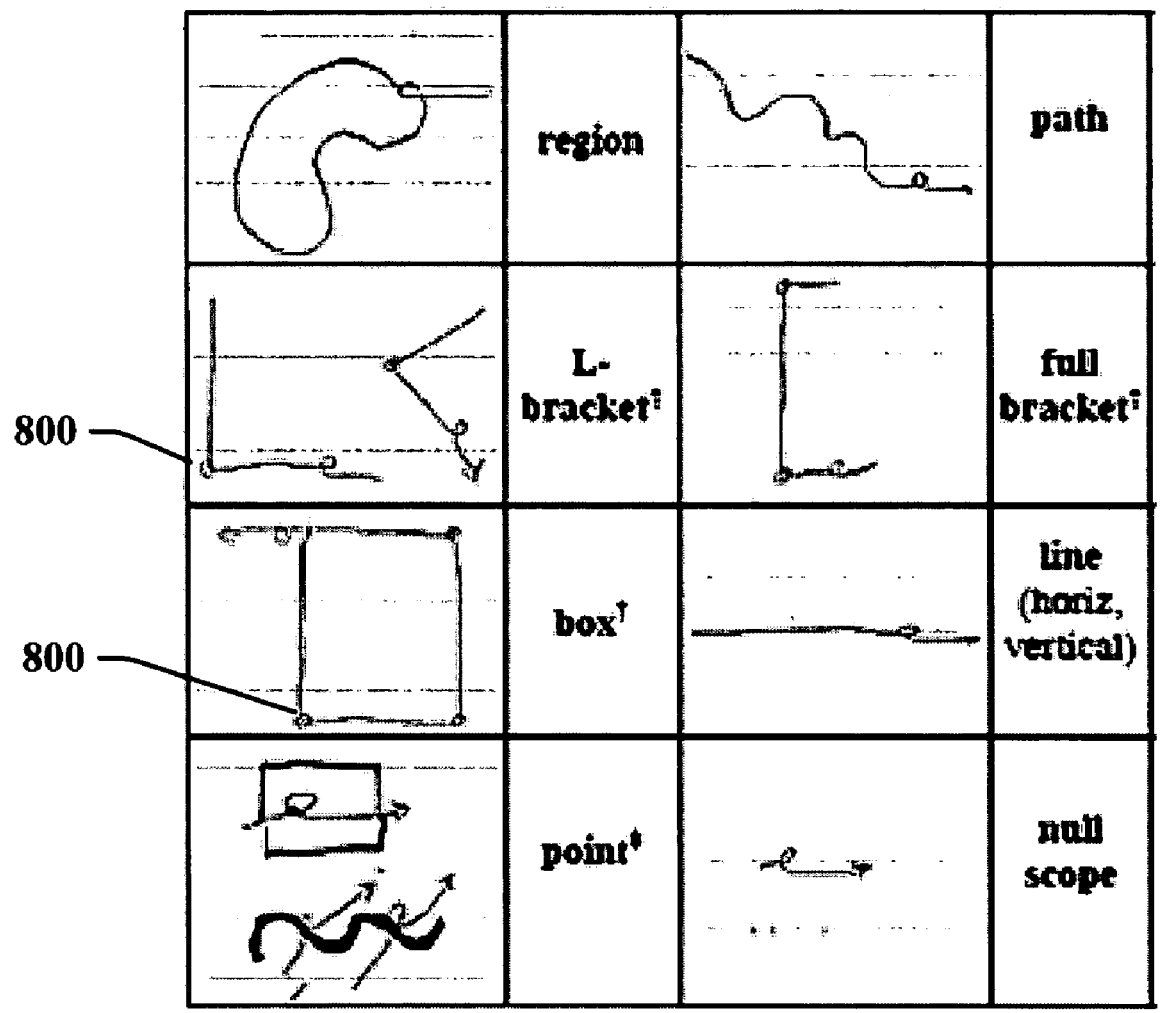
FIG. 8 illustrates a table of scopes some or all of which can be utilized with a number of different applications.

Referring now to FIG. 8, a table of scopes is provided some or all of which can be utilized with a number of different applications. It is to be appreciated by one skilled in the art, however, that not all such scopes may be useful to consider in a given application. To expand the expressiveness of the PBUI, several different types of scopes are supported, any of which can be terminated by a pigtail menu. A scope not terminated by a pigtail menu can be associated with a default command (more similar to traditional gestures) or action such as selecting the indicated objects. The options presented in a pigtail menu can depend on the type of scope, as well as the type of objects indicated by the scope. Supported scopes include regions (closed loops), paths, lines, corners, boxes, self-intersection points, tapped points, and the null scope. Tapped points is tapping with the pen while in gesture mode, and is useful in multi-stroke command constructs, e.g., tap on a series of objects, then draw a pigtail to activate a command on those objects. The "point" of FIG. 8, which is a "self-intersection point" can be used as an alternative to the tapped point. Small circles 800 (e.g., in the L-brackets, full bracket, and box scopes) indicate sharp corners (or inflection points) that are automatically recognized in the gesture. The point scope indicates that a hit test is performed to test the intersection of one or more points on the pigtail versus the underlying objects. If no object is hit (or intersects with the pigtail), it is interpreted as the null scope.

The self-intersection point scope (also called the single item scope) allows access to commands specific to an individual object on the screen. Sometimes lasso selection is not appropriate when the user wants to be certain that a command is applied to only a single specific object. Drawing a pigtail on top of a single item (with no preceding lasso) selects that item and activates its menu. Here, selection is by hit-testing underlying objects using the self-intersection point of the pigtail. This is the equivalent of a click with the mouse, but has the virtue that it leaves the pen's Tap event available for other application-specific uses, rather than consuming it for menu activation. In some embodiments, the single item scope is distinguished from the line scope, crossing scope, and null scope by hit testing multiple points of stroke against underlying objects, as well as considering the Z-stacking order of the objects. This is needed to avoid ambiguity in some situations. For example, consider a dot of ink surrounded by a circle of ink, drawn on top of a photograph. To select just the dot of ink, the user can make a pigtail gesture starting on the dot. Although the self-intersection of the pigtail would hit the photograph, this is riot selected, as the ink dot lies on top of the photograph.

The null scope allows access to a global menu by drawing a pigtail over empty space. This menu currently includes commands such as Paste, Next Page and Previous Page to flip between pages of a "scrapbook", Exit, Debug (for debugging), Start (to start a task), and New (to create or load new objects). The Paste command, if activated in mark-ahead mode, rather than pasting-and-dragging the item via the direct manipulation phase, uses the self-intersection of the pigtail to determine where to Paste the clipboard contents.

Figure 9:
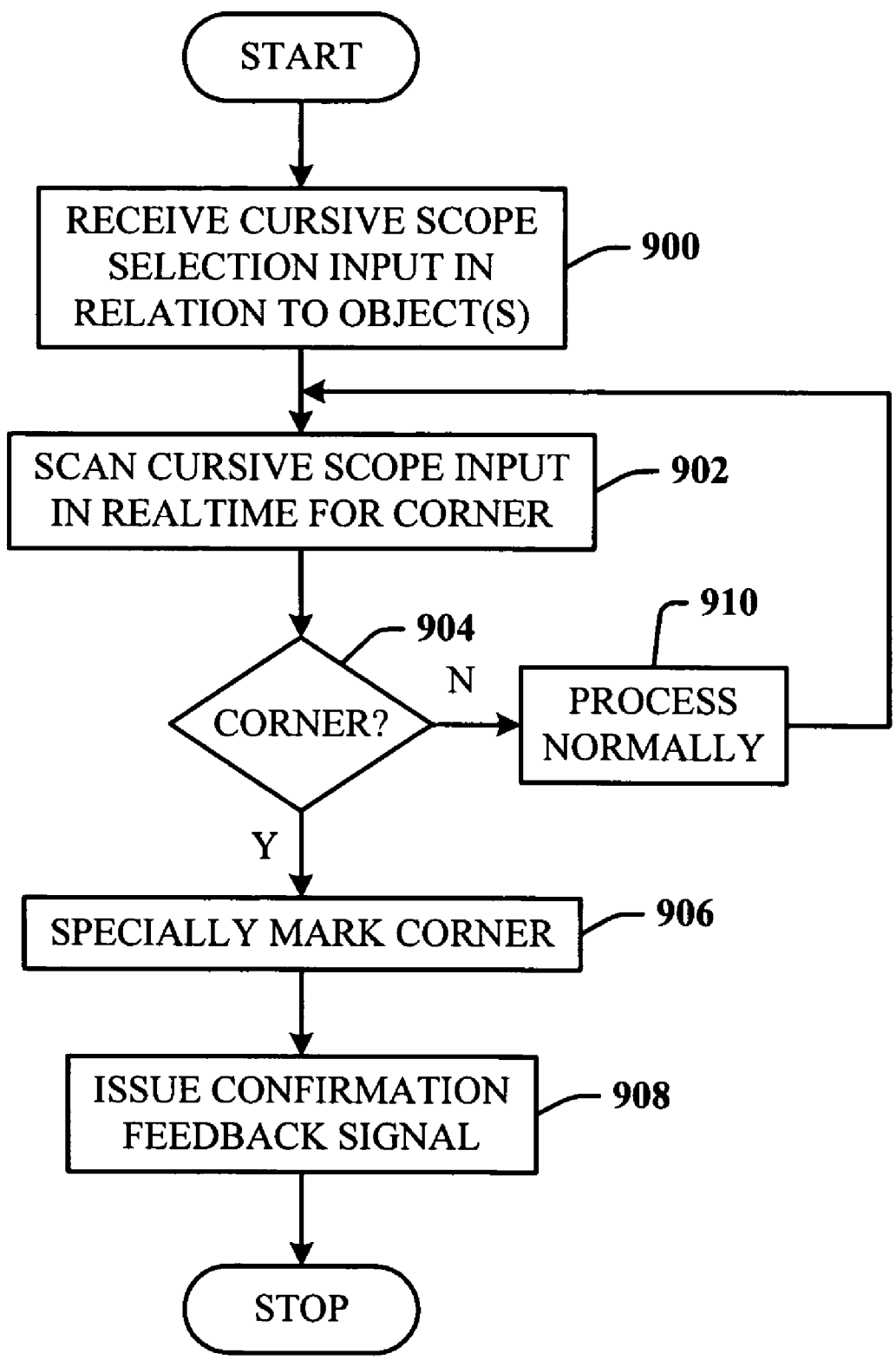
FIG. 9 illustrates a methodology of corner processing of a scope in accordance with the invention.

FIG. 9 depicts a methodology of corner processing of a scope in accordance with the invention. At 900, the user input scope selection in relation to one or more objects. While in gesture mode, the PBUI automatically scans the pen stroke in real time (as the user is making the stroke) looking for corners, as indicated at 902. If, at 904, a corner is detected, flow is to 906 to specially mark the corner. At 908, the user is given immediate feedback when a corner is detected. The PBUI draws a small orange circle around the detected inflection point, and optionally may provide an extremely short "bip" audio signal as a form of feedback. This helps the user to confirm if a feature of their stroke was recognized (or misrecognized). At 904, if the corner is not detected, the scope is processed normally, as indicated at 910, and flow returns back to 902.

Referring again to FIG. 8, corners are used to distinguish the L-bracket, full bracket, and box scopes from other scopes. Note that corners which may be recognized within a pigtail are ignored. Prompting for the types of scopes available is possible if the user dwells with the pen after pressing the foot pedal, for example.

Delimiters

Interactive systems typically require delimiters to determine the lexical structure of an input phrase. A delimiter is something different about the pen input stream that can be used to determine the structure of input phrases by mapping the user pen gesture into a selection plus an action. Four techniques are provided for delimiting a selection-action gesture phrase consisting of lasso selection plus marking-menu-based command activation. Multi-stroke is a technique that uses one pen stroke for lasso selection, and a second stroke for marking. Timeout is a second technique that uses dwelling with the pen to split a single pen gesture into a lasso plus a mark. Button is a third technique that uses a button press to signal when to delimit the gesture. Finally, pigtail is a novel technique that uses a small loop to delimit the gesture. Pigtail supports integrated scope selection, command activation, and direct manipulation all in a single fluid pen gesture.

Figure 10:
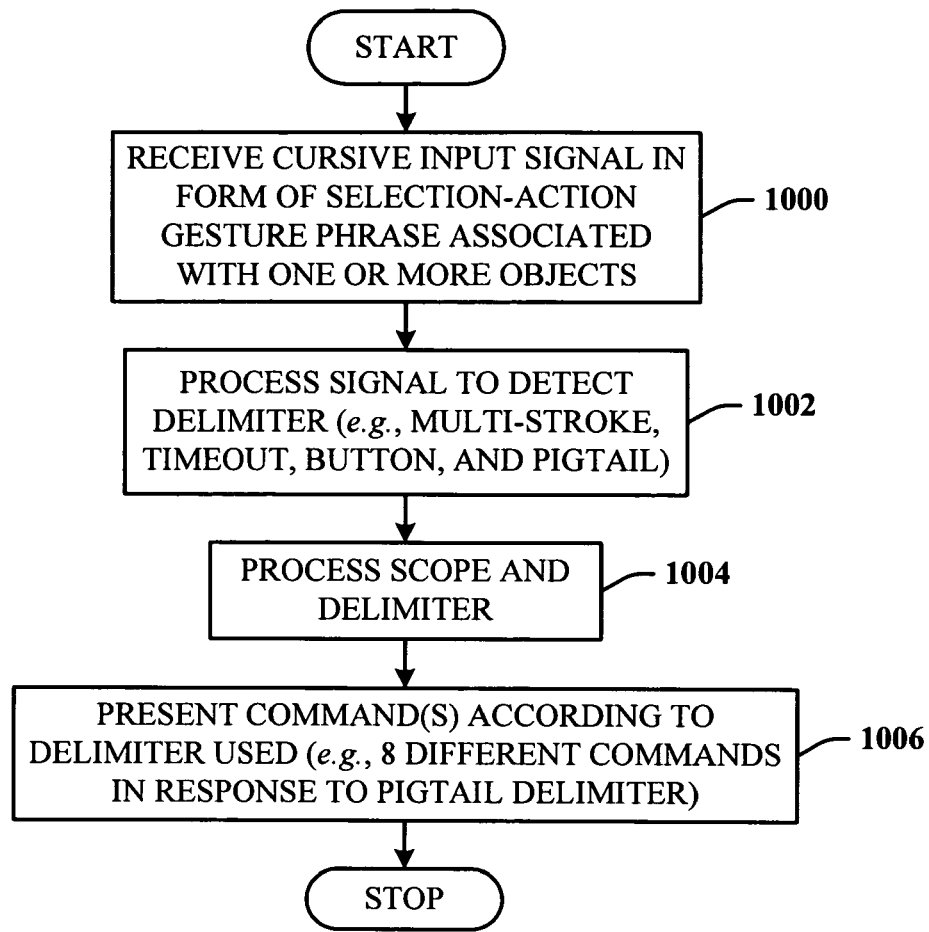
FIG. 10 illustrates a methodology of scope selection delimiting in accordance with the subject invention.

Accordingly, FIG. 10 illustrates a methodology of scope selection delimiting in accordance with the subject invention. At 1000, a cursive input signal is received in the form of a selection-action gesture phrase that is associated with one or more objects. At 1002, the signal is processed to detect the type of delimiter (e.g., multi-stroke, timeout, button and pigtail). At 1004, the scope and delimiter are then processed together. At 1006, one or more commands are presented for selection according to the delimiter used (e.g., at least eight different commands are presented for selection if the delimiter used is the pigtail).

Figure 11:
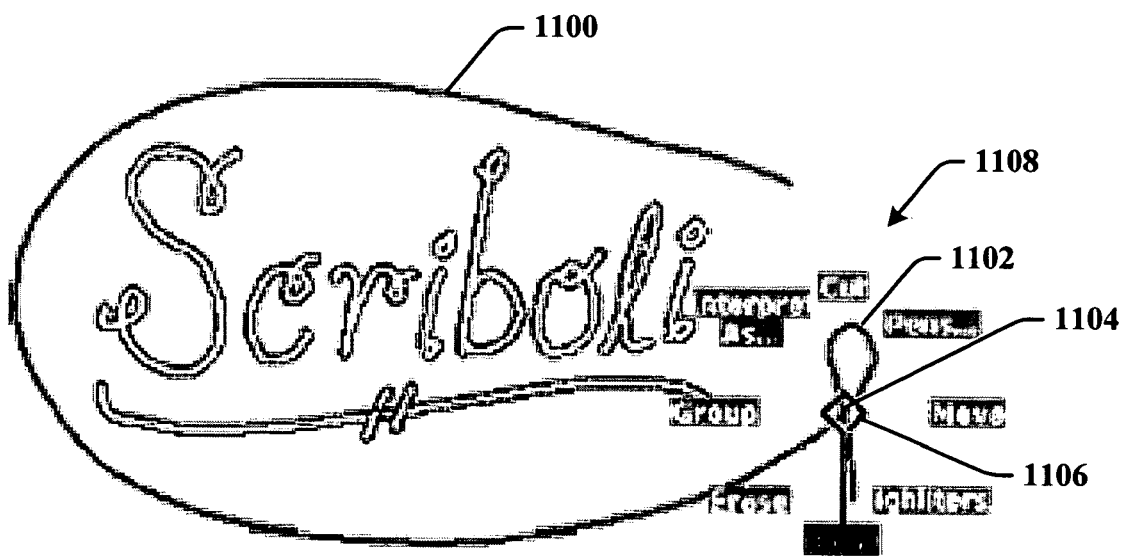
FIG. 11 illustrates a lasso scope selection about a cursive word "Scriboli" that terminates in a pigtail delimiter in accordance with the invention.
Figure 12:
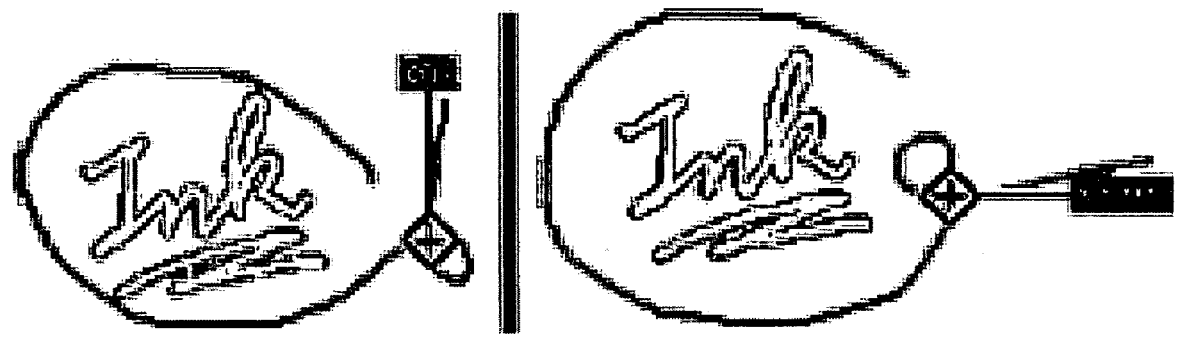
FIG. 12 illustrates that drawing the tail of the pigtail in different directions according to the command marking menu of FIG. 11 invokes different commands.

FIG. 11 illustrates a lasso scope selection 1100 about a cursive word "Scriboli" that terminates in a pigtail delimiter 1102 in accordance with the invention. The self-intersection point 1104 is displayed with a mark 1106. Once the self-intersecting point 1104 is detected, a command marking menu 1108 is automatically presented which displays, for example, eight options: Cut, Pens . . . , Move, Highlighters, Copy, Erase, Group, and Interpret As . . . . A downward pen stroke therefrom is interpreted to be the Copy command. FIG. 12 illustrates that drawing the tail of the pigtail in different directions according to the command marking menu 1108 of FIG. 11 invokes different commands. The pigtail delimiter splits the user gesture into a lasso (which here selects the word "Ink") and a mark, which in one instance the direction is to the Cut command, and in another instance, the tail direction is to the Move command.

The focus of the following section of this description is on lasso scope selection followed by marking-menu based command selection. Lasso selection is the act of circling one or more objects with the pen, and is a common selection technique for pen-operated devices. It is also well suited to the scenarios of selecting regions containing handwritten notes or diagrams, which may contain dozens of small ink strokes. However, delimiters may be applied to other means of indicating scope, including but not limited to those of FIG. 8. Marking menus use a straight pen stroke (e.g., in one of the eight principle compass directions, as described supra) to select a command. Marking menus have been shown to be a rapid and effective means for command activation.

Selection-action command phrases represent a common pattern in user interfaces: the user first indicates a scope by selecting one or more objects, and then chooses a command that acts upon that scope. In a conventional desktop environment, the user might click and drag to sweep out a selection region, and then click on a tool palette or menu to choose a command. This typically requires a round trip between the work area and the tool palette or menu bar. More experience users (or "experts") oftentimes can avoid round trips by using right-click on the mouse to activate contextual menus, or by learning and using keyboard shortcuts. However, this approach is less satisfactory for pens, as often no keyboard is available for shortcuts, and a button for right-click may be absent or awkward to use, making round trips unavoidable.

Prior art single-stroke techniques only support three commands (Move, Copy, and Delete) for groups of objects, and the systems suffer inconsistencies between "multiple object" and "single object" versions of commands. The delimiter techniques of the subject invention generalize and extend the prior art techniques, providing a consistent mechanism to apply any of at least eight different marking menu commands to a selection of either a single object or of multiple objects. It is to be appreciated that additional commands can be supported by using hierarchical marking menus with the delimiters.

Figure 13:
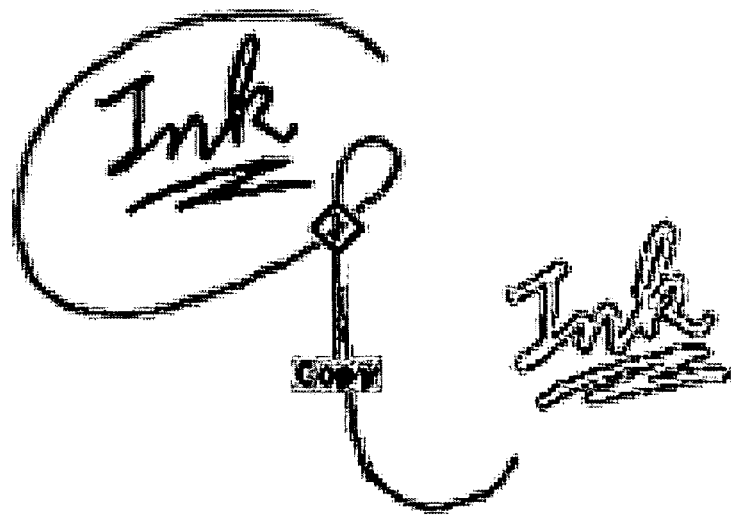
FIG. 13 illustrates a pigtail feature of direct manipulation in accordance with the invention.

The disclosed pigtail gesture technique deliberately explores the potential of using small closed loops as delimiters for pen-based interaction techniques. Pigtail supports scope selection via an initial lasso, command activation via marking, and direct manipulation via a variation on the technique of crossing the outer boundary of the menu, all three phases in a single continuous pen stroke. FIG. 13 illustrates a pigtail feature of direct manipulation in accordance with the invention. Pigtail supports a final direct manipulation phase by dragging past the outer boundary of the menu. Here, the user drags a copy of the word "Ink" to the desired final location.

Figure 14:
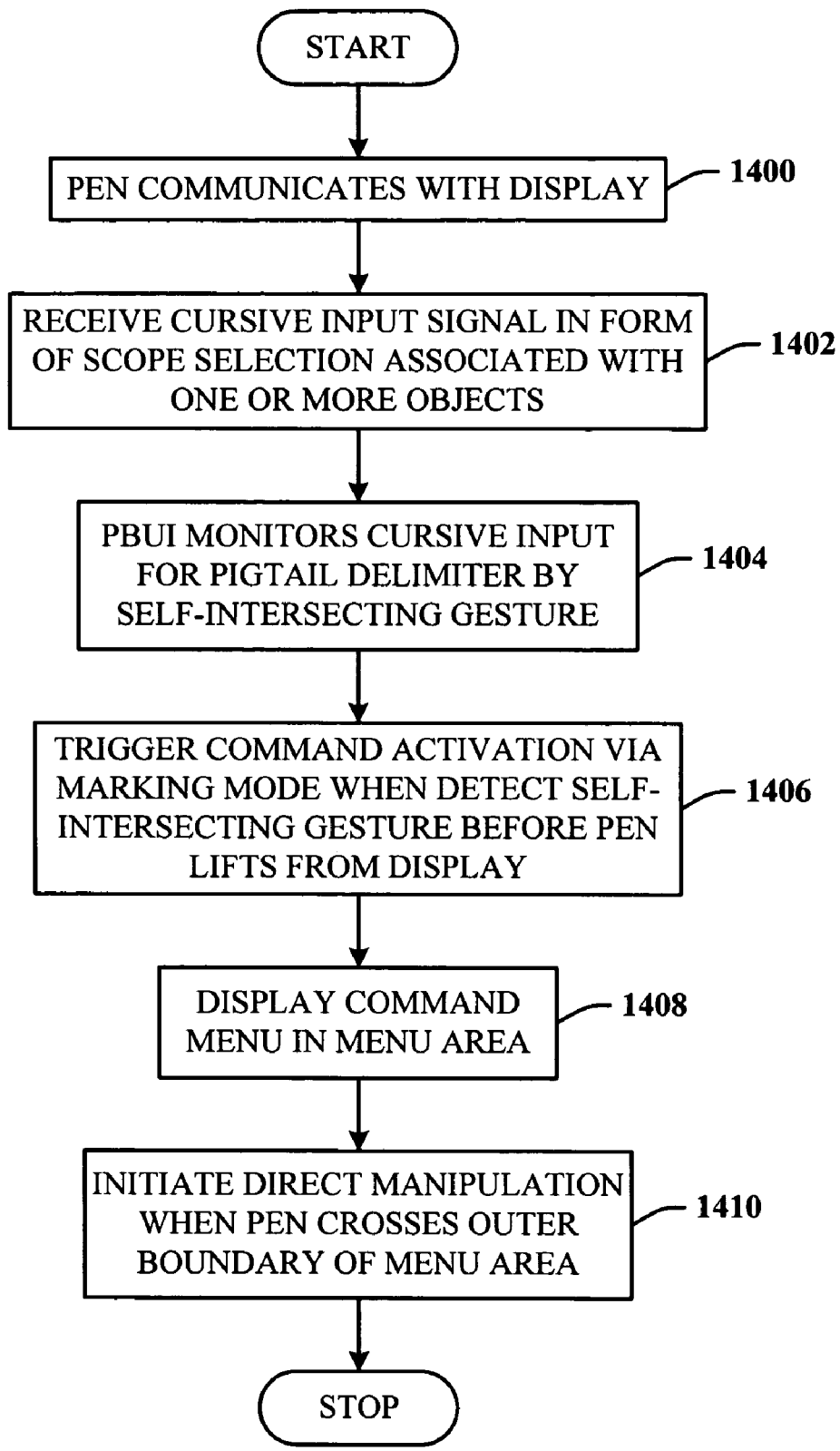
FIG. 14 illustrates a methodology of direct manipulation by pigtail delimiting in accordance with the subject invention.

Accordingly, FIG. 14 depicts a methodology of direct manipulation by pigtail delimiting in accordance with the subject invention. At 1400, the pen is brought into communication with the device display. At 1402, the device receives cursive input in the form of a scope selection (e.g., lasso) associated with one or more objects. At 1404, the PBUI monitors the cursive input for a pigtail delimiter by a self-intersecting gesture. At 1406, command activation is triggered via a marking mode when the self-intersecting point is detected, and before pen lifts from display. At 1408, command menu is displayed in menu area. At 1410, direct manipulation is initiated when the pen crosses an outer boundary of the menu area.

Prior art systems have used a pigtail gesture to represent a single command, but only recognize the pigtail after the pen is lifted, and have not used a pigtail as a way to activate a marking menu. In contrast, the pigtail technique of the subject invention uses a pigtail as a delimiter, and looks for pigtails during gesture mode while the pen moves in contact with the display. A self-intersecting gesture meeting recognition criteria for a pigtail immediately triggers marking mode, before the pen is lifted. This allows the pigtail technique to integrate numerous commands into the scope specified by the preceding portion of the gesture.

As described herein, the pigtail delimiter suggests self-crossing of a gesture as a new design element for crossing interfaces. Although the focus is on lasso selection, all four delimiter techniques are designed to be general methods that are applicable to other methods of indicating scope, such as specifying a scope by drawing a crossing stroke through an object, or other methods including those depicted in FIG. 8.

Multi-Stroke Delimiter

The conventional Multi-stroke delimiter employs attaching a small box (the "handle") to the end of the scope selection lasso. The purpose of the handle is to provide an activation point for the scope so that the user can defer the action portion of a selection-action command phrase to a later point in time (e.g., a subsequent ink stroke). The handle on the Multi-stroke delimiter of the subject invention is a pixel area (e.g., a 48×48 pixel area) that appears as soon as the PBUI system receives the pen-up event for a valid lasso. The PBUI system uses a lasso with automatic completion, so a valid lasso is any pen gesture that contains object(s) after connecting the last point to the first point. Upon a pen-down event inside the handle, marking mode begins and the user is provided with a short, distinct audio cue to signal this. If the user has not completed the mark within a predetermined duration of time (e.g., 333 ms), a pop-up menu is presented.

Figure 15:
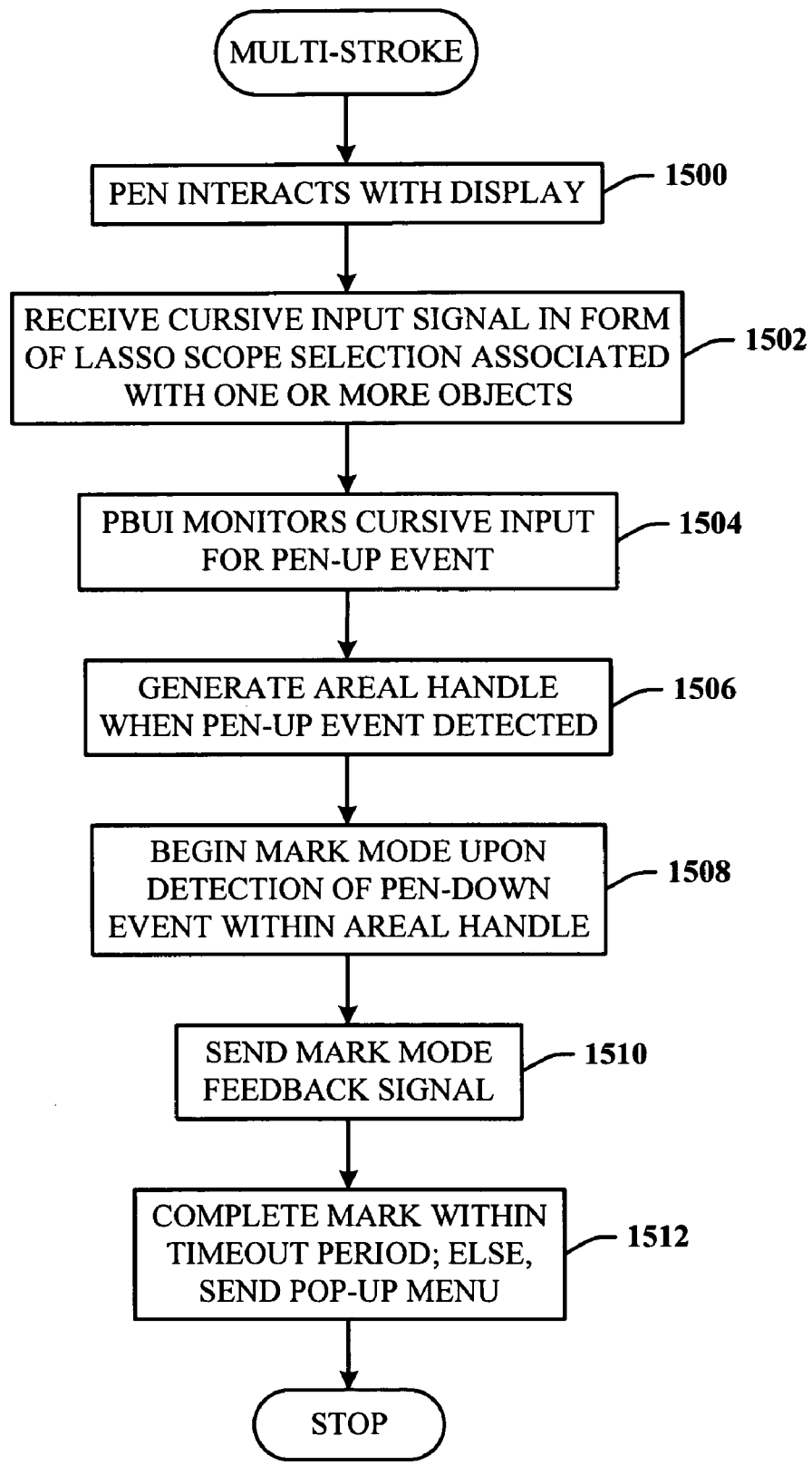
FIG. 15 illustrates a methodology of employing a Multi-stroke delimiter in accordance with the invention.

Accordingly, FIG. 15 illustrates a methodology of employing a Multi-stroke delimiter in accordance with the invention. At 1500, the pen is brought proximate to or in contact with the device display. At 1502, the user draws a cursive input signal in the form of a lasso scope selection that is associated with one or more objects. At 1504, the PBUI monitors the cursive input for a pen-up event. At 1506, an areal handle is automatically generated when the pen-up event is detected. At 1508, when a pen-down event is detected within the areal handle, the mark mode is initiated. At 1510, a feedback signal is presented that confirms mark mode or the user. This feedback signal can be audio, optical, or vibratory, for example, or any combination thereof that indicates to the user that mark mode has been initiated. At 1512, mark mode must be completed with a predetermined timeout period; otherwise, a pop-up menu is presented to the user.

FIG. 16A illustrates that a first stroke 1600 is the lasso scope selector. FIG. 16B depicts an areal handle 1602 that is generated when a subsequent disjoint second gesture stroke 1604 is initiated from the lasso 1600. Within the areal handle 1602 is a mark 1606 that indicates the starting point for the second stroke 1604. Note that using the entire lasso region can be used as a handle. However, providing the handle 1602 separate from the lasso offers a more general technique while still providing very quick access to marking.

Timeout Delimiter

Many conventional pen-operated devices use a pause (without moving the pen) as a way to synthesize an extra input state. The Timeout delimiter of the subject invention is a drag-and-hold gesture that requires holding the pen still for predetermined duration of time (e.g., about 300-1500 ms) while dragging (drawing the lasso). A 500 ms-delay between cessation of pen movement and popping up the menu represents a good tradeoff between popping up the menu as rapidly as possible, while not being so short a delay that it leads to excessive accidental activations. When the timeout expires, the same feedback signal as used in the Multi-stroke technique can be presented. In one implementation, instead of immediately popping up the menu, an additional wait of about 333 ms can be provided before the menu is presented.

Accordingly, FIG. 17 illustrates a methodology of employing the Timeout delimiter in accordance with the invention. At 1700, the pen is brought into communication with the device display. At 1702, the device receives a cursive input signal (as drawn in a drag-and-hold fashion by the user) in the form of a lasso scope selection that is associated with one or more objects. At 1704, at the end of the drag-and-hold stroke, the user enters the hold position. The hold position is designed to be within a hold region of a predefined area. At 1706, the PBUI system processes the hold at the hold position. At 1708, a confirmation feedback signal is presented to the user. At 1710, a pop-up menu is displayed to the user such that a command can be selected.

Figure 18:
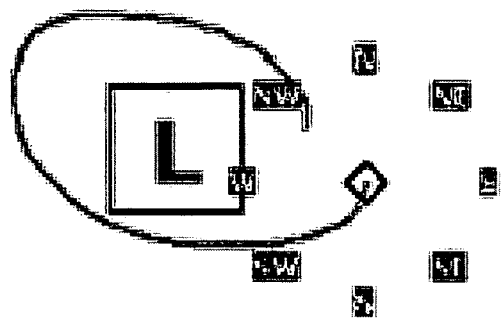
FIG. 18 illustrates a pop-up menu that is presented for the Timeout delimiter in accordance with the invention.

FIG. 18 illustrates a pop-up menu that is presented for the Timeout delimiter in accordance with the invention. As shown, the menu has a minimal visual footprint that does not distract the user. Incidental pen travel is allowed during the timeout. The pen is considered to be stationary as long as it remains within a small distance (e.g., ±5 pixels) of the position at which the timeout started. Motion beyond this threshold restarts the timeout.

Button Delimiter

The Button delimiter uses the timing of a button press (e.g., on the barrel of the pen, or a button pressed by the non-preferred hand) as a cue to indicate when to delimit an ink stroke. When a button-down event is detected, marking mode is initiated (again producing the feedback signal(s) as mentioned supra), and the current pen position is used as the origin of the marking menu. Like Multi-stroke, the menu can be made to pop up at a predetermined time thereafter (e.g., 333 ms later). Again, the person's non-preferred hand can be used to press the CTRL key of a keyboard, for example, which acted as the button that initiates the delimiter.

Figure 19:
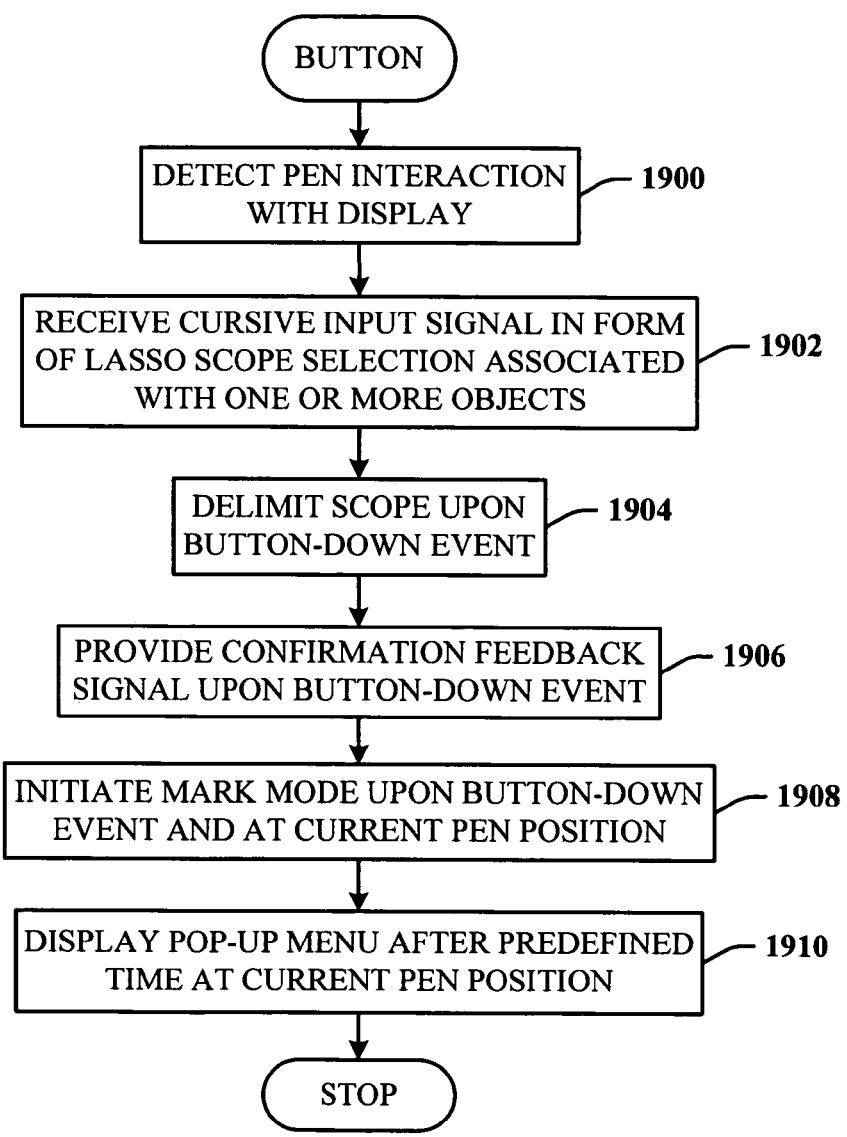
FIG. 19 illustrates a methodology of employing a Button delimiter in accordance with the invention.

Accordingly, FIG. 19 illustrates a methodology of employing a Button delimiter in accordance with the invention. At 1900, the user brings the pen into contact with the device display, after which a cursive input signal in the form of a lasso scope selection is drawn, as indicated at 1902. At 1904, the scope is delimited by the user pressing a button. At 1906, a confirmation feedback signal is presented to the user, that the PBUI system received a button-down event. At 1908, mark mode is then initiated at the current pen position. At 1910, a pop-up menu is displayed after a predefined time duration at the current pen position.

Research suggests that pressing a button using the person's non-preferred hand can be a particularly effective way to perform Ink/Gesture mode switching in pen interfaces. The design premise of the Button delimiter of the subject invention is to overload a mode switching button so that the time that the user activates gesture mode has meaning. Thus, an advantage of the Button delimiter is that the button press can serve both as a signal to treat the current pen stroke as a gesture, and as a means to delimit the stroke into a lasso and a mark. It is contemplated that if a user can time the button press correctly, or if the user can plan ahead such that the lasso is already heading in the desired direction at the time of the button press, the Button delimiter technique can be very fast. It is within contemplation of the subject invention that a "rollback mechanism" can be provided in combination with the Button delimiter which, upon the pen-up event, searches backwards in the pen trace looking for an inflection point to determine the marking direction.

Pigtail Delimiter

As indicated supra, the Pigtail delimiter is a new technique that uses a small loop as a delimiter. The pigtail stroke is input as a single continuous stroke that intersects itself to form a self-intersecting point. The self-intersecting point of the loop terminates the lasso (with automatic completion linking it to the start of the pen stroke); the point of self intersection also defines the origin of the marking menu. Any additional self-intersections are ignored. All or part of the loop defined by the self-intersection point may be discarded from the lasso proper. The marking mode (with the corresponding audio cue) is started as soon as a self-intersection is detected in the pen trace that meets recognition criteria for a pigtail. Like Multi-stroke and Button, the marking menu can be configured to pop-up a short time later (e.g., 333 ms later), if necessary. Pigtails are only scanned for in gesture mode, as natural handwriting contains many closed loops. Pigtail leverages existing skills of users for the mechanics of handwriting, which essentially consists of variations on small rhythmic looping motions with the stylus.

Recognition of pigtails in accordance with the subject invention is straightforward. Each new sample of a gesture forms a line segment. The current pen stroke is searched backwards over a time window (e.g., 500 ms-3000 ms) looking for an intersecting line segment. If one is found, the area A and perimeter P of the resulting closed polygon is computed. Degenerate loops (e.g., A<5 or P<15 pixels) that tend to occur at inflection points in the pen stroke can be ignored. Large loops (e.g., A>5600 pixels) typically represent self-intersection of a selection lasso and are also ignored in some embodiments. For example, it is contemplated that if lasso loops were not allowed to be self-intersecting, this would remove the need for an upper bound on the pigtail loop size. This can be a practical embodiment, since lassos are automatically completed, and thus, self-intersection of the lasso can be avoided. All other loops are treated as pigtails. False positive recognition of a pigtail is possible, where a very small self-intersecting selection lasso can be interpreted as a pigtail. However, this is typically not a problem as the user can take advantage of automatic completion of lassos and select the same region using a non-self-intersecting lasso).

Figure 20:
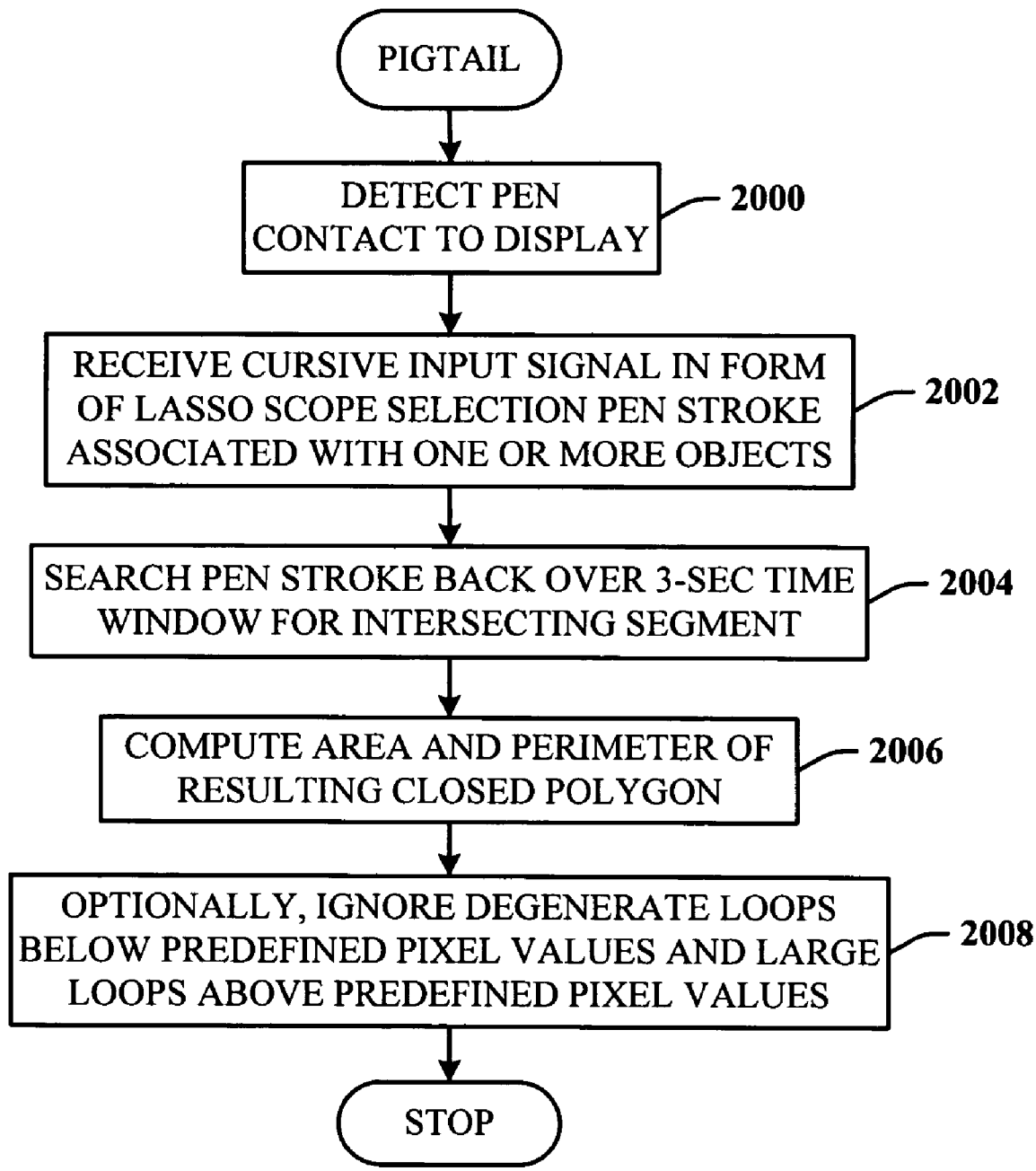
FIG. 20 illustrates a methodology of pigtail generation and detection in accordance with the invention.

Accordingly, FIG. 20 illustrates a methodology of pigtail generation and detection in accordance with the invention. At 2000, the pen is brought into communication with the device display with the pen. At 2002, a cursive input signal in the form of a lasso scope selection is provided in association with one or more objects. At 2004, the PBUI system searches the pen stroke back over a time window (e.g., 500-3000 ms) for an intersecting segment. At 2006, the area and perimeter of the resulting polygon is computed. Optionally, at 2008, degenerate loops below a predefined pixel value may be ignored, or large loops above a predefined pixel value may also be ignored.

FIG. 21 illustrates that the use of a very small lasso scope selection can utilize a non-self-intersecting lasso. FIG. 22 illustrates that users may draw a "pretzel" or a double-loop when reversing direction, which is recognizable under the pigtail technique, since additional loops at the start of the mark are ignored. With practice, users can instead cut across the end of the lasso, as shown in FIG. 22, as well as FIG. 11 and FIG. 14.

Further distinguishing aspects of pigtail menus from traditional marking menus will now be described. Many examples in the following description are illustrated using a null scope, but the techniques described herein can be applied to pigtail menus after any of the scopes shown in FIG. 8.

FIG. 23 illustrates backwards looping to facilitate a backup command in accordance with the subject invention. If the user chooses a marking direction with a loop, the user can back up one level of the hierarchy by "backing up" with a loop in the opposite direction. For example, if the initial loop was counterclockwise (CCW), a subsequent clockwise (CW) loop 1000 moves up one level of the hierarchy (initiates a previous gesture interpretation (PREV)). In one implementation, if the initial loop that separates the scope from the mark is "backed up", the user is returned to scope selection and can then extend the scope gesture. In another implementation, if the initial loop that separates the scope from the mark is "backed up", the gesture is cancelled. Backing up at the root of the menu and lifting the pen can cancel the entire gesture (including the scope portion).

Figure 24:
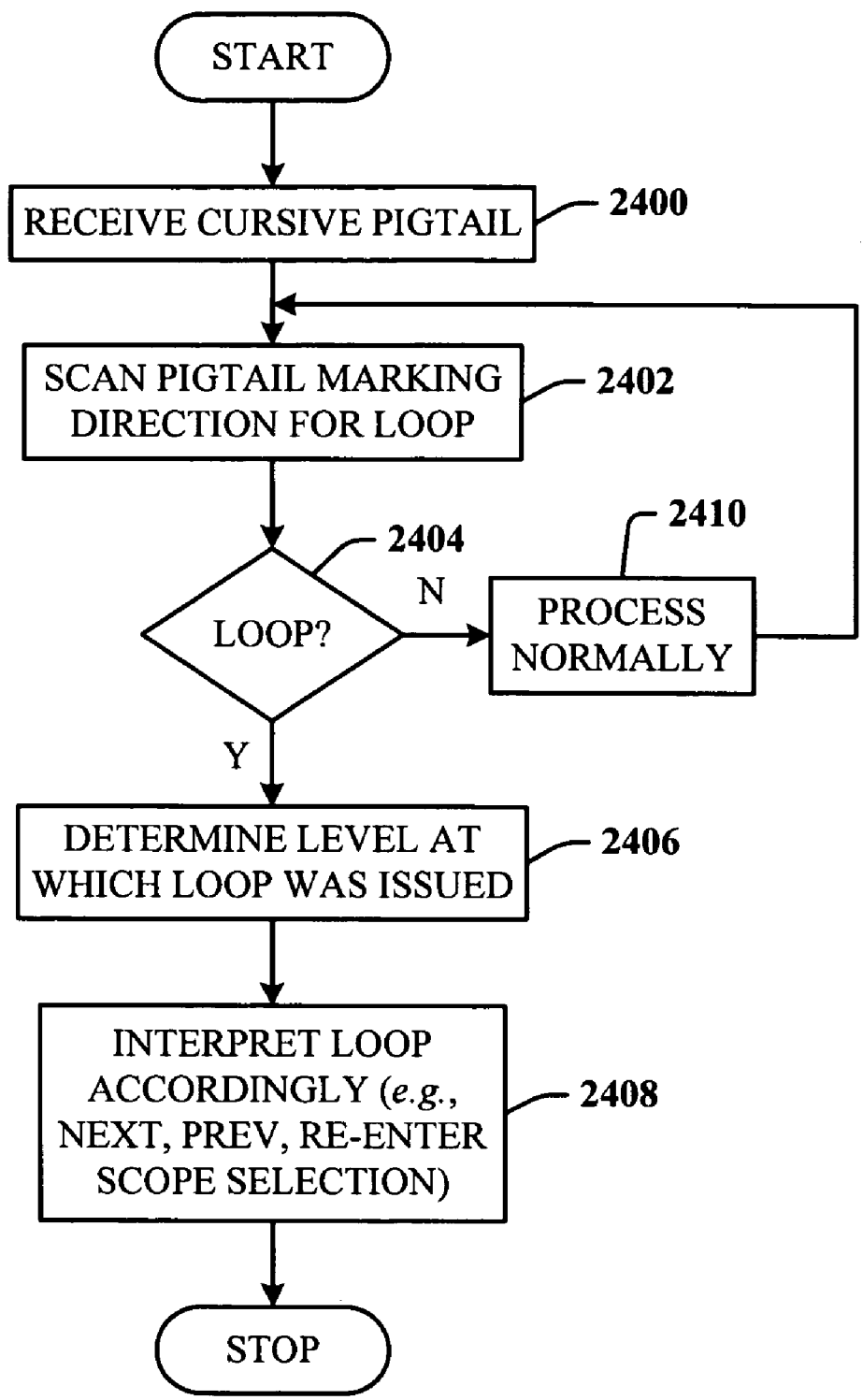
FIG. 24 illustrates a methodology of loop processing of a pigtail delimiter in accordance with the invention.

Accordingly, FIG. 24 shows a methodology of loop processing of a pigtail delimiter in accordance with the invention. At 2400, a cursive pigtail is input by a user. At 2402, the marking direction of the pigtail is scanned for a loop. At 2404, if a loop is detected, progress is to 2406 where the PBUI determines the level at which the loop was issued. At 2408, the loop is then interpreted accordingly (e.g., a NEXT loop, PREV loop, and BACKUP to re-enter scope selection loop). If no loop is detected at 2404, the pigtail is process normally, as indicated at 2410, and flow is back to 2402.

Figure 25:
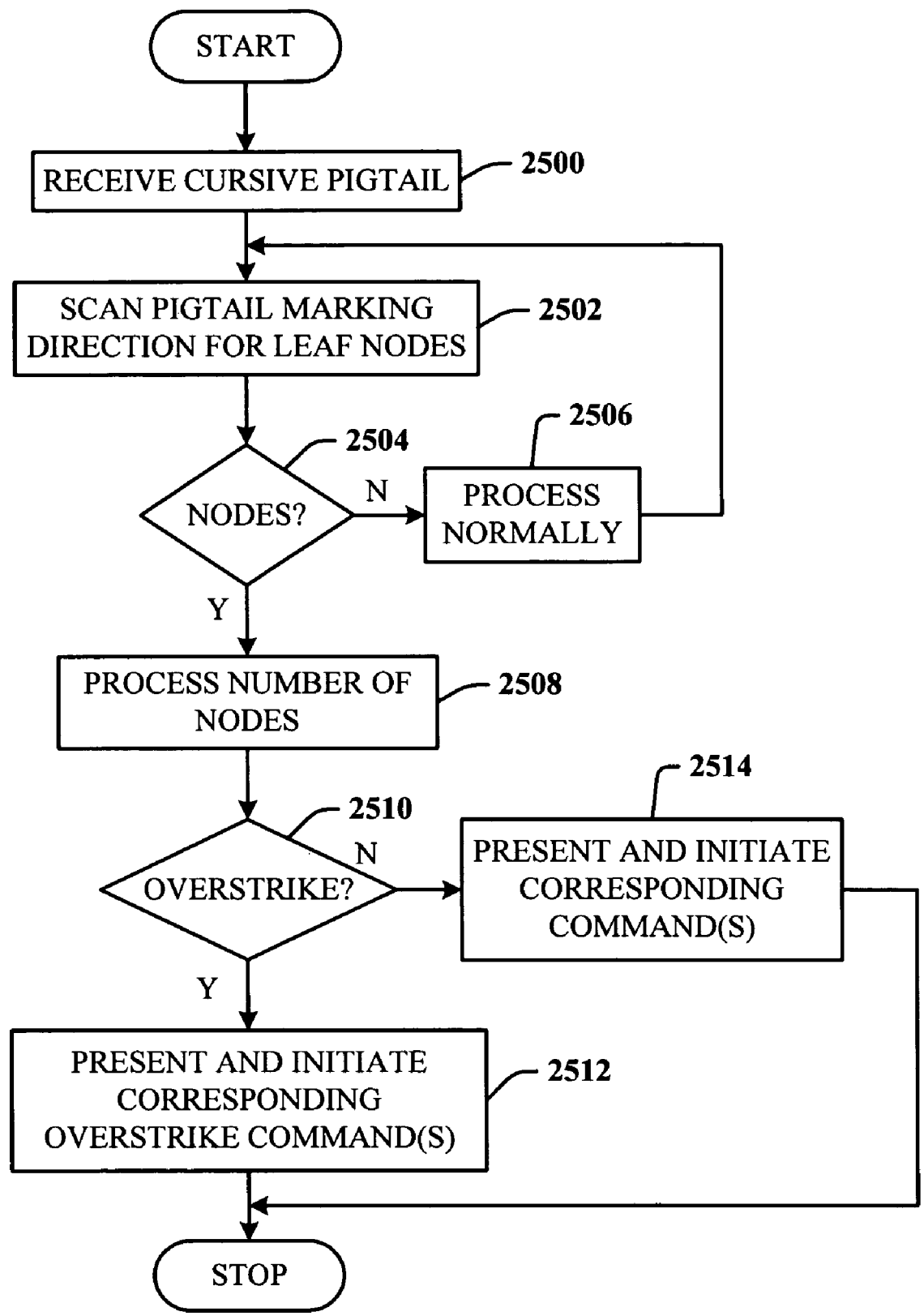
FIG. 25 illustrates a methodology of leaf node processing in accordance with the invention.

FIG. 25 shows a methodology of leaf node processing in accordance with the invention. At 2500, a cursive pigtail delimiter is received. At 2502, the marking direction of the pigtail is scanned for leaf nodes. At 2504, if no leaf nodes are detected, progress is to 2506 to process the pigtail normally, and return back to 2502. If, at 2504, a leaf node is detected, the number of leaf nodes is processed, as indicated at 2508. After the initial pigtail to start marking mode, the system treats extra loops (pigtails) uniformly, as drawn by the user. It does not matter if the user draws them in the "overstrike" manner or as a series of cursive e's, for example. The overstrike example is provided to indicate that it could be a valid way for an expert user to quickly make the gesture. This allows the computer to present the label for the currently activated command in a stable location, allowing RSVP (rapid serial visual presentation) of the command names. If the user instead drew the loops more like cursive e's, the system would have to keep moving the label showing the interpreted command to avoid interference with the user's pen stroke. In this first implementation, all that matters is the number of such closed loops formed, which is indicated in the methodology as ending essentially the path through 2510 to 2514 where the leaf nodes are not interpreted as overstrike nodes, and the leaf node command is displayed for execution.

In another implementation, the system can differentiate overstrike loops from the series of separate loops, interpreting these two styles of making extra loops as having different meanings. Thus, at 2510, the nodes are processed to determine if overstrike nodes. If yes, the corresponding overstrike command is displayed. Once selected, the command is executed. In either case, the PBUI can be configured such that once the leaf node is interpreted, the corresponding command can be executed automatically without user intervention. At 2510, if the leaf nodes are not overstrike nodes, the leaf node command is displayed for execution, as indicated at 2514.

Figures 26, 27:
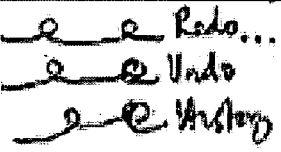
FIG. 26 illustrates a table of examples of pigtail menus where functionality can be extended by using multiple leaf nodes per direction.
FIG. 27 illustrates that overstrike leaf node command names can be displayed along with the pigtail-loop representation in accordance with the invention.

FIG. 26 illustrates a table 2600 of examples of pigtail menus where functionality can be extended by using multiple leaf nodes per direction. Pigtail menus offer the possibility to extend their functionality with additional loops after the user makes a directional stroke. In this way, each leaf node of the marking menu can provide multiple options (commands) that the user can rapidly choose from by making additional loops at the end of the gesture. In practice, having up to approximately six commands at each leaf node available in this way works well. Additional loops, however, can become tedious for the user, and is more error-prone (one tends to produce degenerate loops from moving too quickly). In one embodiment, recognition thresholds are adapted with each successive loop to favor acceptance of more degenerate loops. In one implementation, any additional loop after the last item is passed, circles back (rolls over) to the first item in the leaf node. In another implementation, any additional loop after the last item is passed pegs the selected command at the last item instead of doing roll over.

FIG. 26 illustrates the table 2600 of examples of pigtail menus where functionality can be extended by using multiple leaf nodes per direction. Pigtail menus offer the possibility to extend their functionality with additional loops after the user makes a directional stroke. In this way, each leaf node of the marking menu can provide multiple options (commands) that the user can rapidly choose from by making additional loops at the end of the gesture. In practice, having up to approximately six commands at each leaf node available in this way works well. Additional loops, however, can become tedious for the user, and is more error-prone (one tends to produce degenerate loops from moving too quickly). In one embodiment, recognition thresholds are adapted with each successive loop to favor acceptance of more degenerate loops. In one implementation, any additional loop after the last item is passed, circles back (rolls over) to the first item in the leaf node. In another implementation, any additional loop after the last item is passed pegs the selected command at the last item instead of doing roll over.

The table of FIG. 26 shows a first set of directional pigtails 2602 in a rightward (or Eastward-E) direction with 0-4 additional trailing loops (denoted $E_0$-$E_4$). The directional pigtail with zero additional loops can be defined as a default command. A second type of directional pigtail 2604 employs overstriking loops. For example, using the $E_3$ directional pigtail of the set 2602, the three additional loops are layered upon each other in an overstrike fashion (multiple loops at the same screen location). The direction of the terminating loops does not matter. Note that some of the loops may become somewhat degenerate with rapid multiple strokes. Loop recognition of the PBUI is designed to accommodate this. The initial loop is preferred to separate marking from the scope specification, that is, to be well formed, so that sharp corners or inflection points in the scope will not be erroneously recognized as the start of the marking phase.

Pigtail 2606 of FIG. 26 shows a southward tail with two loops. The pigtail set 2608 shows a first pigtail with a southward tail having four loops, and a second pigtail having a southward tail of overstrike loops. Set 2610 shows a first scope by lasso with a pigtail having one south loop but no additional loops (denoted E-$S_0$); a second scope by lasso having a one south loop with one additional loop (denoted E-$S_1$); and, a third scope by lasso having one south loop with two additional loops (denoted E-$S_2$).

FIG. 27 shows that overstrike leaf node command names can be displayed along with the pigtail-loop representation in accordance with the invention. Leaf node command names can be displayed using the RSVP algorithm. One exemplary time series is the following. With a first loop the user is presented with a Redo command, which is replaced by an Undo command with an additional overstrike loop. Finally, the Undo command is replaced by a History command, with introduction of a third overstrike loop. Since the location of the loop does not matter this becomes an eyes-free gesture such that the user can then fixate on the command name.

Internal nodes of a hierarchical menu, which in one implementation must be followed by a directional stroke to choose a command, cannot easily support additional loops as it can become unclear whether a loop represents a directional stroke or a multi-selection loop. Thus, in order to avoid potential problems of this sort, a design decision may allow extra loops only on the leaf nodes.

It is still desirable to provide the user with a prompted selection if multiple items per leaf node are available. The question is when to reveal the options, and how to present them in a manner that encourages the novice to learn the additional looping motions that an expert would use to very rapidly select one of several leaf node commands. FIGS. 28A and 28B illustrate two exemplary methods for self revelation of leaf nodes by way of popup menu. In FIG. 28A, leaf nodes with multiple options display small cursive loops 2800 below a command name 2802 can be provided as a cue of how many "extra loop" items are available. In FIG. 28B, dwelling for a predetermined amount of time during presentation of a mark 2804 displays the extra loop menu items 2806. Note the dwell time may be zero in some embodiments, i.e., the extra items are displayed as soon as the user indicates a desired direction in the pigtail menu.

Accordingly, FIG. 29 shows a methodology for leaf node revelation in accordance with the invention. At 2900, the cursive pigtail delimiter is received as input to the PBUI. At 2902, a popup menu of leaf node selections is displayed.

Figure 30A:
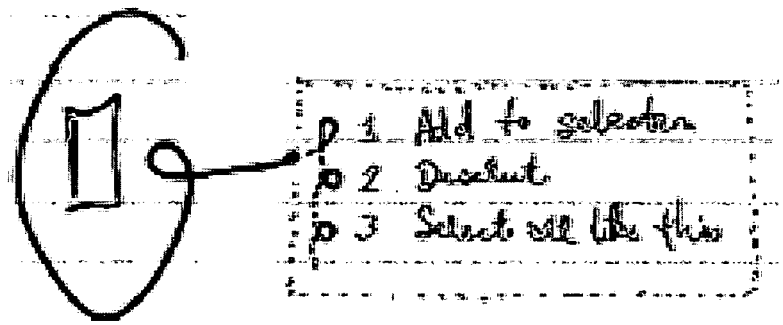
FIG. 30A illustrates that the PBUI system presents options available for extra looping by stroke extension in accordance with the subject invention.
Figure 30B:
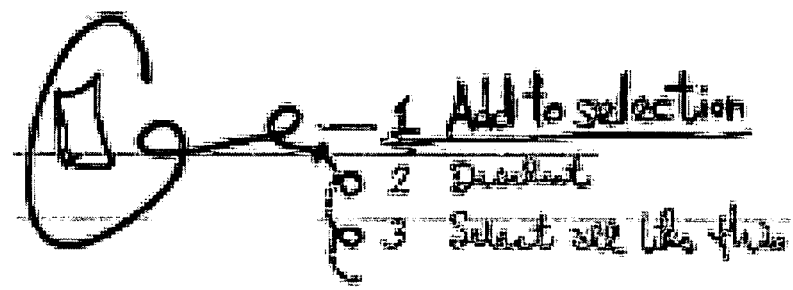
FIG. 30B illustrates that the system can present viewing options after one extra loop has already been completed, in accordance with the invention.

FIGS. 30A and 30B illustrate another approach for self revelation of leaf nodes by stroke extension. FIG. 30A depicts that the PBUI system presents options available for extra looping by stroke extension in accordance with the subject invention. The system draws an extension (e.g., a pigtail) to the user stroke to suggest how to invoke the extra loop commands. This style of presentation encourages the user to more closely mimic an "expert" gesture of rapidly drawing these extra loops in a continuously connected fashion rather than a more novice style of presentation where the loops can be disjoint from the end of the user stroke, user might attempt to instead point at the desired item in the list. Although, the pigtail delimiter is illustrated, it is to be appreciated by one skilled in the art that other delimiter extensions can be automatically presented for input, such as the Timeout and Multistroke, for example. FIG. 30B shows that the system can present viewing options after one extra loop has already been completed, in accordance with the invention. Note that the user may pause before or after any extra loops are drawn. In the latter case, the current selection can be shown in bold, and/or underlined, for example, and further options are then sketched out and presented to the user. Drawing the stroke extensions vertically (as in FIG. 30A) offers an easy way to have a visually pleasing presentation of the options.

Figure 31A:
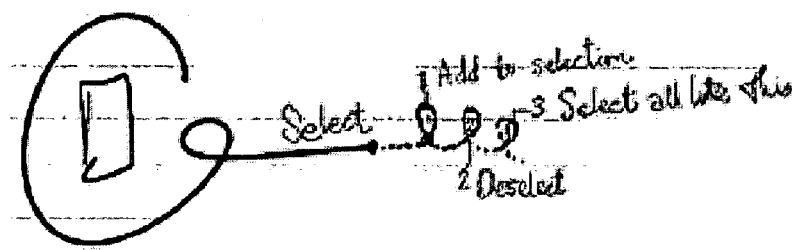
FIG. 31A illustrates stroke extensions in a horizontal direction, in accordance with the invention.
Figure 31B:
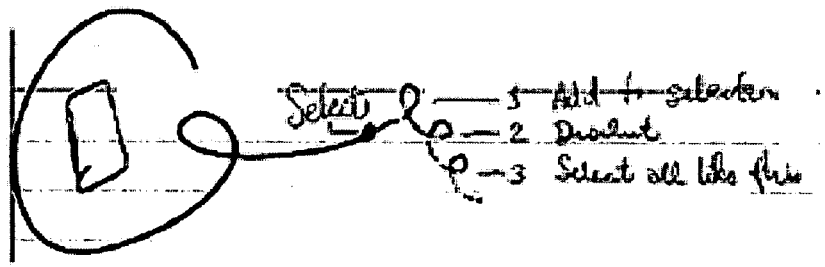
FIG. 31B illustrates the presentation of options in a diagonal fashion which offers a compromise to the horizontal representation of FIG. 18A.

FIG. 31A illustrates stroke extensions in a horizontal direction, in accordance with the invention. If the strokes are extended horizontally, it becomes more difficult to present the available options in a clear and aesthetic fashion. However, the labels can be rotated ninety degrees, but would then be a bit more difficult to read. FIG. 31B shows the presentation of options in a diagonal fashion which offers a compromise to the horizontal representation of FIG. 31A.

Figure 32:
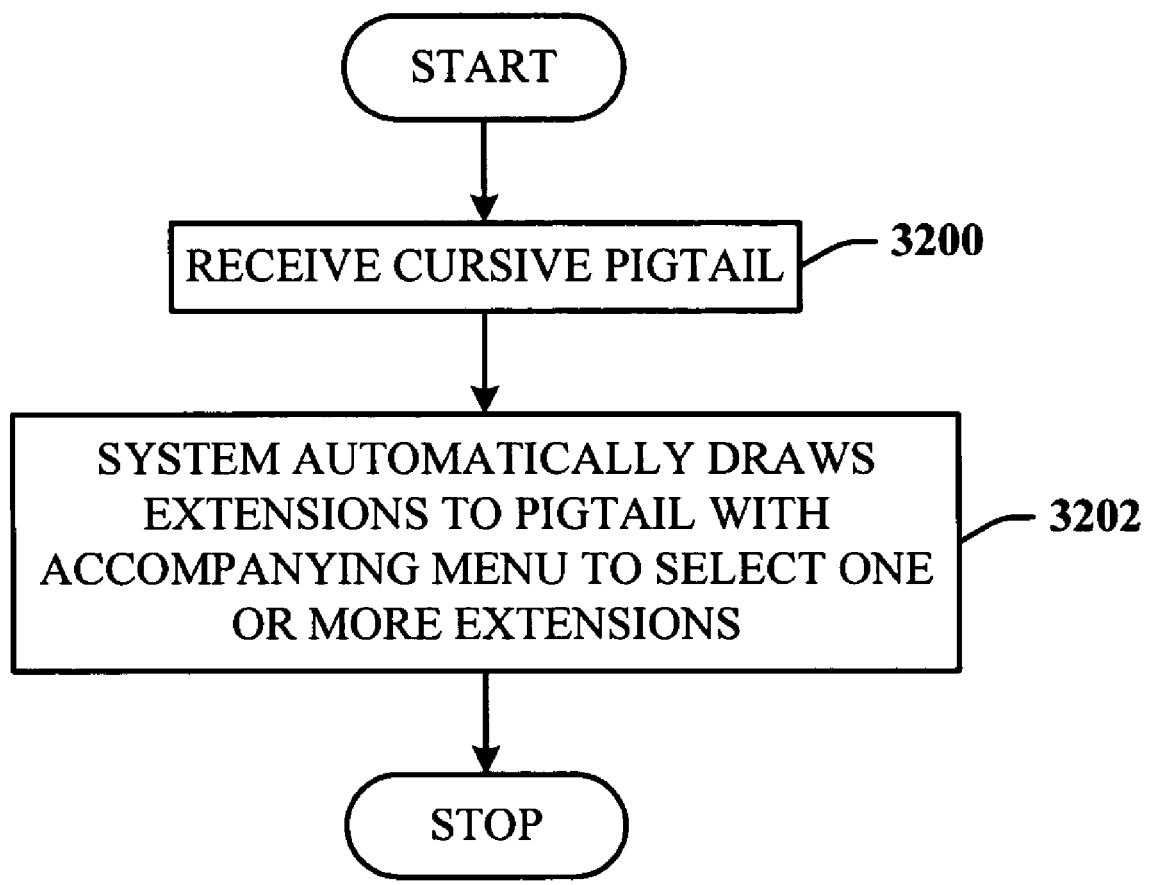
FIG. 32 illustrates a methodology of stroke extension in accordance with the subject invention.

Accordingly, FIG. 32 illustrates a methodology of stroke extension in accordance with the subject invention. At 3200, the system receives a cursive pigtail delimiter. At 3202, the system interprets the pigtail, and automatically draws one or more extensions to the pigtail with an accompanying menu to facilitate selection of the one or more extensions.

Conventional technologies indicate that is may be possible for pigtail menus to encourage integration of command selection with parameter specification. However, if pigtail menus use multiple loops to indicate additional leaf nodes in the menu structure, this makes it difficult to use these loops to further segment the gesture into a parameter phase. Moreover, as the user articulates the pigtail menu, the pen moves further from the origin of the stroke. To avoid a "nulling" problem on a command such as move, it is desirable for the user to move the pen back over the object being manipulated.

In order to overcome this limitation in the prior art, one embodiment of the PBUI of the subject invention adopts a convention of using additional crossing strokes for parameter specification with pigtail menus. If the user maintains tension on the foot pedal, for example, to indicate Gesture mode, a subsequent crossing stroke is interpreted as a parameter to the previous command. If the user releases tension on the foot pedal, the new stroke will be interpreted as Ink mode. If the user releases but then again presses the foot pedal, the next stroke is treated as the start of a new gesture command (whether it crosses the previous gesture command or not). Note that with this design no timeout is needed after the initial gesture to "wait" for parameter input. If the user releases the foot pedal after the initial gesture, the command will be completed immediately using default values for the parameters.

Figure 33:
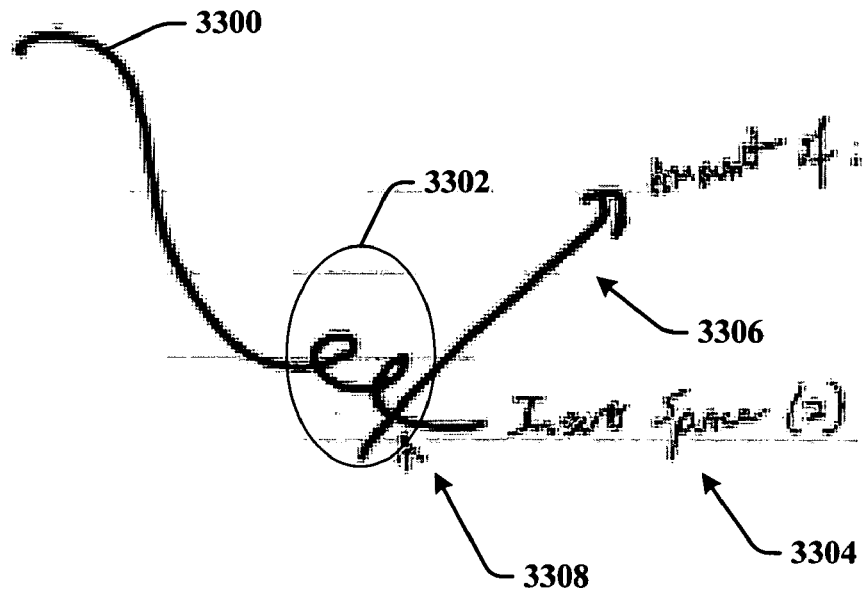
FIG. 33 illustrates a path scope that is terminated by two loops in accordance with the invention.

FIG. 33 illustrates a path scope that is terminated by two loops in accordance with the invention. In this example, the path scope 3300 (as found in the table of FIG. 8) is terminated by two loops 3302 for an Insert Space command 3304. A subsequent crossing stroke 3306, while tension is maintained on the foot pedal (or other corresponding input device mechanism) indicates the amount of space to insert (here, an Amount 4). The parameter manipulation starts at a point 3308 where the crossing stroke intersects the previous stroke. Additional crossings of the stroke have no meaning, so the user can drag back and forth to increase or decrease the parameter as desired (similar to scrolling or zooming interactions with a Control Menu technique, for example).

Figure 34:
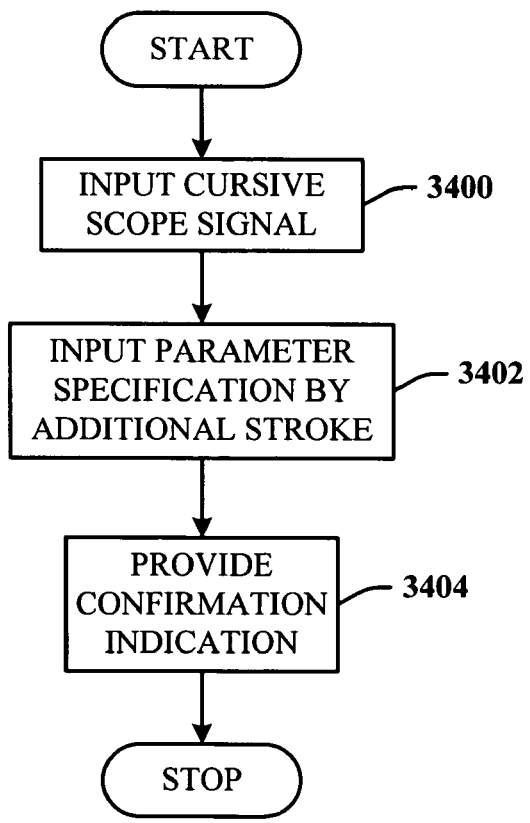
FIG. 34 illustrates a methodology of crossing stroke processing in accordance with the invention.

Accordingly, FIG. 34 illustrates a methodology of crossing stroke processing in accordance with the invention. At 3400, a cursive scope selection signal is received as input. At 3402, an additional crossing stroke is added to input parameter specification. At 3404, a confirmation feedback signal is presented to the user (e.g., a tone, beep, and/or light indicator).

Prior art systems neither recognize pigtails as used in the subject invention nor use them as part of the interface design vocabulary. Similarly, the prior art shows such loops being formed, but again, the loops are incidental and not interpreted as part of the syntax of interaction.

The combination of scope selection and delimiter with corresponding options and commands can include the following. Scope selection by lasso can include delimiters such as the pigtail, a timeout (move and hold), a button press, a pen up (with spatial multiplex), and punctuation (pen up, then dot after), to name only a few. Moreover, delimiter techniques can be applied without the lasso. For example, by pigtail alone, a loop over the background can invoke a menu. A tap-and-hold timeout can be provided, a button press (e.g., a pen barrel button brings up a right-click menu) and a pen tap, typical used for selection or activation, can be used to pop up a menu.

The lasso/pigtail selection-action sequence can provide an option that facilitates the input of various perimeter, area, and timing constraints. The associated command can include blind marking (8-way single level directional commands). The lasso/timeout combination can provide timeout options (e.g., 200 ms, 400 ms, 600 ms, and 1000 ms), where the command can be prompted marking, or blind marking plus a prompt after an additional time, for example. The lasso/button-press combination can include barrel button and non-preferred hand button options, and blind marking commands, for example. Another selection-action sequence, the lasso/pen-up with spatial multiplexing, can provide options where the handle appears at the pen-up location, at the center of the scope or the entire scope becomes the handle. Blind marking (starting within the handle) can be used for commands. The lasso/punctuation sequence can employ options where the dot is inside or outside of the scope.

It is to be appreciated that other variations are within contemplation of the subject invention. For example, the 8-way blind marking menu can be provided at multiple levels (e.g., additional commands accessed through the first level to a second level). The second level of the menu can may be distinguished from the first level by using a change in stroke direction (as with traditional marking menus), or by using a pigtail.

Delimiter Experiment

Figure 35:
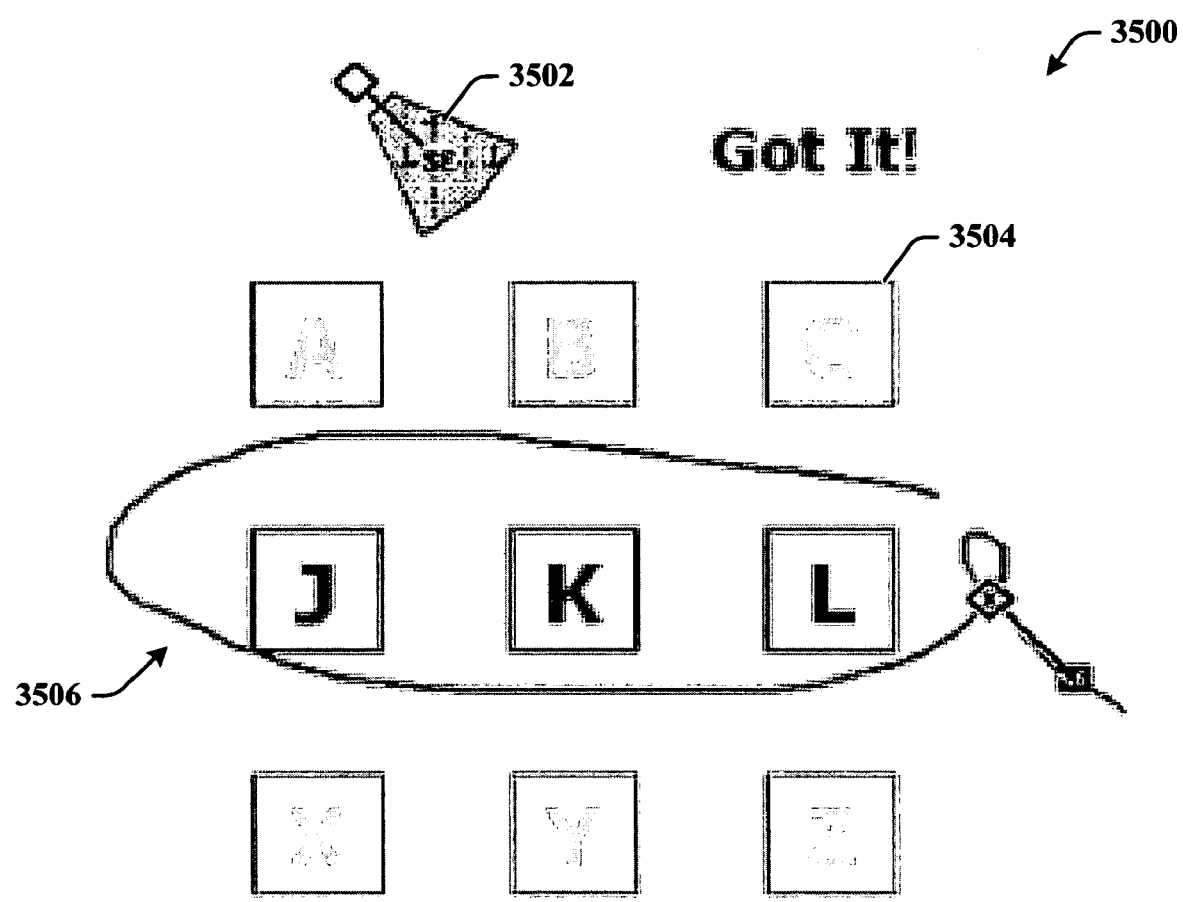
FIG. 35 illustrates a test screen of objects employed where the user task was to lasso objects in the selection region and apply the correct marking direction to those objects.

The following describes one set of experimental information associated with delimiters for pen gestures. Evaluation was made of the time efficiency and error rates of the Multi-stroke, Timeout, Button, and Pigtail delimiters. FIG. 35 illustrates a test screen 3500 of objects employed where the user task was to lasso objects in the selection region and apply the correct marking direction to those objects. The marking direction to choose appears at the top of the screen 3500, using a filled pie wedge 3502 labeled with the compass direction (e.g., SE). A user was prompted with nine square targets 3504 of 64×64 pixels each, forming a 3×3 grid centered on the screen 3500, with 64 pixels of empty space between targets 3504. Each target 3504 contained a single letter; the purpose of the letter was to make the targets distinct and to make it clear that the square represented an "object" and not just an outline. The targets 3506 to be selected were shown bolded in one color, while other "distractor" targets were shown in another color (e.g., medium gray). The targets 3506 were considered to be inside the lasso as long as the center point of the target fell within the lasso. Users were instructed during training on lasso selection that lassos are automatically completed and that lassos can be a bit "sloppy" and cut off the corners of the squares.

A correct response by the user was rewarded with a happy sound and a "Got It!" message. After 500 ms, the experiment advanced to the next trial. An incorrect selection and/or incorrect marking direction played a "miss" sound and indicated the error (e.g., "NE is WRONG: Select N"). This remained on the screen for about 1750 ms so that users could see their error before the next trial started.

The Selection Type was a single target or multiple targets. For multiple target selections, the selection always consisted of three contiguous inline squares, randomly selected as one of the rows or columns of the grid. However, multiple random targets can also be requested for selection. Lasso scope selections are especially well suited to the small and numerous ink segments of freeform ink input. However, these were not used at this time. Instead, simple, abstract targets were used to minimize cognitive and visual distraction to the user.

Independent variables included the Delimiter Technique (e.g., Multi-stroke, Timeout, Button, and Pigtail), Marking Direction (e.g., N, NE, E, SE, S, SW, W, or NW), and Selection Type (Single or Multiple). Dependent variables included Completion Time (the time between a pen-down event at the start of the lasso to the pen-up event at the end of the mark) and Direction Errors which is the rate of incorrect marking direction selection.

For each technique tested, the experimenter explained the technique to be used. Participants performed thirty-two practice trials to become familiar with the technique. Eighty main experimental trials followed. The trials were clustered into sets of five repeated trials prompting the user to select the same objects and the same marking direction. The experiment was structured with clusters of repeated prompts to simulate prolonged practice with each technique in a short time frame. Participants then completed a repeated invocation block consisting of twenty-four repetitions of an identical trial. These trials repeatedly prompted the user with the same square to lasso, and the mark was always to the East. East was chosen for repeated invocation as this seems to be a "sweet spot" in the marking menu that is anticipated to be at a location assigned to a frequently used command. The repeated invocation block allowed assessment of what the performance limits of each technique would be for a frequently used command.

A 4×4 Latin square was employed to minimize order effects. Eight different orders were used with to participants each. Thus the experiment included: fifteen Subjects (due to one missing subject in the design), four Delimiter Techniques, thirty-two practice trials, eight Marking Directions, two Selection Types, at five trials, totaling eighty main experimental trials. Add twenty-four trials of Repeated Invocations for a total of 136 trials per condition. This totals to 8,160 total trials (including 1920 practice trials, 4800 main experimental trials, and 1440 repeated invocation trials). Subjects took approximately twenty minutes to complete each technique, including practice trials, the main experimental trials, and the repeated invocation block.

Each participant ran the experiment on a Toshiba Portege 3500 TabletPC, running a Windows XP brand Tablet Edition operating system, with a 24.5×18.5 cm (1024×768 pixels) display. The Button technique was assigned to the CTRL key. Thus, each user employed the TabletPC in the "clamshell" configuration, with the screen open and angled upwards to make the keyboard accessible by the person's non-preferred hand.

A 4×8×2 (Delimiter Technique×Marking Direction×Selection Type, respectively) within-subjects ANOVA (ANalysis Of VAriance) was conducted on the median completion time within each cell of the experimental design for the main experimental trials. The median completion time was used to correct for the typical skewing common to reaction time data; this also removed the influence of any outliers in the data. Order of presentation was included as a between-subjects factor, but yielded no main effect or significant interaction effects.

Figure 36:
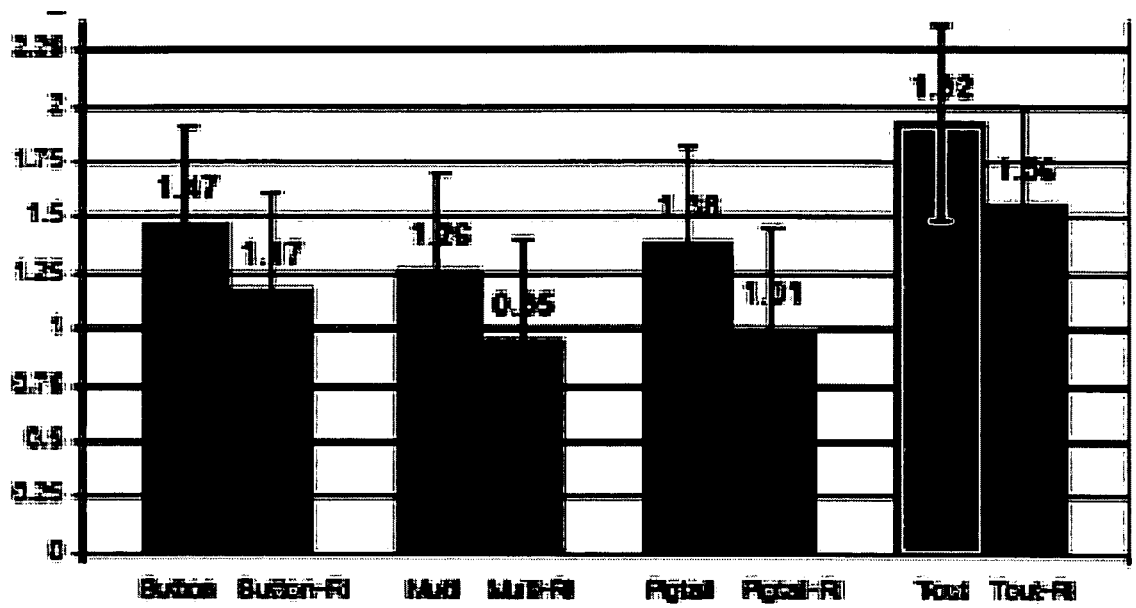
FIG. 36 illustrates a graph of the results for completion time for each delimiter type.

The analysis revealed a significant main effect for Delimiter Technique, $F_{(3,21)}=18$, $p<0.001$. Post-hoc pairwise comparisons revealed that Timeout was significantly slower than all other delimiters ($p<0.01$), but completion times for Multi-stroke, Button, and Pigtail did not differ significantly from one another. Selection Type $F_{(1,7)}=151$, $p<0.001$ was also highly significant, as the multiple-target selection lassos took more time to draw. Marking Direction did not yield a significant main effect. There were no significant interactions. FIG. 36 shows a graph of the results for completion time for each delimiter type. For each Delimiter Technique, the left bar is the main block; the right bar is the time for the repeated invocation (RI) block.

Figure 37:
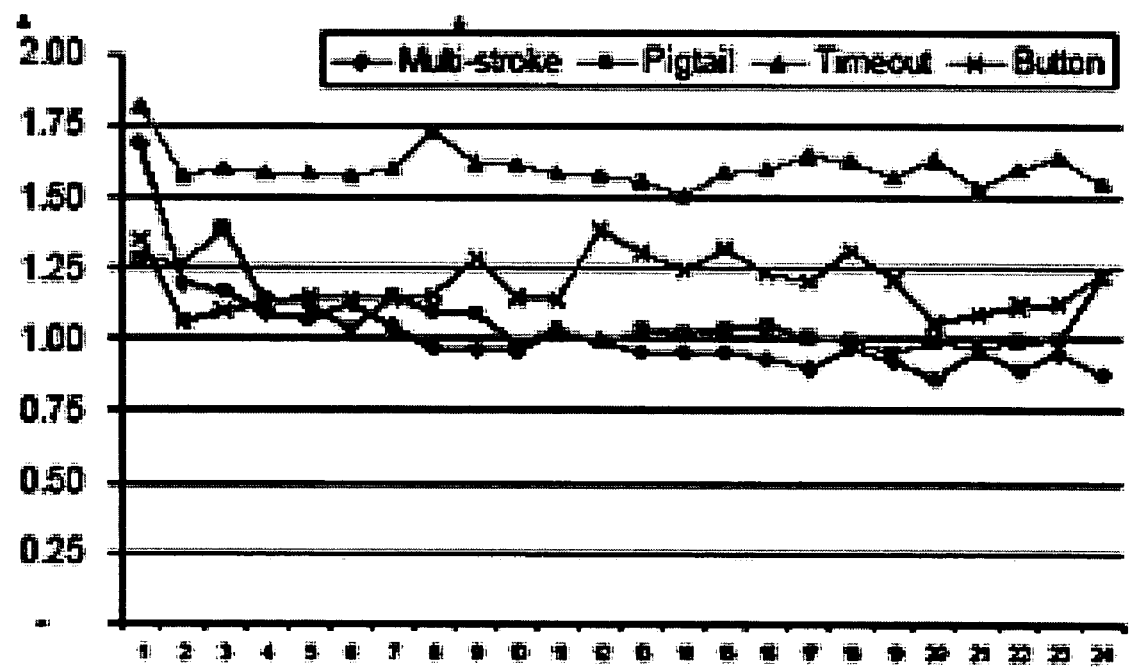
FIG. 37 illustrates the mean completion time over the twenty-four trials.

A 4-way ANOVA on the median completion time for each subject's RI block (excluding all error trials) revealed a significant main effect of Delimiter Technique ($F_{(3,42)}=13.7$, $p<0.001$). Post-hoc pairwise comparisons revealed that the Timeout was again, significantly slower than all other techniques ($p<0.01$), but that the other three techniques did not differ significantly. FIG. 37 shows the mean completion time over the twenty-four trials. This graph includes the times for error trials. Subjects clearly experienced problems with the Button technique: unlike the other three delimiters, completion time shows a trend towards increasing completion time as the user becomes more practiced during trials 2 through 19. This suggests that users were not able to compensate for synchronization errors with practice. The Pigtail and Multi-stroke delimiters follow performance curves that appear very similar to one another. The Timeout technique appears to quickly reach a plateau, suggesting a possible floor effect on performance due to the timeout.

Figure 38:
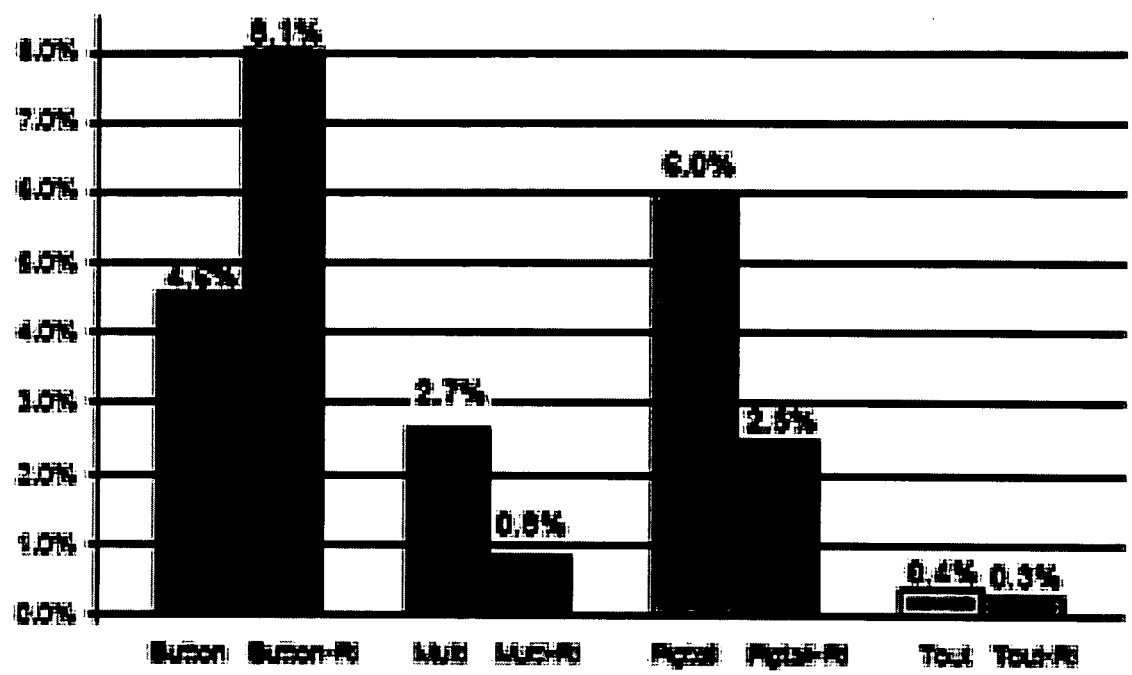
FIG. 38 illustrates of the overall results for Marking Direction error rate.

FIG. 38 shows a graph of the overall results for Marking Direction error rate. The Button error rate increased during repeated invocation. The Button delimiter technique error rate increased from 4.6% in the main experimental block to 8.1% in the repeated invocation block, suggesting that synchronization errors are exacerbated when the user tries to work quickly, and that practice does not seem to reduce such errors (at least within the limited number of trials offered by the experiment).

Stroke Extension

Figure 39A:
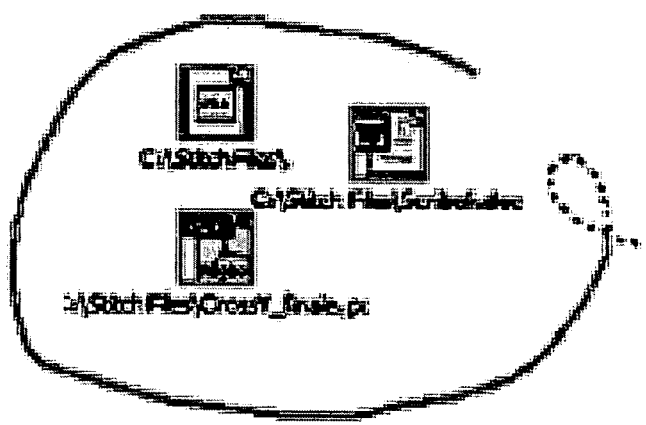
FIG. 39A illustrates an animated extension of the current pen stroke to form a pigtail in accordance with the invention.
Figure 39B:
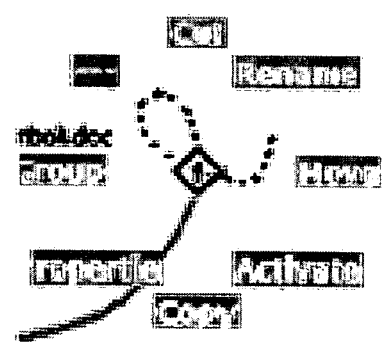
FIG. 39B illustrates that if the user waits longer, the system pops up the associated command marking menu (like the Timeout technique).

Some conventional pen-operated devices that support tap-and-hold interactions provide speculative feedback that shows a circling timer, or a button press animation, for example, before the timeout expires. Like the Timeout technique, a Stroke Extension technique uses a pause while drawing a gesture stroke to initiate a timeout. The PBUI system draws an animated extension of the current pen stroke to form a pigtail for the user. FIG. 39A illustrates an animated extension of the current pen stroke to form a pigtail in accordance with the invention. FIG. 39B shows that if the user waits longer, the system pops up the associated command marking menu (like the Timeout technique). If the user instead draws a pigtail within the time to wait for the menu, this short-circuits the timeout so that the user does not have to wait for the computer.

Figure 40:
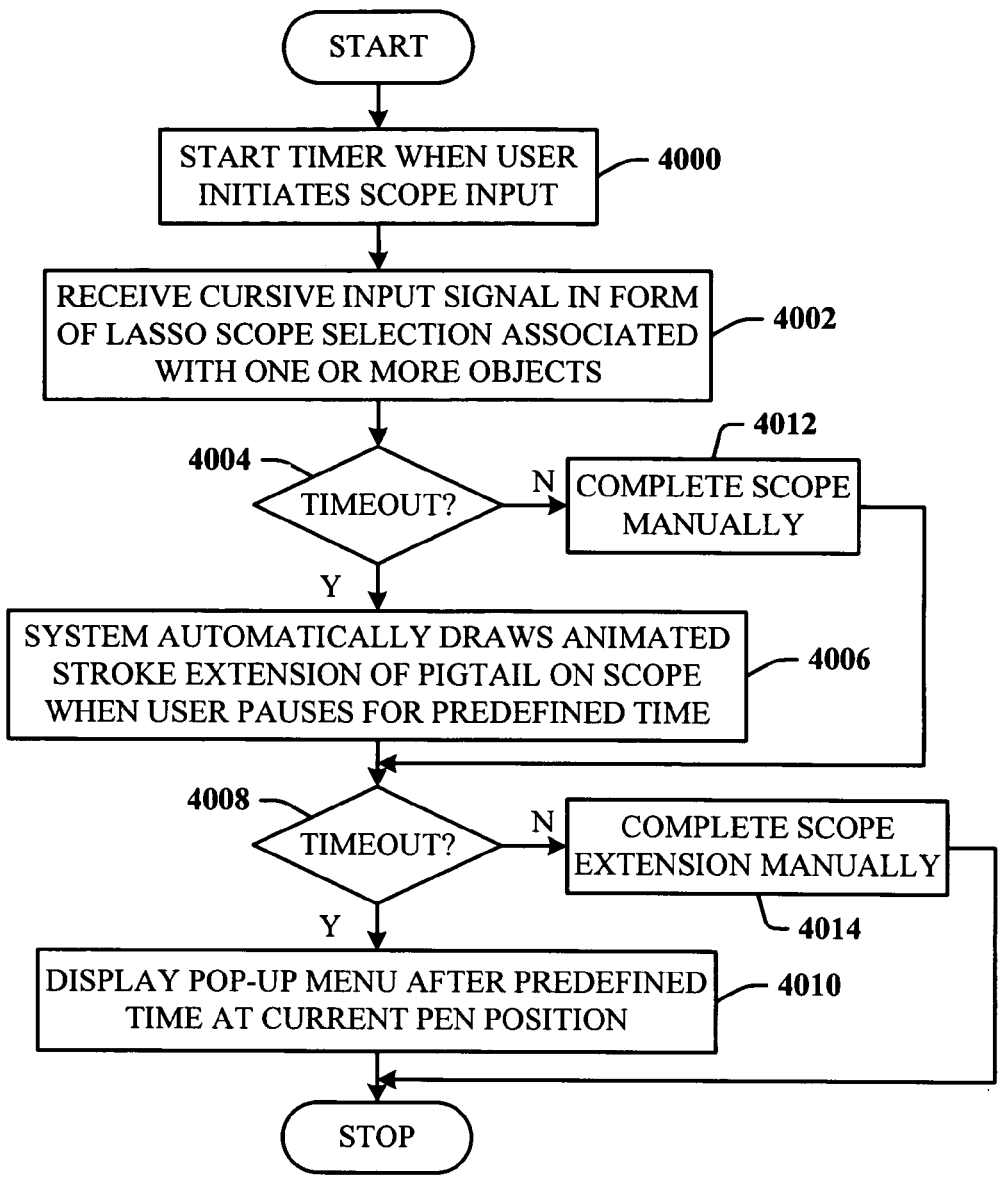
FIG. 40 illustrates a methodology of stroke extension in accordance with the subject invention.

Accordingly, FIG. 40 illustrates a methodology of stroke extension in accordance with the subject invention. At 4000, at time is started when the user initiates cursive scope input. At 4002, the cursive input signal is received in the form of a lasso scope selection which is associated with one or more objects. At 4004, if the user pauses a predefined duration of time during stroke of the lasso, a first timeout can occur. If the timeout occurs, progress is to 4006 where the PBUI system automatically draws an animated stroke extension of a pigtail on the lasso scope. If no user input is again received, the system checks again, for a second timeout, as indicated at 4008. If the second timeout occurs, a pop-up menu is displayed at the current pen position, as indicated at 4010. If the user does not pause sufficiently long to trigger the first timeout, flow is to 4012 where the user completes the lasso scope manually. Progress is then to 4008. If the second timeout does not occur, flow is to 4014 where the user completes the scope extension manually.

The details of the stroke extension animation are important to give the technique a good feel. The path of the stroke extension animation is programmed using a loop-shaped Bezier curve defined such that its starting tangent is coincident to the direction of pen movement in a short time-window prior to cessation of movement (e.g., 250 ms). The control points defining the Bezier curve are rotated accordingly. In some embodiments, the control points and tangent lines defining the Bezier curve are slightly perturbed within a small random interval to add variation and eccentricity to the stroke extension to make it look more like naturally produced handwriting. Additionally, in some embodiments the stroke extension intersects itself shortly before the current pen position, rather than at the current pen position, to reduce potential occlusion of the animation by the physical pen held on the screen.

If the user starts moving the pen again at any time within a predetermined time duration (e.g., within 500 ms) after cessation of pen motion, the stroke extension animation is cancelled. In one implementation, the animation starts about 100 ms after pen movement stops, and takes about 400 ms to complete up to the self-intersection point of the pigtail. At this moment, about 500 ms after cessation of pen movement, the PBUI system provides a feedback cue (e.g., audio) and activates marking mode. Timing the feedback cue to the point in the animation where the stroke crosses itself in this manner is intended to emphasize to the user that the self-crossing point has special meaning. The animation of the stroke extension continues, drawing the start of a "tail", for about another 333 ms. At this point, the marking menu is popped up so the user can see the available commands. In one implementation, the completed stroke extension animation remains visible for about two seconds or until the user lifts the pen.

Prior art systems provide animated gestures, but they are not appended to a user's ongoing pen stroke in real time, as in the subject invention. Rather, the animated gestures of the prior art must be explicitly requested from the user by clicking on a "crib sheet" of available gestures. Stroke extension is a novel technique that allows the PBUI to show the user how to draw the pigtail shorthand gesture that can be used to short-circuit the timeout. New users or users who do not care to use the pigtail can wait for the timeout. Experienced users, or users performing a repetitive task, can instead be led to learn the pigtail gesture as a way to speed their performance.

The Multi-stroke technique can be integrated with the Pigtail technique. If the user draws a lasso and lifts the pen, a handle is added. If the user draws a lasso and terminates it with a pigtail, the handle is added to the scope (the lasso portion of the stroke) after the "recognized mark" feedback fades from the screen. Even though the user has already completed the entire selection-action phrase in this case, this allows the user to re-use the scope for a subsequent command. In one implementation, the Multi-stroke handle attached to scopes prior to the current scope can be reduced in size to further reduce visual clutter. Alternatively, multi-stroke techniques that use crossing strokes instead of acquisition of a handle can be used.

Following is a description of how to use the Pigtail technique of the PBUI in an application fragment. A PBUI device can include support for freeform ink input, pen gesture input, and structured objects (e.g., pictures and icons). In another implementation, the PBUI of the subject invention can employ a "scrapbook" application that supports note-taking and ideation activities surrounding personal photographs, drawings, and clippings from the Web, for example. The PBUI system can run on a Tablet PC, Pocket PC, and desktop (Windows XP brand operating system) clients, for example. In one mode, the PBUI treats all pen strokes as Ink unless the user explicitly indicates Gesture mode. For simplicity, a mechanical device such as a foot pedal can be used to signal a change to gesture mode. Additionally or alternatively, the PBUI can effect mode switching using the CTRL key of a keyboard, a TabletPC/PocketPC bezel button, or right-click (which can be mapped to the TabletPC pen's barrel button).

It is within contemplation of the invention that the PBUI can be employed without requiring traditional spatially multiplexed interface controls. However, a practical application can include familiar elements for novice users. Frequently used commands can be accessible via the pigtail, but other infrequently used commands can be made accessible via traditional techniques.

Figure 41:
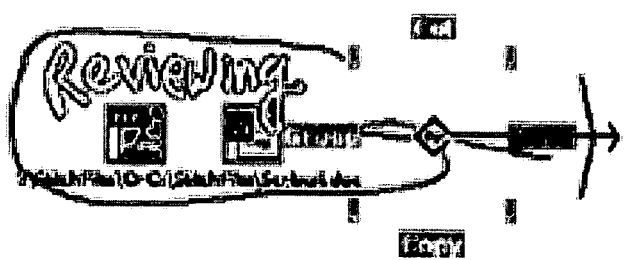
FIG. 41 illustrates a visual cue in the form of a bow and arrow in accordance with the subject invention.

As mentioned supra, the Pigtail delimiter supports a direct manipulation phase. One implementation supports a "crossing" property for each menu item. Menu items with this property can display a visual cue that resembles a small bow and arrow to indicate that the item supports a direct manipulation phase. FIG. 41 illustrates a visual cue in the form of a bow and arrow in accordance with the subject invention. To enable the PBUI to support a direct manipulation phase while also allowing for scale independence in mark-ahead mode, an inventive variation on the outer-boundary crossing method used in prior art techniques is provided. Marking menus typically support scale independence, meaning that the size of the drawn mark in blind marking mode does not matter, only the shape of the mark is used to define the recognized command. Scale independence is believed to be an important property of marking menus allowing rapid and performance with low error rates. However, the scale independence property only matters in mark-ahead mode; once the visual menu appears, the scale of the marks is determined by the size of the menu. When a "crossing" command of the present invention includes a direct manipulation phase, this becomes a visually guided dragging task that continues beyond the predefined delay (e.g., 333 ms) between the start of marking mode and popping up the marking menu. Thus, the PBUI supports scale independence for the first time duration (e.g., 333 ms of a mark), but then supports a direct manipulation phase after that time-window expires.

Thus, the PBUI of the invention does not check for crossing (of the outer boundary of the "bow and arrow" cue) until after the 333 ms menu popup delay expires. This detail is an important inventive extension to radial menu techniques, as it allows the disclosed technique to support both scale-independent mark-ahead, as well as a crossing-based direct manipulation phase. This approach allows designers to unify properties of the previously separate techniques for radial menus with crossing, versus radial menus with mark-ahead.

The PBUI supports the four generic commands (Cut, Copy, Move, and Group) for all objects, and which are preferably presented at fixed default positions (e.g., at the primary North, South, East, and West compass directions, respectively, as indicated supra). Four additional diagonal compass directions are reserved for object-type-specific commands, e.g., SE contains Activate for icons, Highliters . . . for ink, or Resize for images. If the user selects objects of differing types, this activates a special generic menu which only contains the Cut, Copy, Move, and Group commands. In one implementation, any additional commands that are common to all of the selected objects may also be presented in the Generic menu.

The presence of a delimiter leaves the user in control of whether or not a transition to marking mode occurs. Moreover, without a delimiter, it would not be clear when to pop-up the menu for prompted selection. Lack of a delimiter prevents self-revelation, which is widely considered to be one of the major benefits of the marking menu approach. One could use a pause to pop up the menu, but then this essentially becomes the equivalent of the Timeout delimiter technique.

Like most pop-up menu techniques, a Pigtail delimiter following a lasso selection may encounter problems if the user is working near the boundary of the display screen of the device. One implementation finds that it is easy to lasso the objects, and then draw a "long tail" towards the center of the screen before drawing the pigtail. This allows the user to bring up the menu at a location that is easier to work with. In another embodiment, the lasso may be made via an initial pen stroke, and the pigtail made in a subsequent separate pen stroke (made near the center of the screen, for example) to address this concern, as detailed in the Multi-Stroke Command Structures section below and shown in FIG. 44.

One alternative to the use of traditional marking menus with the pigtail delimiter is that rather than imposing straight-line angular selections on the user, a technical improvement can be to change the marking menu to accommodate pigtails by using curved boundaries between the menu items to reduce the overall error rate of Pigtail. The resulting marking menu thus has a pinwheel shape as opposed to a pie chart shape. The marking menu boundaries are curved according to the direction of the pigtail loop (clockwise vs. counterclockwise).

Multi-Stroke Command Structures

The PBUI of the subject invention can be extended with commands composed of multiple disjoint scopes (or a collective scope). Such compound command phrases can also take advantage of the spatial properties of the individual pen strokes. Maintaining a collective scope, terminated by a pigtail (delimiter), allows the PBUI to build up complex multi-stroke command structures. A collective scope is a scope spanning more than one selection gesture (more than one pen stroke). Discussion of the pigtail above focuses on single-stroke selection-action phrases, such as a lasso terminated by a pigtail. Following is a description of PBUI support of multi-stroke phrases.

Figure 42:
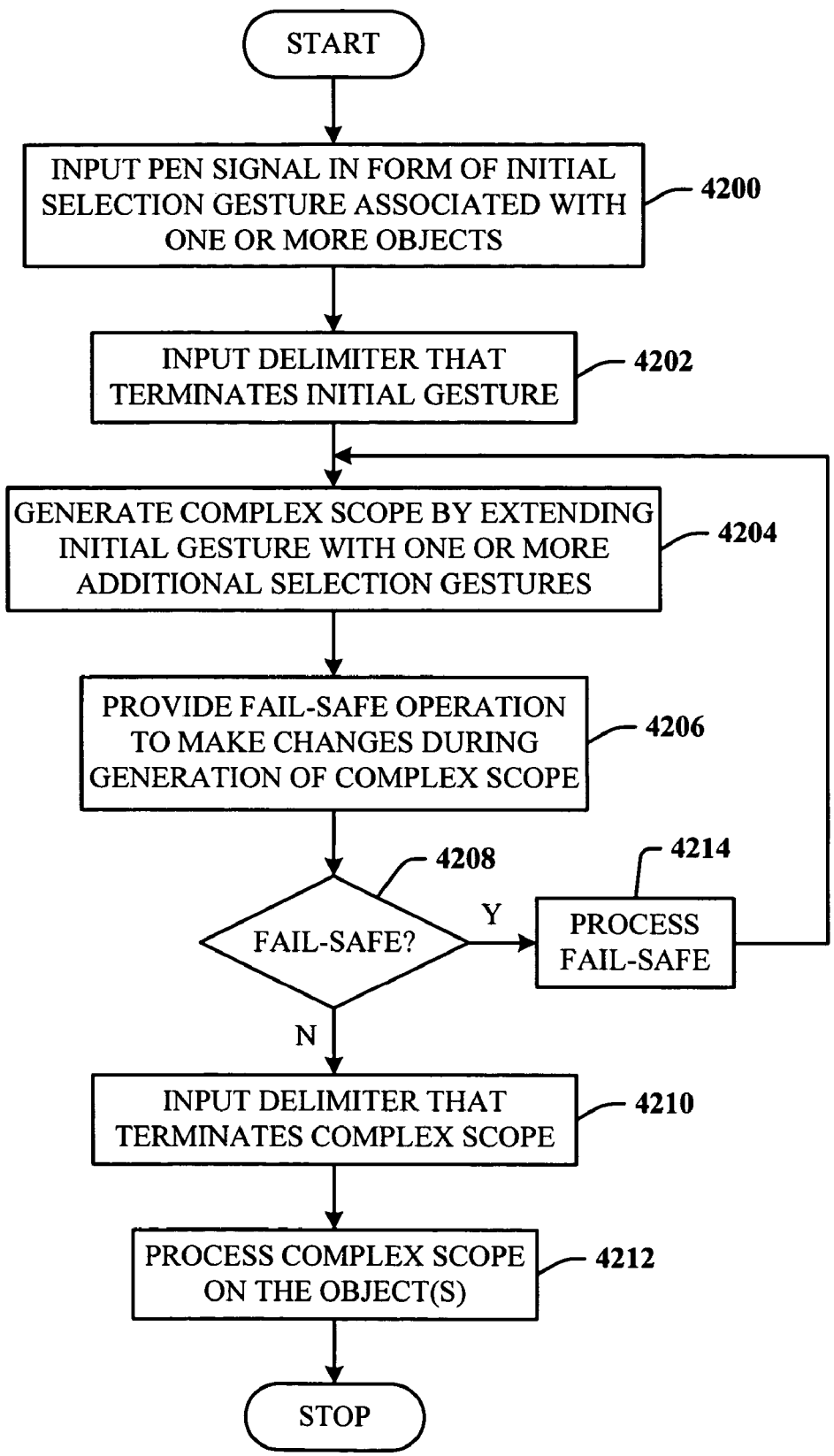
FIG. 42 illustrates a methodology of employing multi-stroke command structures in accordance with the subject invention.

FIG. 42 illustrates a methodology of employing multi-stroke command structures in accordance with the subject invention. At 4200, a pen signal is input in the form of an initial selection gesture, which is associated with one or more objects. At 4202, a delimiter is input that terminates the initial gesture. At 4204, a collective (or complex) scope is generated by extending the initial gesture with one or more additional selection gestures. At 4206, a fail-safe operation (such as releasing tension on the Gesture button, or removing the pen from the proximity of the screen) is provided to make changes during generation of the complex scope. This allows the user to delete a previously-added scope selection, or to cancel the entire definition of scopes within the current command phrase, for example. At 4208, the system monitors for a fail-safe input by the user. If a fail-safe is not executed, progress is to 4210 where another delimiter is input that terminates further entries to the complex scope. At 4212, the complex scope is processed against the one or more objects according to the delimiter. If a fail-safe has been executed by the user, flow proceeds from 4208 to 4214 to process the fail-safe, and then back to 4204 to consider adding another scope to the initial gesture (or to start a new gesture).

Figure 43:
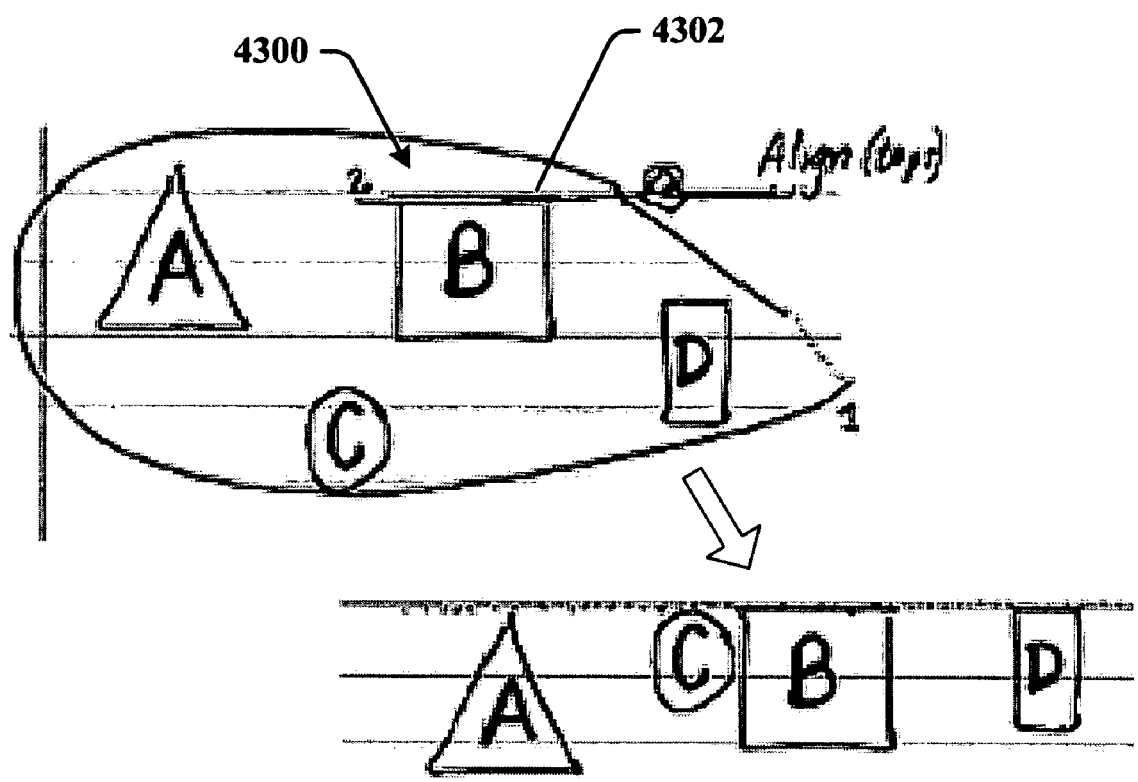
FIG. 43 illustrates operation of a collective scope in accordance with the subject invention.

FIG. 43 shows operation of a collective scope in accordance with the subject invention. For example, to align a set of objects (A, B, C, and D) to a specific edge 4300 of a reference object (B), the user can lasso the set of objects, and then make a separate crossing stroke 4302 to indicate the alignment edge. This crossing stroke is also referred to as a crossing scope. Terminating the crossing stroke with a pigtail and choosing the Align command from the menu that appears, aligns the lassoed objects to the indicated edge 4300. In contrast to previous use of the pigtail, here, the pigtail "delimiter" terminates a sequence of multiple pen strokes.

Note that this approach gives the PBUI a tremendous economy of design, since multiple Align commands (align to top, align to center, align to bottom, etc.) are not necessary. The spatial parameters of the crossing stroke indicate the type of alignment to perform. Furthermore, the user does not have to remember completely different gestures for different commands. The PBUI leverages the properties of marking menus. The user can be prompted with the commands available to terminate a crossing stroke, but as the user does, he or she rehearses the "expert" mark-ahead gesture to choose the command without prompting.

In addition to the Align command, the PBUI places commands such as Distribute, Crop, Flip, Rotate, Stretch, and Change Z-Ordering in the pigtail-invoked marking menu for crossing strokes. The crossing scope menu contains general commands that require spatial parameters. Note that these commands are available when the requisite spatial information has already been provided.

In another implementation, the first object selected can be processed as an "anchor" object such that it is fixed, and the other objects selected for alignment will align based on the first object. It is also within contemplation of the subject invention that any of the objects can be selected as the anchor object, for example, the PBUI can be configured to selects the last object as the anchor object, or combinations of objects (e.g., two) are selected and averaged to provide the master alignment for the remaining objects.

Figure 44:
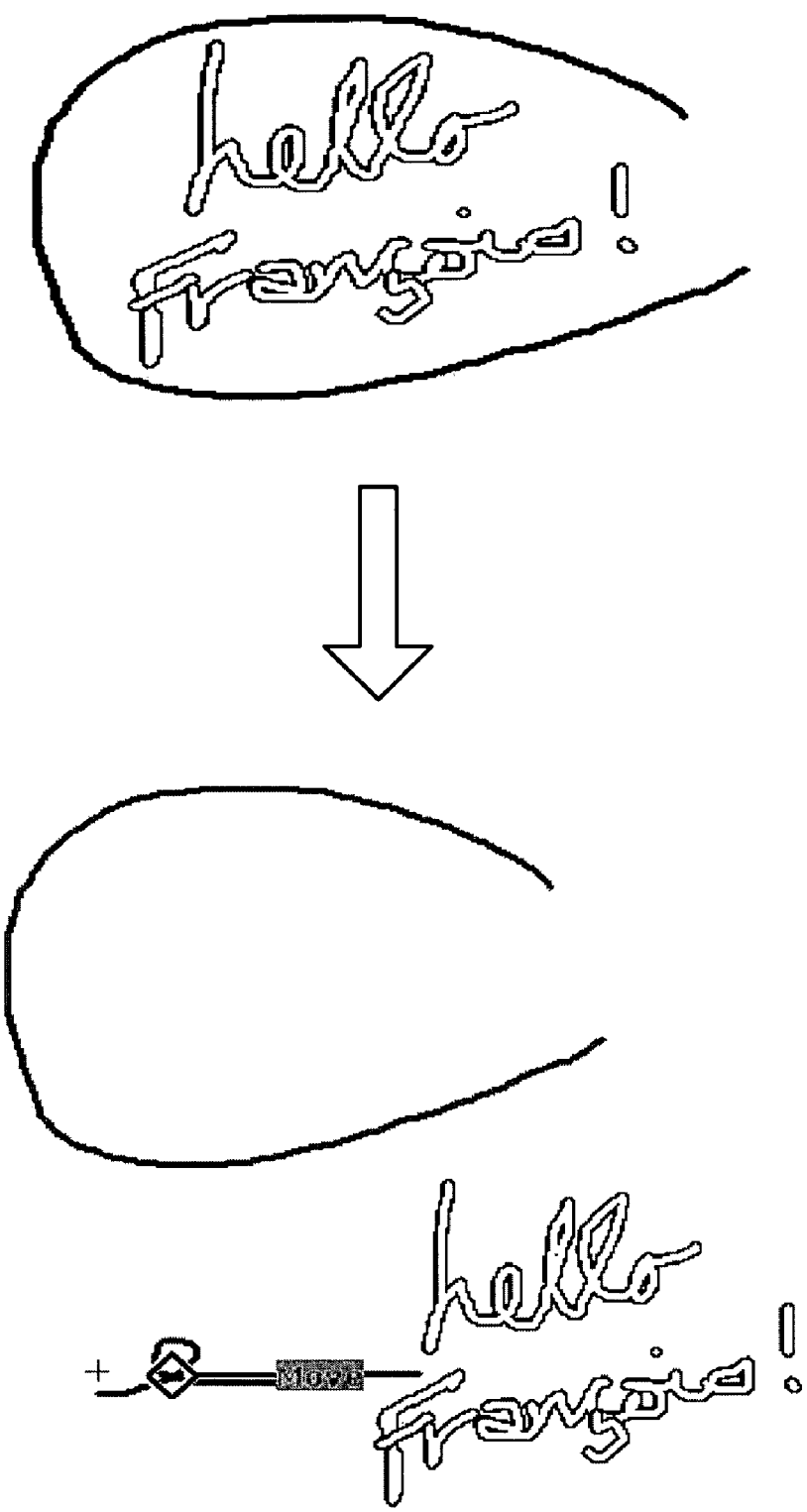
FIG. 44 illustrates pigtail and lasso stroke separation for a Move command in accordance with the subject invention.

FIG. 44 illustrates pigtail and lasso stroke separation for a Move command in accordance with the subject invention. A separate and detached pigtail delimiter from the lasso can be used to generate a command (e.g., a Move operation). Note that the second (pigtail) stroke is preceded by a small plus (+) symbol to indicate that it is an extension of a multi-stroke phrase. This is a good solution to the problem of trying to put a pigtail on the lasso when one is too close to the screen edge. One can just lift the pen (maintaining tension on the Gesture button) and finish the pigtail anywhere on the screen.

Figure 45:
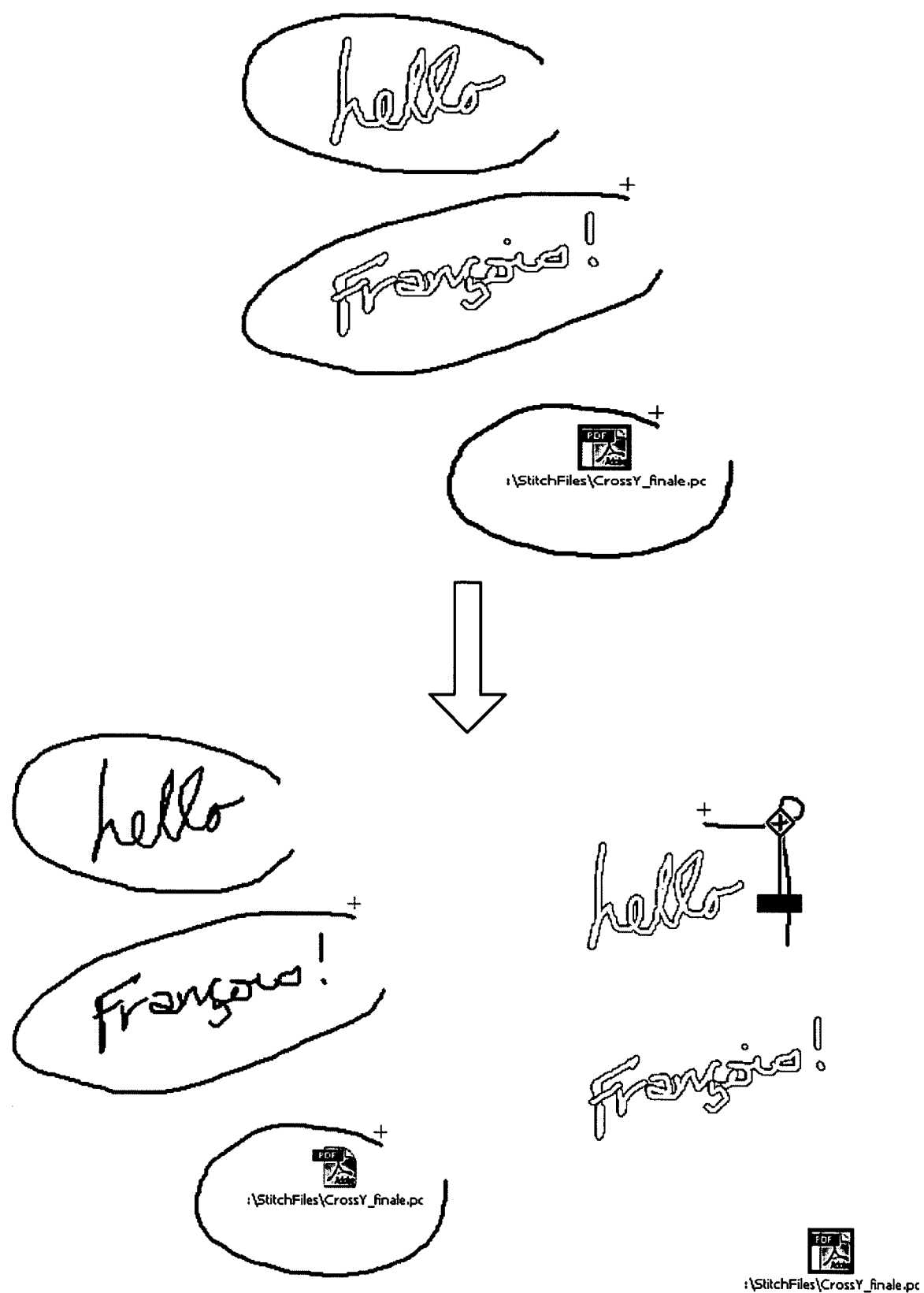
FIG. 45 depicts lasso scope selection with a detached pigtail to generate a Copy operation in accordance with the invention.

FIG. 45 depicts lasso scope selection with a detached pigtail to generate a Copy operation in accordance with the invention. First, second and third strokes are employed to select two terms and a document object, respectively, by drawing lassos thereabout. Below, a fourth stroke completes the command (here a Copy operation). Note that in one implementation, this final stroke could have been interpreted as the NULL scope (invoking Paste from the global menu). Instead, here it is resolved as Copy since the gesture phrase so far has selected a number of objects to act upon. Again, a small plus (+) symbol is presented proximate to the second, third, and fourth strokes to indicate extensions of a multi-stroke phrase.

Phrasing Together Multiple Strokes

To allow the type of command syntax suggested by the abovementioned Align example, a key design challenge is to support both single and multiple-stroke selections, while also supporting fail-safe operation by making it easy for the user to "start over" and begin a new selection without being burdened by previous strokes or getting stuck in a mode. That is, the user needs a way to tell the PBUI to either phrase together multiple strokes, or to treat multiple strokes separately. An advantage of using a delimiter such as the pigtail is that the user can make selections that are not terminated by an action phase. Thus, the pigtail naturally forms a building block for the user to build up a complex scope by making a series of pen strokes, with the final stroke terminated by a pigtail to choose a command. The next gesture stroke after a pigtail then begins a new scope. To signify that a gesture stroke is being added to the scope indicated by previous strokes, feedback is provided to the user. For example, a small plus (+) symbol appears near the start of the pen stroke (as indicated in the examples of FIG.

44 and FIG. 45), and color of preceding strokes is dimmed slightly to indicate that they are part of the phrase, but not part of the current stroke.

Following are mechanisms employed, individually or in combination, to phrase together multi-stroke command phrases while providing for fail-safe operation.

Muscular tension. The PBUI treats all pen strokes as Ink mode unless a mode button (controlled by the non-preferred hand, or a foot pedal) is pressed to indicate gesture mode. All pen strokes drawn while continuing to hold the Gesture button are treated as a single command phrase, up to and including a terminating pigtail. Releasing the mode button (whether or not the final stroke is terminated by a pigtail) allows the user to start drawing a new scope if desired. If the user continues to hold the button after a pigtail command is selected, subsequent strokes start a new command phrase.

Pen proximity. Users often naturally pull the pen away from the screen when pausing or beginning a new task. The PBUI leverages this as an implicit cue to help decide how to phrase together pen strokes. The user presses the Gesture button to indicate that individual pen strokes are for Gesture mode rather than Ink mode. However, in embodiments using pen proximity, the user need not maintain the button press. All gesture ink strokes are treated as part of a single command phrase as long as the pen remains within a predetermined areal proximity. Removing the pen from proximity terminates the phrase, after a time window (e.g., from 0-1000 ms) expires, and a new pen gesture can be interpreted as starting a new scope.

Tap away (punctuation). Users often tend to tap the pen to escape from pop-up menus. Moreover, many users do this habitually if they make a mistake. This anticipated error behavior can be leveraged. In one implementation, the user can tap far away from the current strokes to cancel the current scope phrasing, and start a new one. This can be used alone or in combination with the above techniques.

Figure 46:
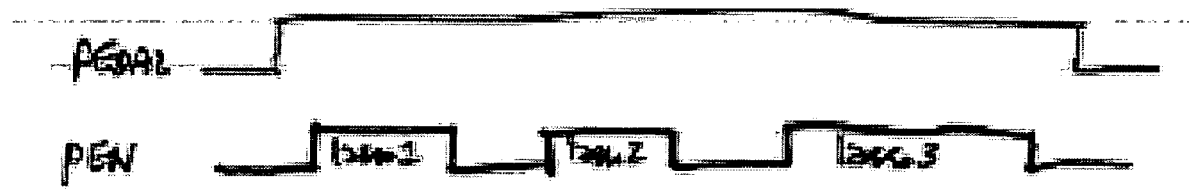
FIG. 46 illustrates a graph of one implementation that uses muscular tension to phrase together multi-stroke command phrases.

FIG. 46 depicts a graph of one implementation that uses muscular tension to phrase together multi-stroke command phrases. The muscular tension can be imposed against a foot pedal, for example. Here, the user forms a collective scope consisting of lasso 1+lasso2+lasso3.

Figure 47:
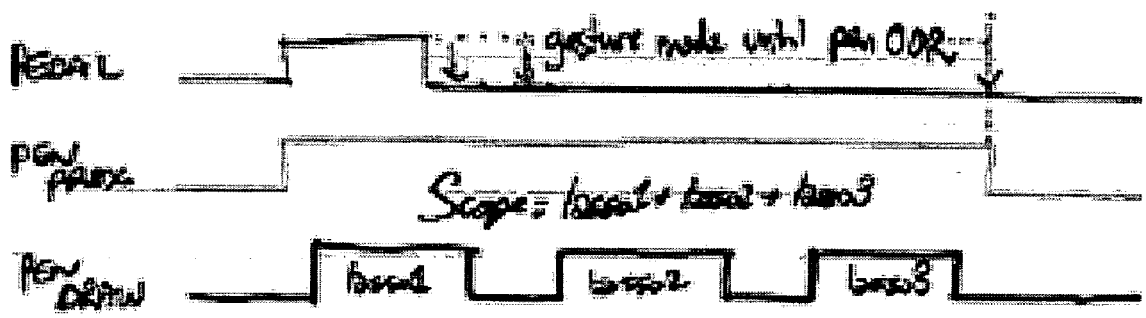
FIG. 47 illustrates a graph of one implementation that uses pen proximity for complex phrasing in accordance with the invention.

FIG. 47 illustrates a graph of one implementation that uses pen proximity for complex phrasing in accordance with the invention. Here, gesture mode is virtually maintained until the user brings the pen out of range (OOR). Note the figure does not indicate that the user has to indicate GESTURE mode for each pen stroke. But here, a HIGH→LOW transition of the pedal does not prevent the system from treating these as a collective scope.

These techniques allow users to build up complex scopes using multiple pen gestures, yet have the crucial property of fail-safe operation. If the user makes a mistake, he or she is not committed to act on the scope until the final pigtail is drawn. The user can release tension on the button or pull the pen away from the screen to escape at any time, and then start afresh with subsequent gesture (or ink) strokes. For all of these, a pigtail ends the command phrase, and subsequent gestures start a new phrase.

A prior art technique provides small boxes (or "handles") at the end of lasso selections as a way for the user to access the scope at a later time. However, a handle acts only on that one scope. Hence, drawing multiple disjoint lassos does not form a collective scope that the user can act upon. Although this does allow the user to defer action on individual scopes, the cost of this design decision is that one cannot articulate a command phrase that spans multiple strokes and acts on a collective scope. In contrast the PBUI of the subject invention allows action on collective scopes, and by allowing mixed types of scope specification (e.g., lasso, crossing strokes), further allows rich scopes that specify the objects to be acted upon, as well as parameters such as alignment edges and axes of rotation. In one embodiment, the PBUI of the present invention provides handles at the end of each scope selection, but in addition to these manually drawn scopes, also provides an additional automatically-generated handle to the entire collective scope indicated, for example, by a dotted rectangle that encompasses all selected objects.

Crossing Scope Menu

Figure 48:
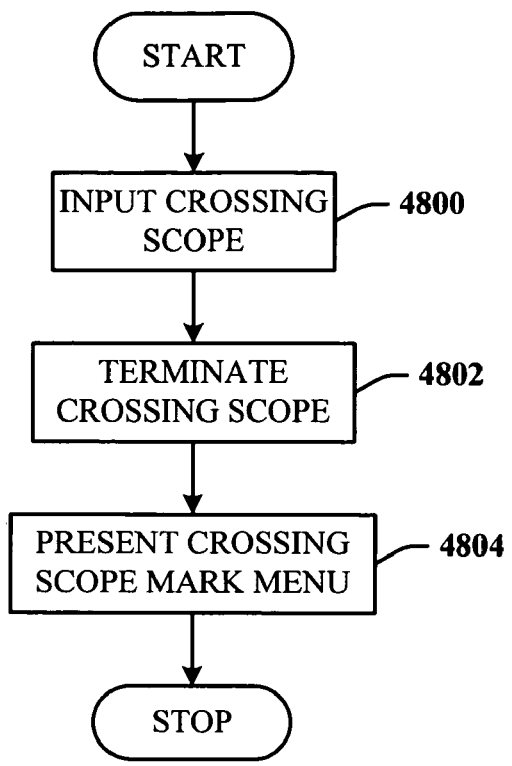
FIG. 48 illustrates a methodology of crossing scope processing in accordance with the subject invention.

FIG. 48 depicts a methodology of crossing scope processing in accordance with the subject invention. At 4800, a crossing scope is received, as input by the user. At 4802, the crossing scope is terminated. In response thereto, the crossing scope menu is automatically presented to make one or more commands available for selection.

Figure 49:
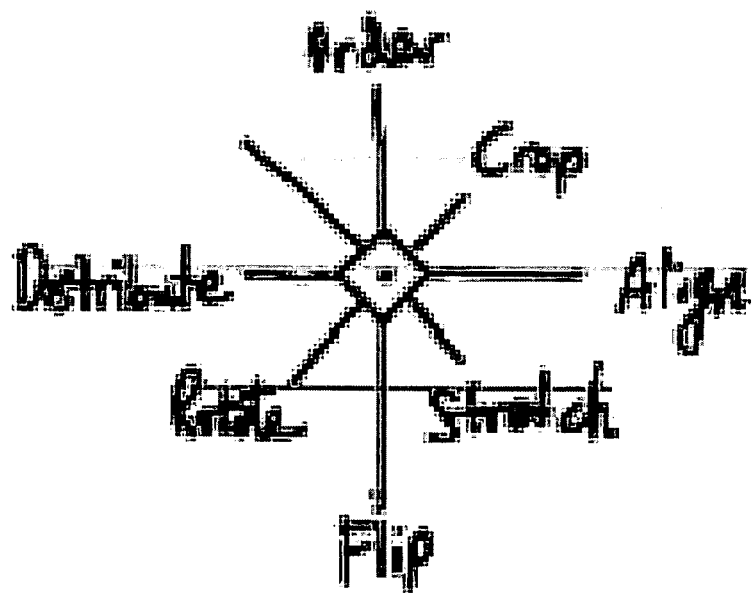
FIG. 49 illustrates one representation of the crossing scope menu of the invention.

FIG. 49 illustrates one representation of the crossing scope menu of the invention. The menu includes the following commands: Order, Crop, Align, Stretch, Flip, Rotate, and Distribute, for example. The NW menu item position is shown as not assigned to any command. Functionality can be packed into a single-level marking menu because of the crossing scope being used to identify spatial parameters that eliminate variants of the commands, as will be seen in the following examples.

Crop Menu Command

Figure 50:
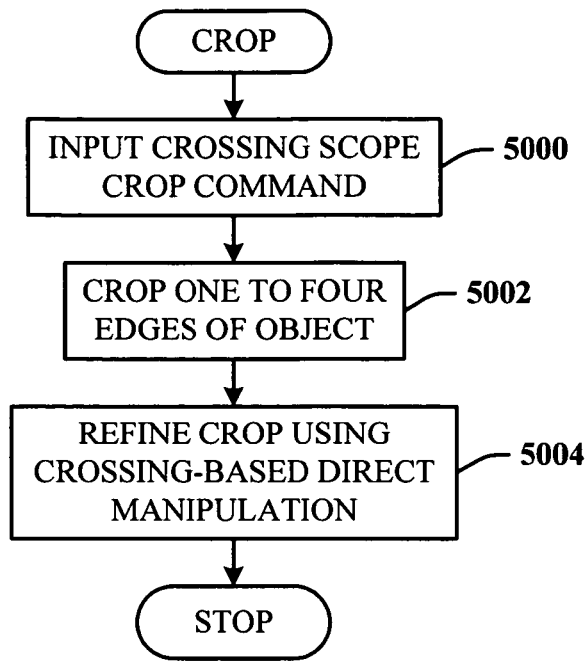
FIG. 50 illustrates a methodology of processing a Crop command in accordance with the invention.

Cropping provides another excellent example showing the expressive power of the PBUI system. The Crop multi-stroke command phrase allows the user to crop from one to four edges of a photo in a single command. It also allows for interactive refinement of the Crop position using a crossing-based direct manipulation phase. Accordingly, FIG. 50 illustrates a methodology of processing a Crop command in accordance with the invention. At 5000, the user inputs a crossing scope Crop command. At 5002, the user can crop from one to four edges of a selected object. At 5004, the Crop can be refined using crossing-based direct manipulation.

Figure 51:
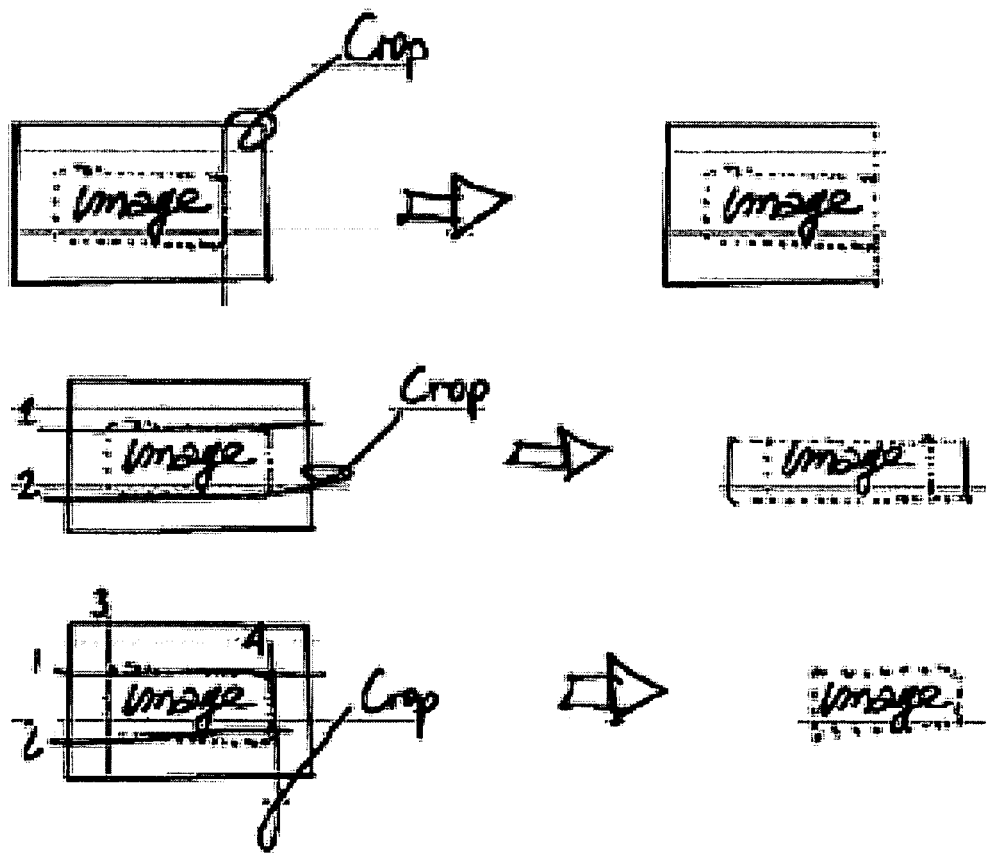
FIG. 51 illustrates operation of the Crop command in one-sided, two-sided, and four-sided crop operations of the subject invention.

FIG. 51 illustrates operation of the Crop command in one-sided, two-sided, and four-sided crop operations of the subject invention. In the top sketch, the right side of the image is cropped. In the middle sketch, both the top and bottom of the image are cropped at once. In the bottom sketch, all fours sides of the image are cropped at once. FIG. 52 illustrates that direct manipulation for the Crop command allows fine adjustment of the crop line. The gain factor is adjusted to be less than actual pen movement. FIG. 53 illustrates that cropping ink objects is supported.

Cropping more than four edges on a single object causes the minimum area region to be chosen. Cropping edges on multiple different objects can also work. With respect to "which side to cut?" problem, the PBUI keeps whichever portion is larger. If the user wants it the other way around, the user can use interactive refinement via the direct manipulation phase (FIG. 52). If the user crops away the entire object, this can be corrected using interactive refinement, in response to which a dotted outline of the object box is shown. The crop command also demonstrates how a corner scope can be used to good effect. Here, it is merely a convenience that replaces the need to draw two separate crop lines. Alternatively, the user can address the "which side to crop" problem by drawing a corner, similar to FIG. 52, but with the corner outside of the outer boundary of the image, to explicitly indicate which side to cut away. With the Rotate command the corner scope can be used to indicate a center of rotation. FIG. 54 illustrates use of a corner scope for the Crop command of the invention. FIG. 55 shows a direct manipulation phase for a corner scope that allows 2D refinement of crop mark placement. In one implementation, the corner scope menu contains exactly the same commands as found in the crossing scope menu. If a corner scope does not make sense for any of the commands, they can be grayed out. Alternatively, interpretation of the corner can be forced as a crossing scope.

Align Menu Command

Sophisticated alignments can be performed by extending the alignment command to allow for multiple disjoint crossing scopes. This is very powerful as it allows the user to specify the desired alignment edge for each individual object. Note that a non-satisfiable alignment (e.g., a vertical crossing scope on one object, but a horizontal alignment edge on the reference object) simply defaults to aligning to the center of the object, along the horizontal or vertical axis specified with the reference object.

Figure 56:
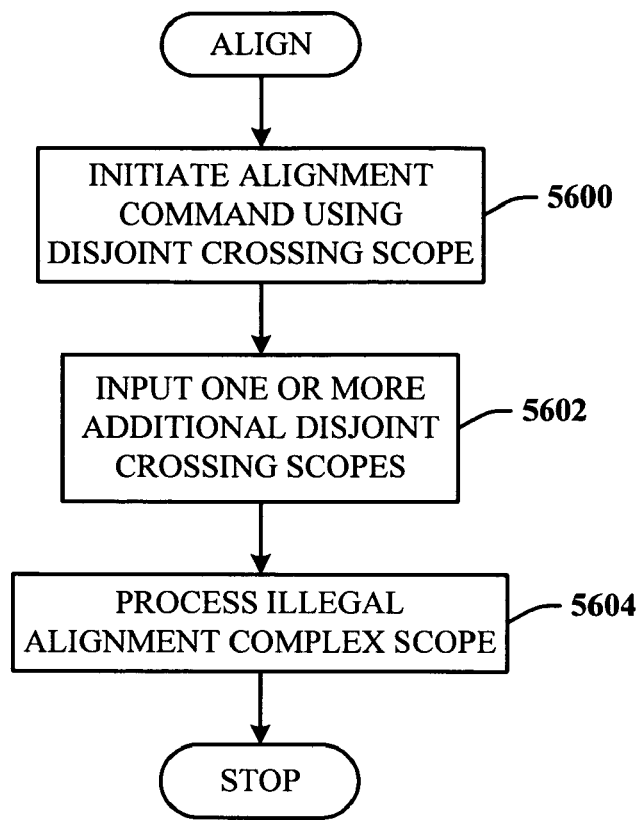
FIG. 56 illustrates a methodology of facilitating alignment in the PBUI of the subject invention.

FIG. 56 illustrates a methodology of facilitating alignment in the PBUI of the subject invention. At 5600, the alignment command is initiated using a disjoint crossing scope. At 5602, one or more additional disjoint crossing scopes are added. At 5604, the system processes any non-satisfiable alignment that is requested.

Figure 57:
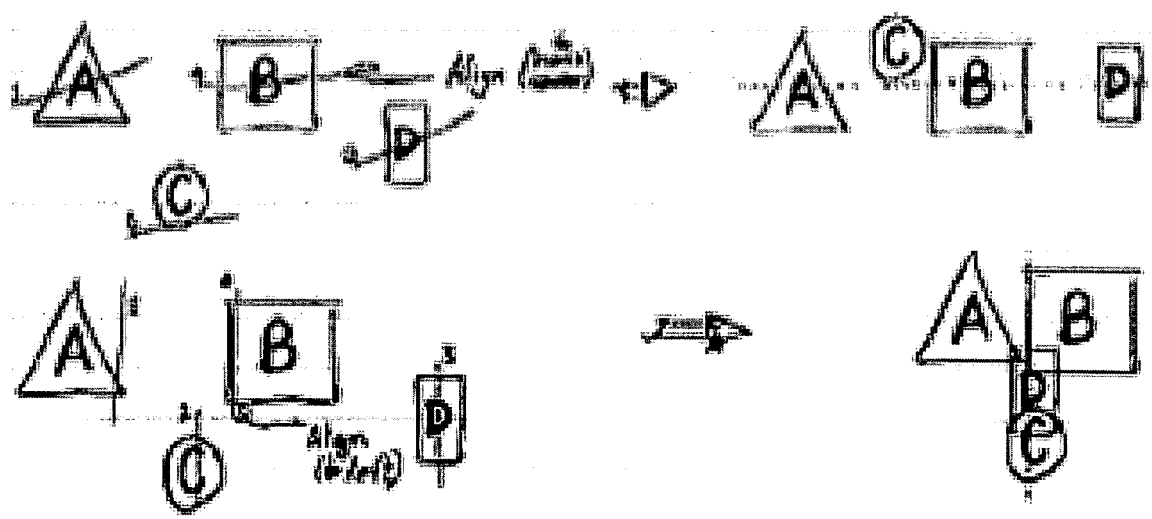
FIG. 57 illustrates compound alignment scenarios in accordance with the invention.

FIG. 57 illustrates compound alignment scenarios in accordance with the invention. Selecting the objects to align with individual crossing strokes allows the user to specify which edge of each object to align to the reference object. The top scenario represents horizontal alignment, indicating that a first object A is crossed through its approximate center (for the first object and center alignment with the final axis), second object C is crossed second on its approximate lower edge (for the second object and lower edge alignment with the final axis), third object B is crossed last (as indicated by a pigtail) through its approximate center, and fourth object D is crossed through its approximate center (for the fourth object and center alignment with the final axis).

The bottom scenario represents vertical alignment, indicating that a first object A is crossed along its approximate right side (for right-side alignment with the final axis), a second object C is crossed through its approximate center (for center alignment with the final axis), a third object B is crossed last (as indicated by a pigtail) along its left side (for left side alignment with the final axis), and fourth object D is crossed through its approximate center (for center alignment with the final axis).

Flip Menu Command

The Flip command is another example of crossing scopes, which here are used to indicate the axis of rotation. This example also demonstrates how a lasso scope can be combined with a crossing scope to Flip multiple objects about a desired axis of rotation. Top, bottom, left, right, and middle (horizontal or vertical), edges can be used as rotation axes. In some embodiments, strokes across the object diagonal can also be employed to flip rotation along a diagonal axis. This includes both 2D and 3D objects. Accordingly, FIG. 58 illustrates a methodology of facilitating object flipping in the PBUI of the subject invention. At 5800, the object is selected for flip by sketching a crossing scope on the object to be flipped.

FIG. 59 depicts examples of the Flip command in accordance with the invention. In a top scenario, the crossing scope is sketched horizontally along the bottom edge of the F object. The operation flips the object about the horizontal axis resulting in an inverted image. In a middle scenario, the crossing scope is sketched vertically through the center of the F object. The operation flips the object about the central vertical axis horizontal axis resulting in an inverted image. In a bottom scenario, the crossing scope is sketched vertically through the center of the D object, which is one of four selected objects (A, B, C, and D). The operation flips objects A, B, and C relative to the vertical center of object D. In one implementation, the command "Flip about middle vertical axis" is instead applied to each object within the lasso, causing each object to flip about its own (local) vertical axis.

Rotate—Scope Menu Command

The Rotate command offers a final example. The corner scope can be employed to allow specification of the rotation direction, as well as the center of rotation. The user can also choose between simple ninety-degree rotation commands in any direction using crossing strokes, with the center of rotation defaulting to the center of the object. Either technique can support a direct manipulation phase that allows free rotations to be performed.

Figure 60:
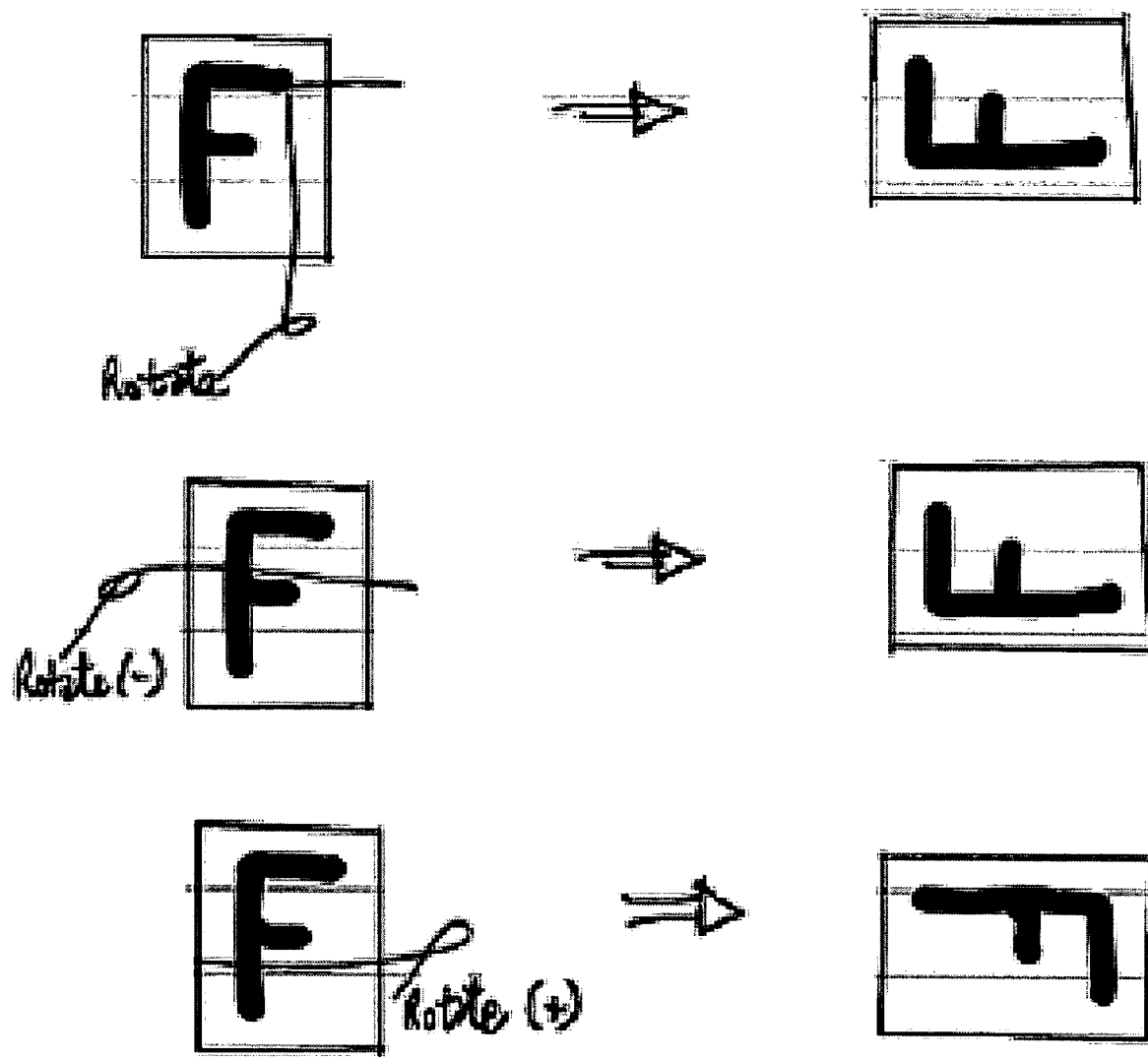
FIG. 60 illustrates examples of Rotate operations as provided by the PBUI of the invention.

FIG. 60 illustrates examples of Rotate operations as provided by the PBUI of the invention. A top scenario shows the corner scope sketched on an object F, to indicate that the rotation is counterclockwise about the corner, with a terminating pigtail choosing the Rotate command. The 90-degree angle (corner) indicates the center of rotation. The rotation direction is determined by the change in angle from the start of the corner to the end of it (rounded to the nearest 90 degrees). A middle scenario has a crossing stroke sketched horizontally from right to left through the center of the object F terminated by pigtail selecting Rotate, which indicates negative rotation (counter clockwise) of the object F. A bottom scenario has a crossing stroke sketched horizontally from left to right through the center of the object F with a pigtail choosing Rotate, which indicates positive rotation (clockwise) of the object F. That is, a right-to-left (or bottom-to-top) crossing stroke rotates backwards (minus 90 degrees); a left-to-right (or top-to-bottom) crossing stroke rotates forwards (plus 90 degrees).

Figure 61:
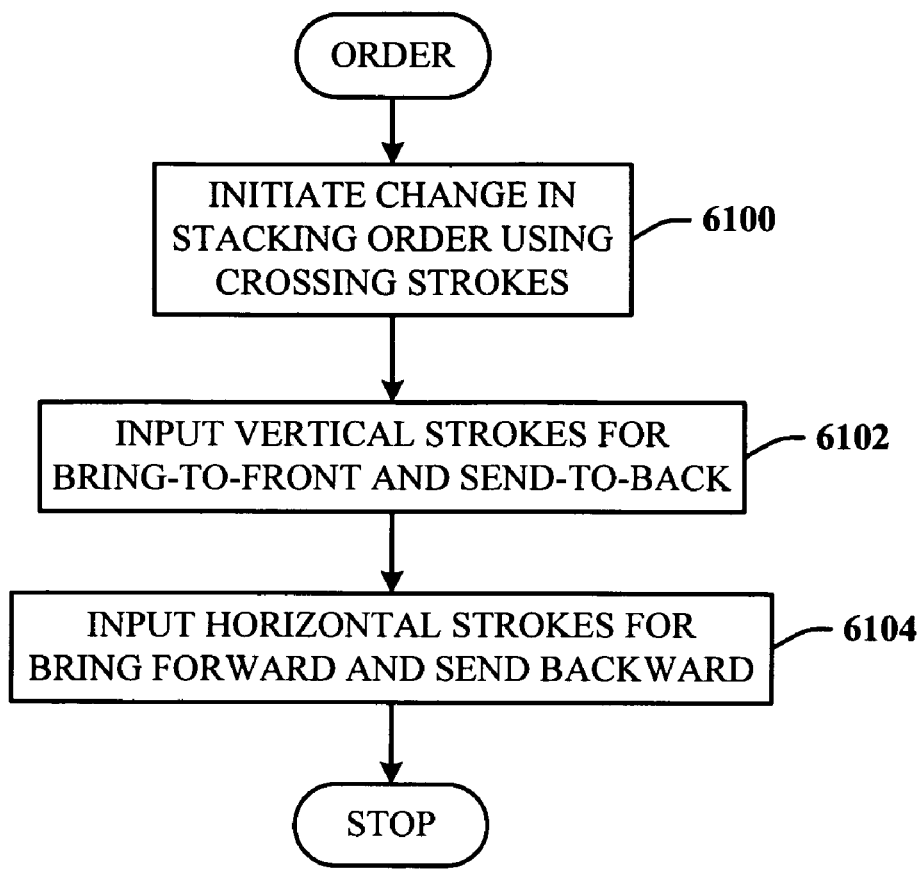
FIG. 61 illustrates a methodology of Z-order rearrangement in accordance with the invention.

Changing the stacking order of objects is supported by a mechanism which is similar to Rotation using crossing strokes. The Order command uses vertical strokes to support Bring to front/Send to back commands, and horizontal strokes to support Bring forward/Send backward commands. FIG. 61 illustrates a methodology of Z-order rearrangement in accordance with the invention. At 6100, a change in stacking order is initiated using crossing strokes. At 6102, vertical strokes are input for bring-to-front and send-to-back. At 6104, horizontal strokes are input for bring forward and send backward operations.

Figure 62:
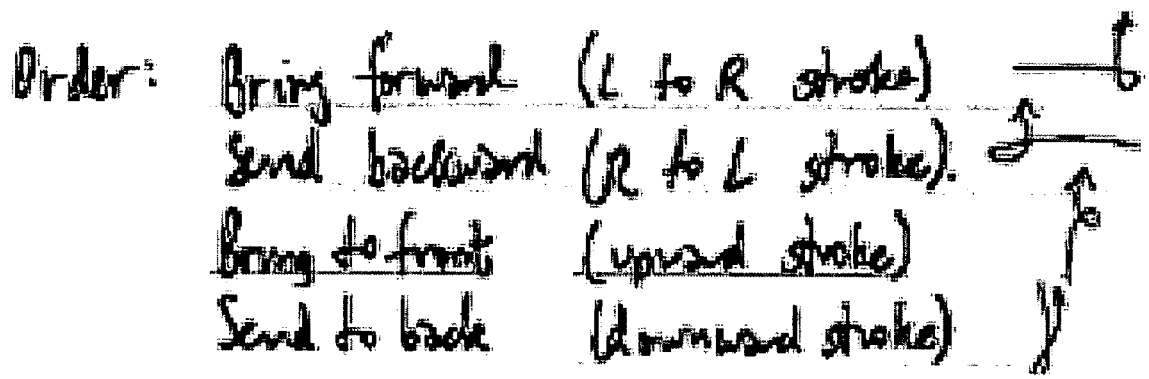
FIG. 62 illustrates a sketch of commands and corresponding strokes that facilitate Z-Order changes in accordance with the invention.

FIG. 62 shows a sketch of commands and corresponding strokes that facilitate Z-Order changes in accordance with the invention. The Z-Order command uses different crossing stroke directions to choose variants of the commands, all terminated by a pigtail to the North (upward) to choose the Z-Order command. As indicated in FIG. 62, a Bring Forward command is a left-to-right stroke with a pigtail terminating to the North to choose the Z-Order command. A Send Backward command is a right-or-left stroke, again with a pigtail terminating to the North to choose Z-Order. A Bring to Front command is an upward (or vertical) stroke terminated by a Pigtail to the North. A Send to Back command is a downward stroke with a final Pigtail to the North. These strokes all use the pigtail to choose the Z-order command (which is to the N, or upward). The direction of the part of the stroke prior to the pigtail is what distinguishes the four different versions of the Z-Order command; they all finish to the N, since that is where the Z-Order command is in the crossing scope menu.

As indicated supra, the PBUI of the subject invention can support one or more of lasso scopes, the null scope (a pigtail over nothing), and a single item scope (a pigtail over a single item, with the pigtail intersection providing the point for the hit-test). Crossing scopes can be confused with these other scopes. One solution is to require the crossing scope pigtail to have its self-intersection point beyond the extent of the object. However, it can be more difficult to do this successfully if cropping a very large image, for example. Resolution of such ambiguity can include using the context. That is, it cannot be a single item stroke if there are preceding selection gestures/strokes on other objects. Additionally, a stroke partially or a fully crossing object distinguishes the crossing scope from null scopes (no crossing). Another method is to use the starting point of the ink trail instead of the pigtail intersection point. In this case it does not matter where the loop is formed. For example, a stroke starting outside of the object is crossing scope, and a stroke starting on the object is single item scope. Another technique is to require a crossing stroke to fully cross the object (rather than allowing partial crossing). For example, a stroke starting inside an object is interpreted as crossing stroke. The Z-stacking order of the objects can also be considered to disambiguate the various possible scopes and determine the most likely intended target of a crossing stroke.

A single continuous stroke that crosses more than one object is possible. If the user makes a straight line and crosses two objects, the PBUI will process the objects if the command supports multiple objects, or give feedback indicating the ambiguity (error) if the command cannot support multiple crossed objects. Another embodiment uses the rule that "the last one crossed wins" in the case of ambiguous crossing of multiple items. Another possible ambiguity involves crossing ink strokes (either intentionally, or by accident) when drawing a crop mark, for example. In one implementation, the ink also gets cropped. The PBUI can be configured to use an averaged measure if the line is wiggly.

Figure 63:
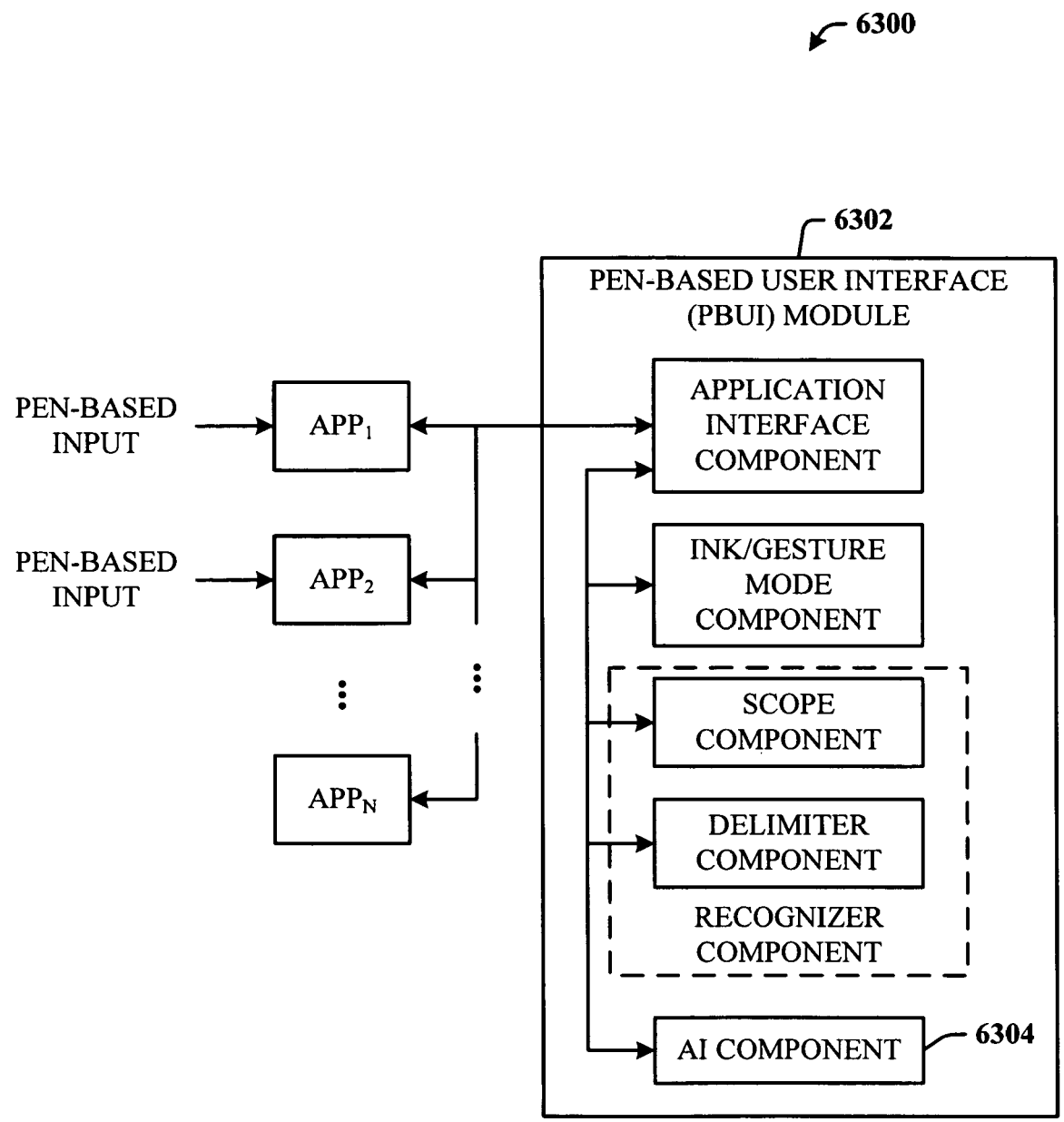
FIG. 63 illustrates a PBUI system that employs artificial intelligence in accordance with the subject invention.

FIG. 63 illustrates a PBUI system 6300 that employs probabilistic reasoning or artificial intelligence (AI) in accordance with the subject invention. The system 6302 is similar in capabilities to the system 100 of FIG. 1, with the added capability of an AI component 6304. The AI component 6304 can be employed internal to the PBUI module 6302 or external thereto.

The subject invention (e.g., in connection with selection) can employ various AI-based schemes for carrying out various aspects thereof. For example, a process for determining when to present animated stroke extensions can be facilitated via an automatic classifier system and process. A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria repetitive input strokes of a certain user and automatically employing such strokes when the user logs in, and when to use smaller or larger marks in accordance with system specifications of the device in which the PBUI is used.

For example, if the PBUI is used on a PDA, which has a smaller display, the AI component 6304 can detect that the PDA has a smaller display, and automatically resize the mark accordingly for ease of use by the user. Moreover, if the user, in the past, has repeatedly enlarged the mark, the AI component 6304 can learn this and employ the larger mark when that user interacts with the PDA.

In another implementation, the AI component 6304 can monitor user interaction with the delimiters, and automatically adjust time and spatial parameters according to a given user. For example, is a user is at a novice level, and over time remains at a novice level because his or her skills have not advanced, the time for the timeouts can be automatically adjusted to make user interaction more pleasant. This implementation finds application for an impaired user, for example, who will likely never develop a better skill set to deal with default settings of the PBUI system.

These are only but a few examples of features, settings, and capabilities that can be automatically adjusted by the AI component 6304 to improve user experience with PBUI. Other automated aspects can include anticipating input of the pigtail delimiter according to particular interaction of a given user, accentuating certain marking menu commands over others (as learned by the system) as the user works on a certain task or project, resizing the marking menu boundaries, distinguishing the various types of scopes supported from one another (depending on the shape of the strokes as well as the context of nearby objects), anticipating scope extensions in complex scope selection, and generally, automatically tightening and/or loosening parameters as the user interacts with the PBUI.

Figure 64:
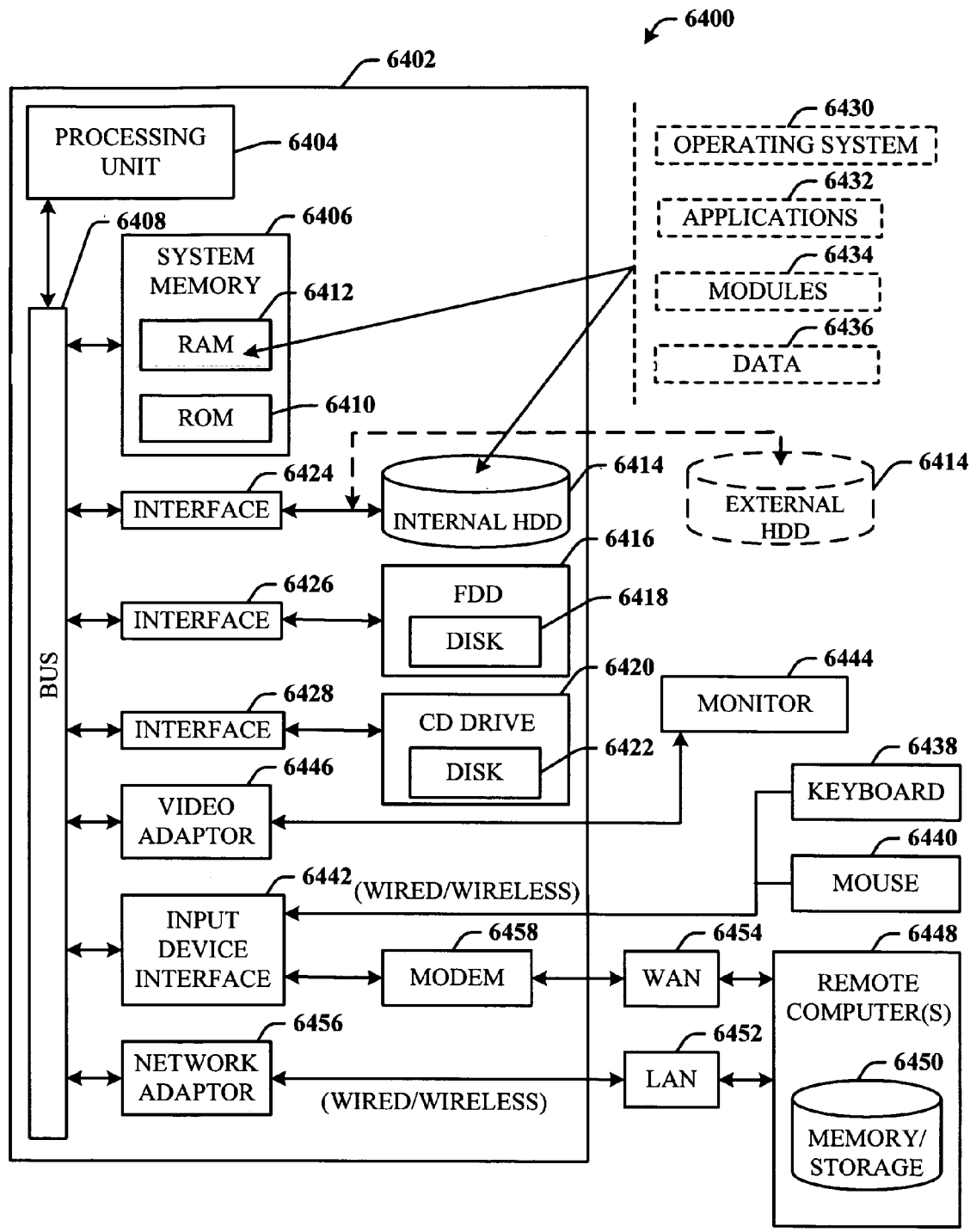
FIG. 64 illustrates a block diagram of a computer operable to execute the disclosed architecture.

Referring now to FIG. 64, there is illustrated a block diagram of a computer operable to execute the disclosed architecture. In order to provide additional context for various aspects of the subject invention, FIG. 64 and the following discussion are intended to provide a brief, general description of a suitable computing environment 6400 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 64, there is illustrated an exemplary environment 6400 for implementing various aspects of the invention that includes a computer 6402, the computer 6402 including a processing unit 6404, a system memory 6406 and a system bus 6408. The system bus 6408 couples system components including, but not limited to, the system memory 6406 to the processing unit 6404. The processing unit 6404 can be any of various commercially available processors. Dual microprocessors and other multi-processor architectures may also be employed as the processing unit 6404.

The system bus 6408 can be any of several types of bus structure that may further interconnect to a memory bus (with or without a memory controller), a peripheral bus, and a local bus using any of a variety of commercially available bus architectures. The system memory 6406 includes read only memory (ROM) 6410 and random access memory (RAM) 6412. A basic input/output system (BIOS) is stored in a non-volatile memory 6410 such as ROM, EPROM, EEPROM, which BIOS contains the basic routines that help to transfer information between elements within the computer 6402, such as during start-up. The RAM 6412 can also include a high-speed RAM such as static RAM for caching data.

The computer 6402 further includes an internal hard disk drive (HDD) 6414 (e.g., EIDE, SATA), which internal hard disk drive 6414 may also be configured for external use in a suitable chassis (not shown), a magnetic floppy disk drive (FDD) 6416, (e.g., to read from or write to a removable diskette 6418) and an optical disk drive 6420, (e.g., reading a CD-ROM disk 6422 or, to read from or write to other high capacity optical media such as the DVD). The hard disk drive 6414, magnetic disk drive 6416 and optical disk drive 6420 can be connected to the system bus 6408 by a hard disk drive interface 6424, a magnetic disk drive interface 6426 and an optical drive interface 6428, respectively. The interface 6424 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 6402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 6412, including an operating system 6430, one or more application programs 6432, other program modules 6434 and program data 6436. All or portions of the operating system, applications, modules, and/or data can also be cached in the RAM 6412. It is appreciated that the invention can be implemented with various commercially available operating systems or combinations of operating systems.

A user can enter commands and information into the computer 6402 through one or more wired/wireless input devices, e.g., a keyboard 6438 and a pointing device, such as a mouse 6440. Other input devices (not shown) may include a microphone, an IR remote control, a joystick, a game pad, a stylus pen, touch screen, or the like. These and other input devices are often connected to the processing unit 6404 through an input device interface 6442 that is coupled to the system bus 6408, but can be connected by other interfaces, such as a parallel port, an IEEE 1394 serial port, a game port, a USB port, an IR interface, etc.

A monitor 6444 or other type of display device is also connected to the system bus 6408 via an interface, such as a video adapter 6446. In addition to the monitor 6444, a computer typically includes other peripheral output devices (not shown), such as speakers, printers, etc.

The computer 6402 may operate in a networked environment using logical connections via wired and/or wireless communications to one or more remote computers, such as a remote computer(s) 6448. The remote computer(s) 6448 can be a workstation, a server computer, a router, a personal computer, portable computer, microprocessor-based entertainment appliance, a peer device or other common network node, and typically includes many or all of the elements described relative to the computer 6402, although, for purposes of brevity, only a memory storage device 6450 is illustrated. The logical connections depicted include wired/wireless connectivity to a local area network (LAN) 6452 and/or larger networks, e.g., a wide area network (WAN) 6454. Such LAN and WAN networking environments are commonplace in offices, and companies, and facilitate enterprise-wide computer networks, such as intranets, all of which may connect to a global communication network, e.g., the Internet.

When used in a LAN networking environment, the computer 6402 is connected to the local network 6452 through a wired and/or wireless communication network interface or adaptor 6456. The adaptor 6456 may facilitate wired or wireless communication to the LAN 6452, which may also include a wireless access point disposed thereon for communicating with the wireless adaptor 6456.

When used in a WAN networking environment, the computer 6402 can include a modem 6458, or is connected to a communications server on the WAN 6454, or has other means for establishing communications over the WAN 6454, such as by way of the Internet. The modem 6458, which can be internal or external and a wired or wireless device, is connected to the system bus 6408 via the serial port interface 6442. In a networked environment, program modules depicted relative to the computer 6402, or portions thereof, can be stored in the remote memory/storage device 6450. It will be appreciated that the network connections shown are exemplary and other means of establishing a communications link between the computers can be used.

The computer 6402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

It is to be appreciated that although the computing device described hereinabove resembles functions and features of a desktop computer, such components can be applicable to smaller and more portable devices such as portable table PC, handheld PDA, or the like. Thus, such smaller computing devices may not include some of the components described in conjunction with FIG. 64. For example, where the PBUI system is employed in a PDA, the use of the FDD 6416 is not utilized. Similarly, the PDA may not include the CD drive 6420 and the modem 6458.

Figure 65:
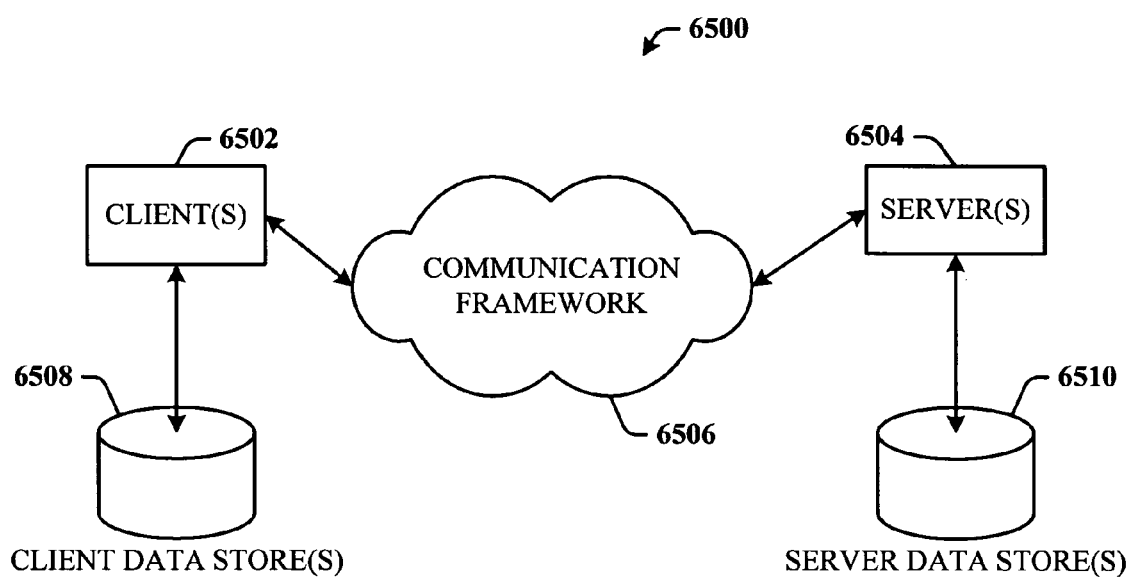
FIG. 65 illustrates a schematic block diagram of an exemplary computing environment in accordance with the subject invention.

Referring now to FIG. 65, there is illustrated a schematic block diagram of an exemplary computing environment 6500 in accordance with the subject invention. The system 6500 includes one or more client(s) 6502. The client(s) 6502 can be hardware and/or software (e.g., threads, processes, computing devices). The client(s) 6502 can house cookie(s) and/or associated contextual information by employing the invention, for example.

The system 6500 also includes one or more server(s) 6504. The server(s) 6504 can also be hardware and/or software (e.g., threads, processes, computing devices). The servers 6504 can house threads to perform transformations by employing the invention, for example. One possible communication between a client 6502 and a server 6504 can be in the form of a data packet adapted to be transmitted between two or more computer processes. The data packet may include a cookie and/or associated contextual information, for example. The system 6500 includes a communication framework 6506 (e.g., a global communication network such as the Internet) that can be employed to facilitate communications between the client(s) 6502 and the server(s) 6504.

Communications can be facilitated via a wired (including optical fiber) and/or wireless technology. The client(s) 6502 are operatively connected to one or more client data store(s) 6508 that can be employed to store information local to the client(s) 6502 (e.g., cookie(s) and/or associated contextual information). Similarly, the server(s) 6504 are operatively connected to one or more server data store(s) 6510 that can be employed to store information local to the servers 6504.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system embodied on a computer-readable storage medium that facilitates input management of a pen-based user interface, comprising:
   an interface component that receives an input stroke defining a scope with respect to at least one object; and
   a recognizer component that facilitates insertion of a delimiter in association with the stroke, the delimiter is a self-intersecting pigtail that is input in association with the stroke in an uninterrupted manner to enter the defined scope and facilitate selection of commands to be performed on the scope, wherein subsequent marking of a second pigtail looped in the opposite direction from the delimiter pigtail within the same stroke facilitates redefinition of the scope without interrupting the stroke.

2. The system of claim 1, wherein the delimiter is input while in a gesture mode.

3. The system of claim 1, wherein the delimiter is input by activation of a button.

4. The system of claim 1, wherein the delimiter is a pigtail that is appended to the stroke in an uninterrupted manner to facilitate scope selection, command activation, and direct manipulation.

5. The system of claim 1, wherein input of the delimiter, which is a pigtail, triggers presentation of a mark while the pigtail is being created.

6. The system of claim 1, wherein input of the self-intersecting stroke automatically triggers a marking mode while a pen is in communication with the user interface, the marking mode facilitates selection of a command by extending the stroke in one of at least five directions, wherein a pop-up menu centered around the self-intersecting stroke is displayed after a predetermined amount of time after input of the self-intersecting stroke has passed without selection of a command.

7. The system of claim 1, wherein input of the delimiter, which is a pigtail, facilitates integration of a plurality of commands into the stroke that are selectable via subsequently drawn pigtails in the same stroke, wherein the command selected is a function of the number of subsequent pigtails drawn.

8. A computer readable medium having stored thereon computer executable instructions for carrying out the system of claim 1.

9. The system of claim 1, further comprising an artificial intelligence (AI) component that employs a probabilistic and/or statistical-based analysis to prognose or infer an action that a user desires to be automatically performed.

10. A system embodied on a computer-readable storage medium that facilitates input management of a pen-based user interface, comprising:
   a scope component that facilitates insertion of a scope in a selection-action gesture phrase, the scope defined by a stroke drawn with respect to selectable objects; and
   a delimiter component that facilitates insertion of a delimiter in the gesture phrase as an uninterrupted continuation of the stroke, insertion of the delimiter enters the defined scope and facilitates selection of at least one command to be performed on the scope, wherein selection of a scope containing no objects invokes a global menu providing a different set of commands from those available when the scope contains at least one object.

11. The system of claim 10, wherein the delimiter is a self-intersecting pigtail that terminates insertion of the scope, the scope defined by the portion of the stroke preceding the delimiter.

12. The system of claim 11, wherein marking a subsequent pigtail drawn in the opposite direction from the delimiter pigtail allows the scope to be redefined without interrupting the stroke.

13. The system of claim 10, wherein the delimiter is a pigtail having a directional portion which is associated with a command.

14. The system of claim 13, wherein the directional portion can execute one of at least five different commands by extending the stroke in the direction associated with the selected command.

15. The system of claim 13, wherein the pigtail initiates presentation of a pop-up menu of a plurality of commands in support of a direct manipulation phase, wherein marking subsequent pigtails facilitates access to additional commands.

16. The system of claim 15, wherein the pop-up menu provides a visual cue for a command that is directly manipulable.

17. The system of claim 13, wherein the pigtail is automatically presented for selection before insertion by extending the stroke to display how to draw the pigtail.

18. A computer readable medium having stored thereon computer executable instructions for carrying out the system of claim 10.

19. A computing device that employs the system of claim 10.

20. The system of claim 10, wherein the delimiter initiates a mark mode during which scale independence of a mark is provided and direct manipulation is accessible.

21. The system of claim 20, wherein scale independence terminates before direct manipulation is accessed.

22. The system of claim 10, wherein a pop-up menu is presented in response to the delimiter, and after a predetermined time of which a check is made for crossing of an outer boundary of the menu.

23. The system of claim 10, wherein the scope is defined by a lasso comprising the portion of the stroke prior to the delimiter.

24. A computer readable storage medium having computer executable components that facilitate performing a method of managing input of a pen-based device, the method comprising:
   inputting a stroke into the pen-based device that defines a scope;
   adding a delimiter in association with the stroke, the delimiter is a self-intersecting pigtail drawn as a continuation of the stroke;
   presenting a pop-up menu of commands in response to detecting the delimiter;
   selecting one of the commands in a motion that is substantially uninterrupted from the act of inputting;
   performing the selected command with respect to the defined scope; and
   allowing the scope to be redefined after adding the delimiter and prior to selecting a command when a subsequent pigtail is drawn that loops in the opposite direction from that of the delimiter pigtail.

25. The method of claim 24, further comprising scanning the stroke for a self-intersecting stroke that marks presence of the delimiter.

26. The method of claim 24, further comprising selecting a button to add the delimiter.

27. The method of claim 24, wherein the act of adding occurs during a gesture mode.

28. The method of claim 24, further comprising adding the delimiter in accordance with a timeout associated with a substantially stationary pen input device.

29. The method of claim 24, further comprising automatically presenting the delimiter for insertion after a predetermined pause time of an input device by extending the stroke to display how to mark the delimiter.

30. The method of claim 24, further comprising automatically presenting a pop-up menu of commands located centrally about a delimiter mark.

31. The method of claim 30, further comprising providing scale independence of the delimiter mark for a predetermined time after presentation of the mark.

32. The method of claim 31, further comprising initiating a direct manipulation phase when the predetermined time expires.

33. The method of claim 32, the act of initiating the direct manipulation phase occurs substantially uninterrupted from the act of inputting.

34. method of claim 24, further comprising providing a feedback signal that indicates the delimiter has been inserted.

35. A computer readable storage medium having computer executable components that facilitate performing a method of managing input of a pen-based device, the method comprising:
   inputting a stroke into the pen-based device during a gesture mode to define a scope;
   adding a delimiter in association with the stroke, the delimiter is a self-intersecting pigtail drawn continuously as part of the stroke;
   presenting a delimiter mark in association with the delimiter;
   providing scale independence of the delimiter mark for a predetermined time after presentation of the delimiter mark;
   automatically presenting a pop-up menu of commands in response to detecting the delimiter;
   initiating a direct manipulation phase when the predetermined time expires in a motion that is substantially uninterrupted from the act of inputting; and allowing redefinition of the scope without interrupting the stroke when a subsequent pigtail is appended to the stroke that loops in the opposite direction with respect to the delimiter pigtail.

36. The method of claim 35 further comprising automatically presenting the delimiter for insertion after a predetermined pause time of an input device by extending the stroke to display how to mark the delimiter, the stroke extending to show additional pigtails that can be marked continuously as part of the stroke to select additional commands associated with each additional pigtail, each additional pigtail labeled with its associated command.

37. A system embodied on a computer-readable storage medium that facilitates input management of a pen-based device, comprising:

means for inputting a scope selection, the scope defined by a stroke;

means for adding a delimiter in association with the scope selection, the delimiter is a self-intersecting pigtail drawn continuously as part of the stroke;

means for automatically presenting a delimiter mark in association with the delimiter;

means for providing scale independence of the delimiter mark for a predetermined time after presentation of the delimiter mark;

means for adding a plurality of additional pigtails to the stroke;

means for distinguishing whether the additional pigtails are drawn as a series of separate loops or as overlapping loops;

means for automatically presenting a pop-up menu of commands in response to detecting the delimiter, the commands presented are a function of the number of additional pigtails added to the stroke after the delimiter and whether the additional pigtails are separate or overlapping; and means for initiating a direct manipulation phase when the predetermined time expires in a motion that is substantially uninterrupted from the act of inputting.

* * * * *